United States Patent
Nakamura

(10) Patent No.: US 12,469,036 B2
(45) Date of Patent: Nov. 11, 2025

(54) INFORMATION PROCESSING SYSTEM, INFORMATION PROCESSING METHOD, AND COMPUTER-READABLE STORAGE MEDIUM STORING INFORMATION PROCESSING PROGRAM

(71) Applicant: Mitsubishi Electric Corporation, Tokyo (JP)

(72) Inventor: Daisuke Nakamura, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 280 days.

(21) Appl. No.: 18/142,589

(22) Filed: May 3, 2023

(65) Prior Publication Data
US 2023/0274285 A1     Aug. 31, 2023

Related U.S. Application Data

(63) Continuation of application No. PCT/JP2020/044389, filed on Nov. 27, 2020.

(51) Int. Cl.
   *G06Q 30/00*  (2023.01)
   *G06Q 30/012*  (2023.01)
(52) U.S. Cl.
   CPC .................................. *G06Q 30/012* (2013.01)
(58) Field of Classification Search
   None
   See application file for complete search history.

(56) References Cited

U.S. PATENT DOCUMENTS

| 8,229,861 B1 | 7/2012 | Trandal et al. |
| 9,113,286 B1 | 8/2015 | Adams et al. |

(Continued)

FOREIGN PATENT DOCUMENTS

| CN | 102822856 A | 12/2012 |
| CN | 111192152 A | 5/2020 |

(Continued)

OTHER PUBLICATIONS

Dynamic optimisation of price, warranty length and production rate. By: Pei-Chun Lin; Jenhung Wang; Shiao-Shan Chin In: International Journal of Systems Science, Apr. 2009. (Year: 2009).*

(Continued)

*Primary Examiner* — Matthew T Sittner
(74) *Attorney, Agent, or Firm* — XSENSUS LLP

(57) ABSTRACT

An information processing system includes: an operation acquiring unit to acquire operation information based on user's operation; a display generating unit to generate display information indicating a display image in which article images corresponding to respective articles owned by a user are arranged; a display output unit that outputs the display information; an article specifying unit to specify a selected article, corresponding to each of one or more selected article images selected by the user's operation from among the plurality of article images included in the display image indicated by the display information generated by the display generating unit on the basis of the operation information; a request generating unit to generate, on the basis of the operation information, request information for requesting execution of predetermined processing on the one or more selected articles; and a request output unit to output the request information.

18 Claims, 26 Drawing Sheets

(56) References Cited

U.S. PATENT DOCUMENTS

| | | | |
|---|---|---|---|
| 10,282,731 B2 | 5/2019 | Masuko | |
| 2013/0346321 A1 | 12/2013 | Karita | |
| 2014/0114794 A1 | 4/2014 | Wolf | |
| 2014/0344107 A1* | 11/2014 | Nakamura | G06Q 30/0633 705/26.8 |
| 2015/0127556 A1 | 5/2015 | Harada et al. | |
| 2015/0142357 A1* | 5/2015 | Endo | G01R 13/0236 702/67 |
| 2016/0056970 A1* | 2/2016 | Yabe | H04L 12/2809 709/225 |

FOREIGN PATENT DOCUMENTS

| | | |
|---|---|---|
| JP | 2002-269254 A | 9/2002 |
| JP | 2004-287743 A | 10/2004 |
| JP | 2011-197929 A | 10/2011 |
| JP | 2014-002684 A | 1/2014 |
| JP | 2015-41128 A | 3/2015 |
| JP | 6250114 B1 | 12/2017 |
| KR | 2007-0101417 A | 10/2007 |
| KR | 2007-0103602 A | 10/2007 |
| KR | 2015-0041712 A | 4/2015 |
| KR | 2018-0035417 A | 4/2018 |
| WO | 2014/171104 A1 | 10/2014 |

OTHER PUBLICATIONS

Chinese Office Action issued Dec. 31, 2024, in corresponding Chinese Patent Application No. 202080107291.8, 19pp.
International Search Report and Written Opinion mailed on Feb. 2, 2021, received for PCT Application PCT/JP2020/044389, filed on Nov. 27, 2020, 8 pages including English Translation.
Notice of Reasons for Refusal mailed on Jun. 22, 2021, received for JP Application 2021-517080, 6 pages including English Translation.
Office Action issued on Aug. 9, 2023, in corresponding Taiwanese patent Application No. 110111052, 43 pages.
Office Action issued Mar. 18, 2024, in German Patent Application No. 11 2020 007 628.8, 23pp.
Office Action issued on Jul. 20, 2023, in corresponding Korean patent Application No. 10-2023-7016331, 11 pages.
Office Action issued May 31, 2025, in Chinese Patent Application No. 202080107291.8 which corresponds to the above-identified US application, 10pp.
Office Action issued Jan. 16, 2025, in corresponding Indian Patent Application No. 202347035788, 7pp.

* cited by examiner

FIG. 4

Select Article for Which Extended Guarantee Contract is Desired

[Package]

Display as List [Sort] [Refine]

---

Digital Camera Manufactured by
○○ Co., Ltd.
 Product Name: □□ Shot
 Model Number: DC-△△△△
 Date of Purchase: MM DD, YY
 Purchased at: ▽▽ Camera Co., Ltd.

Under Guarantee
Till MM DD, YY

Extended Guarantee Contract Available ?,??? Yen

Blanket Extended Guarantee Contract Item

---

Digital Video Camera Manufactured by
●● Co., Ltd.
 Product Name: ■■ Cam
 Model Number: DV-▲▲▲▲
 Date of Purchase: MM DD, YY
 Purchased at:
 ▼▼ Electronics Co., Ltd.

Under Guarantee
Till MM DD, YY

Extended Guarantee Contract Available ?,??? Yen

---

Digital TV Manufactured by ◎◎ Co., Ltd.
 Product Name: ☆☆ TV
 Model Number: DTV-★★★★
 Date of Purchase: MM DD, YY
 Purchased at: ▼▼ Electronics Co., Ltd.

Extended Guarantee Contract Available ?,??? Yen

---

Refrigerator Manufactured by ◎◎ Co., Ltd.
 Product Name: ◇◇◇◇
 Model Number: RE-◆◆◆◆
 Date of Purchase: MM DD, YY
 Purchased at: ▼▼ Electronics Co., Ltd.

Extended Guarantee Contract Available ?,??? Yen

Blanket Extended Guarantee Contract Item

---

Washing Machine Manufactured by ◎◎ Co., Ltd.

FIG. 5

Total Amount for Concluding Extended Guarantee Contracts for All Selected Articles: XX,XXX Yen
Total Amount after Discount by Blanket Extended Guarantee Contract: YY,YYY Yen Request Extended Guarantee Contract(s) for All Selected Articles  [ Request ]

Display as List  [ Sort ]  [ Refine ]

Digital Camera Manufactured by
○○ Co., Ltd.
Product Name: □□Shot
Model Number: DC-△△△△
Date of Purchase: MM DD, YY
Purchased at: ▽▽ Camera Co., Ltd.

Under Guarantee
Till MM DD, YY

Extended Guarantee Contract Available ?,??? Yen

Blanket Extended Guarantee Contract Item

Digital Video Camera Manufactured by
●● Co., Ltd.
Product Name: ■■Cam
Model Number: DV-▲▲▲▲
Date of Purchase: MM DD, YY
Purchased at:
▼▼ Electronics Co., Ltd.

Under Guarantee
Till MM DD, YY

Extended Guarantee Contract Available ?,??? Yen

Digital TV Manufactured by ◎◎ Co., Ltd.
Product Name: ☆☆TV
Model Number: DTV-★★★★
Date of Purchase: MM DD, YY
Purchased at: ▼▼ Electronics Co., Ltd.

Extended Guarantee Contract Available ?,??? Yen

Refrigerator Manufactured by ◎◎ Co., Ltd.
Product Name: ◇◇◇◇
Model Number: RF-◆◆◆◆
Date of Purchase: MM DD, YY
Purchased at: ▼▼ Electronics Co., Ltd.

Extended Guarantee Contract Available ?,??? Yen

Blanket Extended Guarantee Contract Item

Washing Machine Manufactured by ◎◎ Co., Ltd.

FIG. 6

Details

Digital Camera Manufactured by ○○ Co., Ltd.
  Product Name: □□ Shot
  Model Number: DC-△△△△
  Date of Purchase: MM DD, YY
  Purchased at: ▽▽ Camera Co., Ltd.
  Guarantee Period: Till MM DD, YY

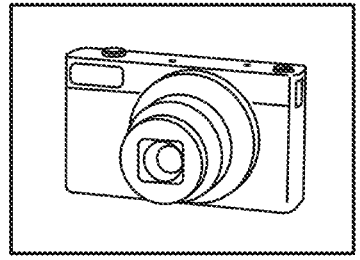

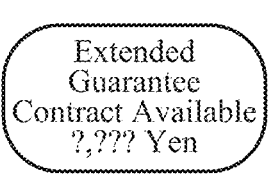

Contact Desk: &&&& Co., Ltd. Customer Support Center
Phone: ###-####-####          [ Call ]

Download User's Manual          [ Download ]

Price for Extended Guarantee Contract for This Article is ?,??? Yen

Request Extended Guarantee Contract Now   [ Request ]

Return to List   [ Return ]

FIG. 15

| Total Amount for Concluding Extended Guarantee Contracts for All Selected Articles: XX,XXX Yen |
| Total Amount after Discount by Blanket Extended Guarantee Contract: YY,YYY Yen |

Request Extended Guarantee Contract(s) for All Selected Articles  [ Request ]

Display as List  [ Sort ]  [ Refine ]

---

Digital Camera Manufactured by ○○ Co., Ltd.
 Product Name: □□ Shot
 Model Number: DC-△△△△
 Date of Purchase: MM DD, YY
 Purchased at: ▽▽ Camera Co., Ltd.

Under Guarantee
Till MM DD, YY

Extended Guarantee Contract Available ?,??? Yen

Blanket Extended Guarantee Contract Item

---

Digital Video Camera Manufactured by ●● Co., Ltd.
 Product Name: ■■ Cam
 Model Number: DV-▲▲▲▲
 Date of Purchase: MM DD, YY
 Purchased at: ▼▼ Electronics Co., Ltd.

Under Guarantee
Till MM DD, YY

Extended Guarantee Contract Available ?,??? Yen

---

Digital TV Manufactured by ◎◎ Co., Ltd.
 Product Name: ☆☆ TV
 Model Number: DTV-★★★★
 Date of Purchase: MM DD, YY
 Purchased at: ▼▼ Electronics Co., Ltd.

Extended Guarantee Contract Available ?,??? Yen

---

Refrigerator Manufactured by ◎◎ Co., Ltd.
 Product Name: ◇◇◇◇
 Model Number: RE-◆◆◆◆
 Date of Purchase: MM DD, YY
 Purchased at: ▼▼ Electronics Co., Ltd.

Extended Guarantee Contract Available ?,??? Yen

Blanket Extended Guarantee Contract Item

---

Washing Machine Manufactured by ◎◎ Co., Ltd.

FIG. 16

Please Enter User Information and Password Information

User

Password

User Authentication

FIG. 17

Details

Digital Camera Manufactured by
○○ Co., Ltd.
  Product Name: □□ Shot
  Model Number: DC-△△△△
  Date of Purchase: MM DD, YY
  Purchased at: ▽▽ Camera Co., Ltd.
  Guarantee Period: Till MM DD, YY

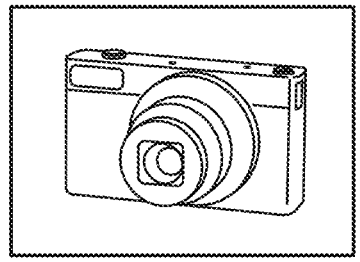

Under Guarantee

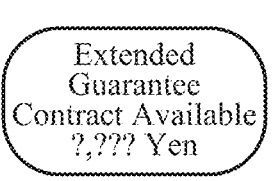
Extended Guarantee Contract Available ?,??? Yen

Blanket Extended Guarantee Contract Item

Contact Desk: &&&& Co., Ltd. Customer Support Center
Phone: ###-####-####    [ Call ]

Download User's Manual    [ Download ]

Price for Extended Guarantee Contract for This Article is ?,??? Yen

Request Extended Guarantee Contract Now    [ Request ]

Return to List    [ Return ]

FIG. 18C
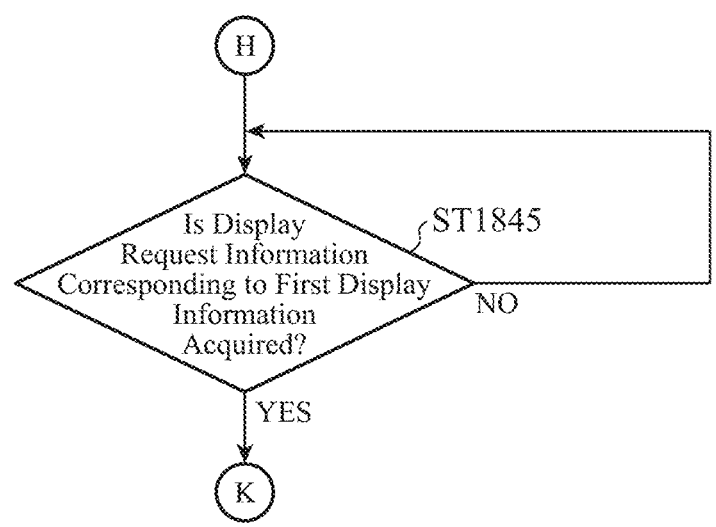
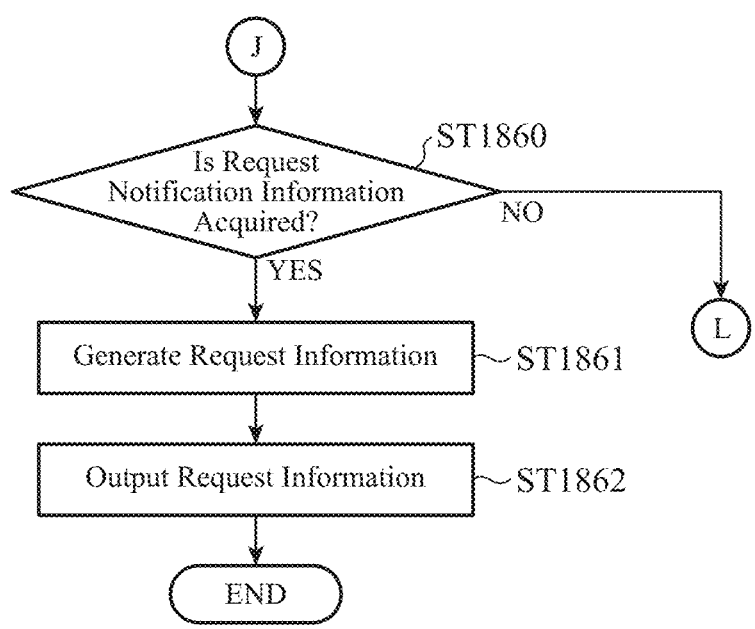

INFORMATION PROCESSING SYSTEM, INFORMATION PROCESSING METHOD, AND COMPUTER-READABLE STORAGE MEDIUM STORING INFORMATION PROCESSING PROGRAM

CROSS-REFERENCE TO RELATED APPLICATION

The present application is a bypass continuation of PCT filing PCT/JP2020/044389, filed on Nov. 27, 2020, the entire contents of which is hereby incorporated by reference.

TECHNICAL FIELD

The present disclosure relates to an information processing system, an information processing method, and a tangible, non-transitory computer-readable storage medium storing an information processing program.

BACKGROUND ART

In the technical field of managing an electronic warranty of an article, there is technology of managing, for an article owned by a user, article information indicating the article, user information indicating the user who owns the article, and the electronic warranty of the article in association with each other.

For example, Patent Literature 1 discloses technology related to a property management method in which a server accepts registration of property information together with user information input from a user terminal, an issuance request of an electronic warranty of the property is notified, thereby managing the electronic warranty.

CITATION LIST

Patent Literature

Patent Literature 1: JP 2002-269254 A

SUMMARY OF INVENTION

Technical Problem

In the technology disclosed in Patent Literature 1 (hereinafter referred to as "related art"), only one property can be selected at a time as a property for which issuance of the electronic warranty is requested when the issuance request of the electronic warranty of the property is notified. Therefore, in the related art, there is a problem that, in a case where there is a plurality of articles for which a user desires to execute predetermined processing such as an issuance request of an electronic warranty, the user needs to repeatedly select an article and execute the predetermined processing many times.

The present disclosure is intended to solve the above problems, and an object of the present disclosure is to provide an information processing system that enables a user to select one or more articles and to collectively request to execute predetermined processing on the selected one or more articles.

Solution to Problem

An information processing system of the present disclosure includes: an operation acquirer to acquire operation information based on user's operation; a display generator to generate display information indicating a display image in which article images corresponding to respective articles owned by a user are arranged; a display outputter to output the display information generated by the display generator; an article specifier to specify a selected article, which is an article, corresponding to each of a plurality of selected article images, which are a plurality of article images selected by the user's operation from among the plurality of article images included in the display image indicated by the display information generated by the display generator on the basis of the operation information acquired by the operation acquirer; a request generator to generate request information for requesting execution of predetermined processing regarding a plurality of the selected articles specified by the article specifier on the basis of the operation information acquired by the operation acquirer; and a request outputter to output the request information generated by the request generator.

Advantageous Effects of Invention

According to the present disclosure, a user can select one or more articles and collectively request to execute predetermined processing on the selected one or more articles.

BRIEF DESCRIPTION OF DRAWINGS

FIG. 4 is an explanatory diagram illustrating an example of a first display image indicated by first display information generated by a display generating unit included in the display control device according to the first embodiment.

FIG. 5 is an explanatory diagram illustrating an example of the first display image indicated by the first display information generated by the display generating unit included in the display control device according to the first embodiment.

FIG. 6 is an explanatory diagram illustrating an example of a second display image indicated by second display information generated by the display generating unit according to the first embodiment.

FIG. 15 is an explanatory diagram illustrating an example of a first display image indicated by first display information generated by a display generating unit according to the second embodiment.

FIG. 16 is an explanatory diagram illustrating an example of a user authentication display image indicated by user authentication display information generated by the display generating unit according to the second embodiment.

FIG. 17 is an explanatory diagram illustrating an example of a second display image indicated by second display information generated by the display generating unit according to the second embodiment.

FIG. 18C is a part of a flowchart illustrating an example of processing of the server device according to the second embodiment.

DESCRIPTION OF EMBODIMENTS

Figure 1:
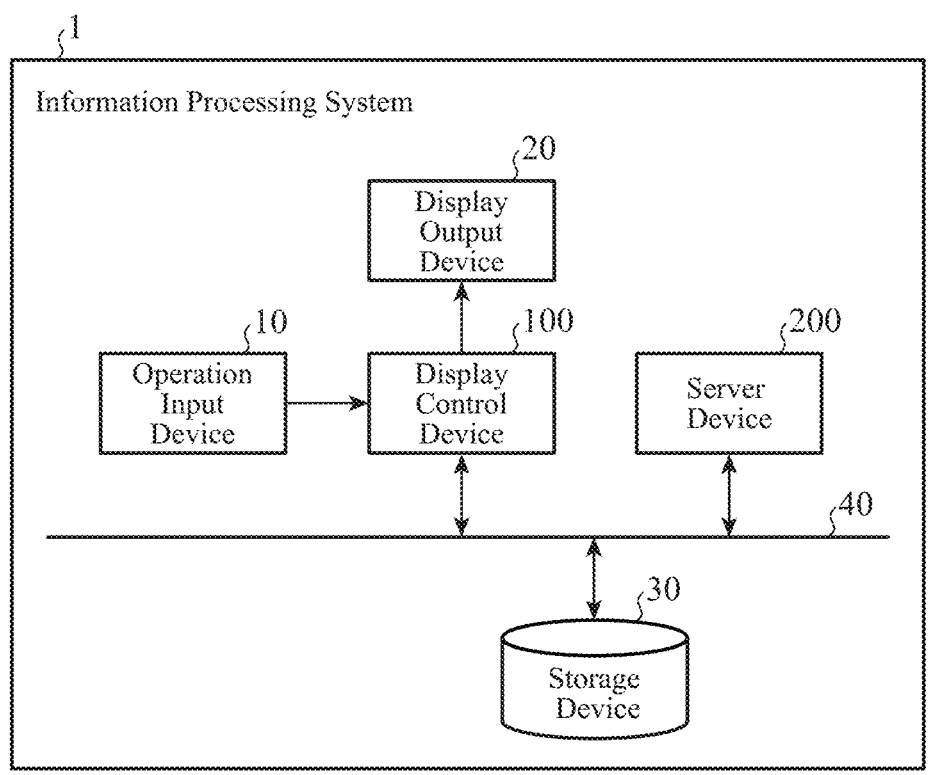
FIG. 1 is a block diagram illustrating an example of the configuration of the main part of an information processing system according to a first embodiment.

Hereinafter, embodiments of the present disclosure will be described in detail by referring to the drawings.

First Embodiment

An information processing system 1 according to a first embodiment will be described by referring to FIGS. 1 to 11.

The configuration of the main part of the information processing system 1 according to the first embodiment will be described by referring to FIG. 1.

FIG. 1 is a block diagram illustrating an example of the configuration of the main part of the information processing system 1 according to the first embodiment.

The information processing system 1 includes a display control device 100, a server device 200, an operation input device 10, a display output device 20, a storage device 30, and a network 40.

The operation input device 10 receives operation by a user (hereinafter referred to as "user's operation") on, for example, a keyboard, a mouse, or a touch panel and outputs operation information based on the user's operation to the display control device 100. The operation input device 10 is not limited to a device such as a keyboard, a mouse, or a touch panel and may be a speech operation input device including a speech input device such as a microphone (not illustrated) and a speech operation analysis unit (not illustrated in FIG. 1) that generates operation information on the basis of an electric signal output from the speech input device, and others as long as the device can output operation information based on user's operation.

The display output device 20 is a device such as a flat panel display such as a liquid crystal display or an organic electro-luminescence (EL) display and receives a display signal output from the display control device 100 and displays a display image indicated by the display signal.

The storage device 30 includes a storage medium such as a solid state drive (SSD) or a hard disk drive (HDD). The storage device 30 writes information in the storage medium in accordance with a write request from the outside of the device and reads information stored in the storage medium in accordance with a read request from the outside of the device.

The display control device 100 is disposed inside a general-purpose computer such as a personal computer or an electronic device such as a portable terminal such as a smartphone or a tablet terminal.

In a case where the display control device 100 is disposed inside a portable terminal, the display control device 100, the operation input device 10, and the display output device 20 are arranged in a housing of the single electronic device.

The server device 200 is disposed inside an electronic device such as a general-purpose computer such as a personal computer.

The display control device 100 and the server device 200 can mutually transmit and receive information via the network 40. Incidentally, the network 40 is a communication network such as a local area network (LAN), a wireless LAN, a radio communication line by long term evolution (LTE), the 5th generation mobile communication system, or others, or the Internet line.

Details of the display control device 100 and the server device 200 will be described later.

The storage device 30 is connected to the network 40, for example, and operates in accordance with a write request or a read request from the display control device 100 and the server device 200.

The storage device 30 is not limited to be connected to the network 40, and the storage device 30 may be disposed inside or outside the housing of the electronic device in which the server device 200 is disposed and connected to the server device 200 via a dedicated line.

For example, in a case where the storage device 30 is connected to the server device 200 via a dedicated line, the server device 200 can read information from the storage device 30 or write information in the storage device 30 only via the dedicated line without using the network 40. Furthermore, in this case, the display control device 100 can read information from the storage device 30 or write information in the storage device 30 via the network 40 and the server device 200.

In addition, the number of storage devices 30 is not limited to one, and there may be a storage device disposed inside or outside a housing of an electronic device in which the display control device 100 is disposed and connected to the display control device 100 via a dedicated line, separately from the storage device that is connected to the network 40 or the server device 200. Since the storage device 30 connected to the display control device 100 via the dedicated line stores a part or all of the information stored in the storage device 30 connected to the network 40 or the server device 200, the display control device 100 can read the same information as the information stored in the storage device 30 connected to the network 40 or the server device 200 from the storage device 30 connected to the display control device 100 via the dedicated line even when the display control device 100 is not connected to the network 40.

Hereinafter, description is given on the premise that the display control device 100, the server device 200, and the storage device 30 are connected to each other via the network 40.

The configuration of the main part of the display control device 100 according to the first embodiment will be described by referring to FIG. 2.

Figure 2:
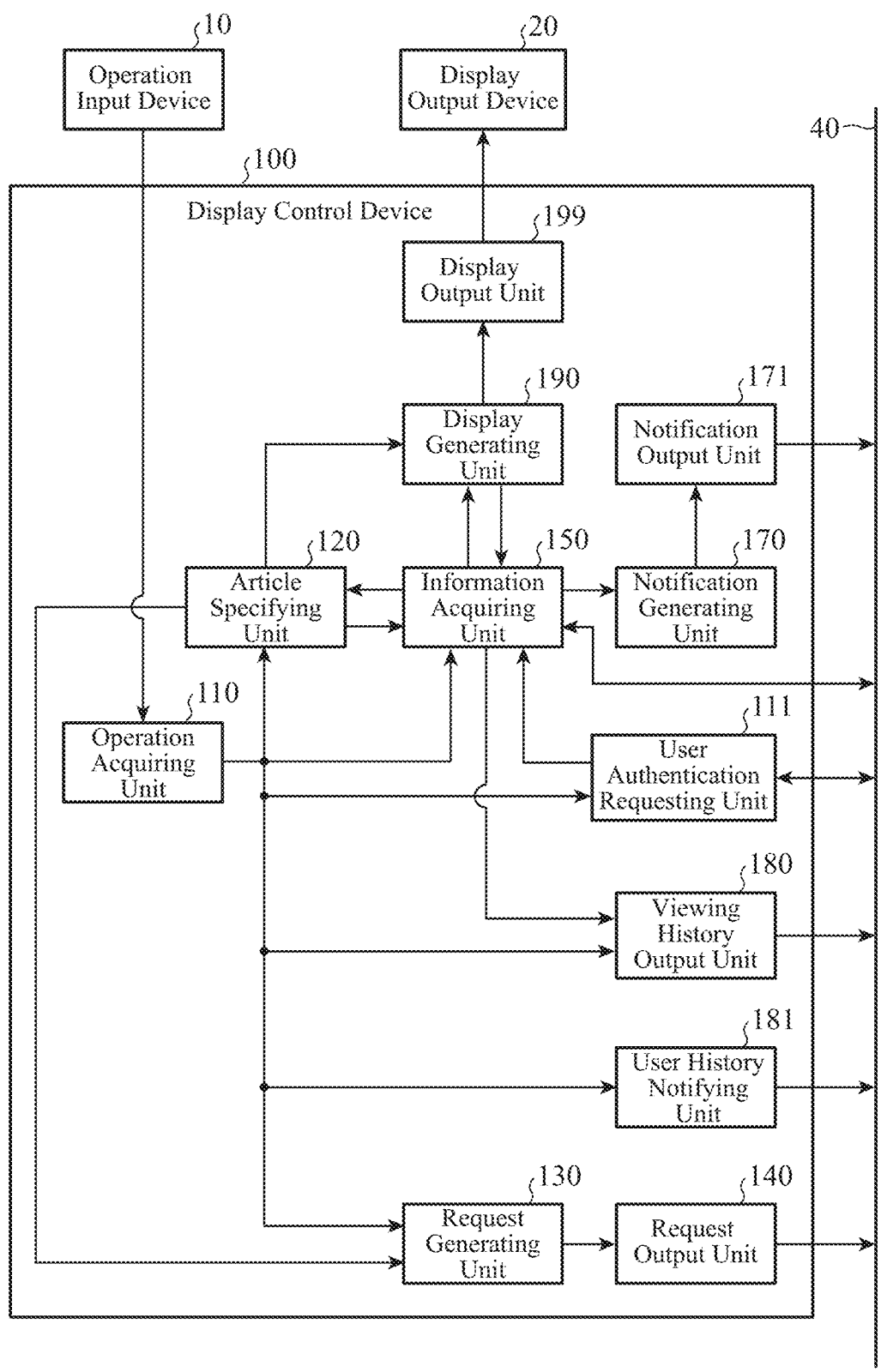
FIG. 2 is a block diagram illustrating an example of the configuration of the main part of a display control device according to the first embodiment.

FIG. 2 is a block diagram illustrating an example of the configuration of the main part of the display control device 100 according to the first embodiment.

The display control device 100 includes an operation acquiring unit 110, an information acquiring unit 150, a display generating unit 190, a display output unit 199, an article specifying unit 120, a request generating unit 130, and a request output unit 140.

In addition to the above configuration, the display control device 100 may further include a user authentication requesting unit 111, a notification generating unit 170, a notification output unit 171, a viewing history output unit 180, and a user history notifying unit 181.

As illustrated in FIG. 2, description will be given on the premise that the display control device 100 according to the first embodiment includes the operation acquiring unit 110, the user authentication requesting unit 111, the display generating unit 190, the display output unit 199, the article specifying unit 120, the request generating unit 130, the request output unit 140, the information acquiring unit 150, the notification generating unit 170, the notification output unit 171, the viewing history output unit 180, and the user history notifying unit 181.

The operation acquiring unit 110 acquires operation information based on user's operation. Specifically, the operation acquiring unit 110 acquires operation information output from the operation input device 10 with the user operating the operation input device 10.

The user authentication requesting unit 111 requests the server device 200 for user authentication on the basis of the operation information acquired by the operation acquiring unit 110. Specifically, for example, the operation acquiring unit 110 acquires user information indicating the user and password information indicating a password as the operation information. The user authentication requesting unit 111 transmits the user information and the password information acquired by the operation acquiring unit 110 to the server device 200 via the network 40. The server device 200 receives the user information and the password information transmitted by the user authentication requesting unit 111 included in the display control device 100 and compares the user information and the password information with user information and password information included in authentication information stored in advance in the storage device 30, thereby performing user authentication. The server device 200 transmits authentication result information indicating the authentication result to the display control device 100 via the network 40. The user authentication requesting unit 111 receives the authentication result information transmitted by the server device 200.

Incidentally, the user information indicating the user is, for example, information indicating a user identification (ID).

In the first embodiment, description is given on the premise that the user authentication requesting unit 111 transmits the user information and the password information to the server device 200, and the server device 200 performs user authentication on the basis of the user information and the password information. However, the user authentication may be executed by a functional block for performing user authentication (not illustrated in FIG. 2) in the display control device 100.

Hereinafter, a case where the authentication result indicated by the authentication result information received by the user authentication requesting unit 111 indicates successful authentication, that is, a case where the user information and the password information transmitted by the user authentication requesting unit 111 are the same as the user information and the password information included in the authentication information stored in advance in the storage device 30 will be described. Note that user information for which user authentication has been successful will be simply referred to as user information in the description below.

The display generating unit 190 generates display information indicating a display image in which article images corresponding to respective articles owned by the user are arranged.

Incidentally, an article is a tangible object or an intangible object to which a pledge can be set and does not include electronic data stored in a storage medium. In a case where an article is an intangible object, the article owned by a user is an insurance contract such as life insurance or non-life insurance or a contract between a third party and the user concluded by the user of, for example, a license agreement of application software or the like.

In addition, an article image is an image indicating an article and, for example, an image of characters indicating the name of the article. The article image is not limited to an image of characters indicating the name of the article and may be a still image obtained by photographing the article, an illustration image imitating the shape of the article, or others.

The information that is the source of the article image is stored in advance in the storage device 30 in a state of being associated with the user information included in the authentication information. The information is acquired by the information acquiring unit 150, for example.

Note that the display generating unit 190 may generate display information (hereinafter referred to as "user authentication display information") indicating a display image for user authentication (hereinafter referred to as "user authentication display image") for allowing the user to input the user information and the password information in addition to the display information indicating a display image in which article images corresponding to respective articles owned by the user are arranged.

The information acquiring unit 150 acquires information stored in the storage device 30 via the network 40 or the network 40 and the server device 200.

The configuration of the main part of the information acquiring unit 150 included in the display control device 100 according to the first embodiment will be described by referring to FIG. 3.

Figure 3:
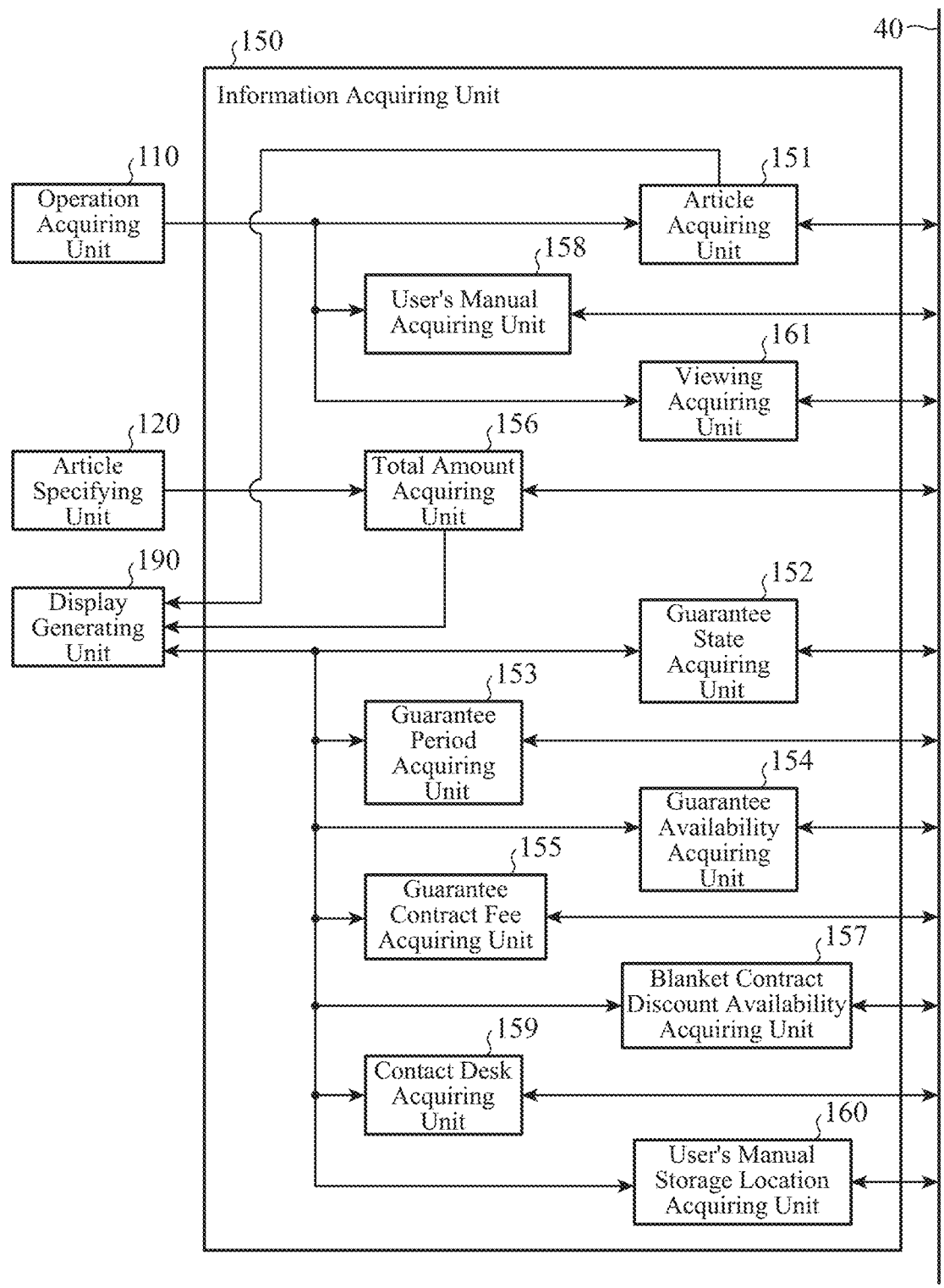
FIG. 3 is a block diagram illustrating an example of the configuration of the main part of an information acquiring unit included in the display control device according to the first embodiment.

FIG. 3 is a block diagram illustrating an example of the configuration of the main part of the information acquiring unit 150 included in the display control device 100 according to the first embodiment.

The information acquiring unit 150 includes an article acquiring unit 151. In addition to the article acquiring unit 151, the information acquiring unit 150 may further include a guarantee state acquiring unit 152, a guarantee period acquiring unit 153, a guarantee availability acquiring unit 154, a guarantee contract fee acquiring unit 155, a total amount acquiring unit 156, a blanket contract discount availability acquiring unit 157, a user's manual acquiring unit 158, a contact desk acquiring unit 159, a user's manual storage location acquiring unit 160, and a viewing acquiring unit 161.

Hereinafter, description will be given on the premise that the information acquiring unit 150 includes the article acquiring unit 151, the guarantee state acquiring unit 152, the guarantee period acquiring unit 153, the guarantee availability acquiring unit 154, the guarantee contract fee acquiring unit 155, the total amount acquiring unit 156, the blanket contract discount availability acquiring unit 157, the user's manual acquiring unit 158, the contact desk acquiring unit 159, the user's manual storage location acquiring unit 160, and the viewing acquiring unit 161.

The article acquiring unit 151 acquires a plurality of pieces of article information corresponding to the user information among the article information stored in advance in the storage device 30. Specifically, for example, the article acquiring unit 151 acquires a plurality of pieces of article information corresponding to the user information among the article information stored in advance in the storage device 30 via the server device 200. More specifically, for example, the article acquiring unit 151 requests the server device 200 for all pieces of article information corresponding to the user information. The server device 200 searches and acquires article information corresponding to the user information from among the article information stored in advance in the storage device 30 on the basis of the request and outputs the acquired article information to the display control device 100. The article acquiring unit 151 acquires a plurality of pieces of article information corresponding to the user information by acquiring the article information output by the server device 200.

Incidentally, the article information is, for example, character information indicating the name of the article. The article information is not limited to character information indicating the name of the article and may be information indicating a still image obtained by photographing the article or information indicating an illustration image imitating the shape or the like of the article. In addition, the article information may include, in addition to character information and the like, information indicating a manufacturer who manufactures the article, information indicating a serial number of the article, information indicating a date on which the article has been purchased or a date on which the article has been transferred, information indicating a seller from whom the article has been purchased or a transferer from whom the article has been transferred, and others.

The guarantee state acquiring unit 152, the guarantee period acquiring unit 153, the guarantee availability acquiring unit 154, the guarantee contract fee acquiring unit 155, the total amount acquiring unit 156, the blanket contract discount availability acquiring unit 157, the user's manual acquiring unit 158, the contact desk acquiring unit 159, the user's manual storage location acquiring unit 160, and the viewing acquiring unit 161 included in the information acquiring unit 150 will be described later.

The display generating unit 190 generates display information (hereinafter, referred to as "first display information") indicating a display image (hereinafter, referred to as a "first display image") in which article images corresponding to respective articles owned by the user is arranged on the basis of the article information acquired by the article acquiring unit 151.

The display output unit 199 outputs the display information generated by the display generating unit 190. Specifically, the display output unit 199 outputs the display information to the display output device 20, thereby causing the display output device 20 to display the display image indicated by the display information. For example, the display information output by the display output unit 199 is an electric signal indicating the display image. The user can cause the display control device 100 to perform desired processing by operating the operation input device 10 while viewing the display image displayed on the display output device 20.

For example, in a case where the display generating unit 190 generates the first display information, the display output unit 199 outputs the first display information generated by the display generating unit 190.

The article specifying unit 120 specifies articles (hereinafter, referred to as "selected articles") corresponding to one or more respective article images (hereinafter referred to as "selected article images") selected by user's operation on the basis of the operation information acquired by the operation acquiring unit 110 among the plurality of article images included in the first display image indicated by the first display information generated by the display generating unit 190.

When an article image is selected by user's operation, the display generating unit 190 may generate first display information indicating a first display image in which the background color of the article image selected by the user's operation among the plurality of article images included in the first display image is changed to a color different from the background color of an article image that is not selected.

With this configuration, the display control device 100 can cause the user to recognize which article image is selected by the user's operation.

The method of allowing the user to visually recognize the selected article image is not limited to the method of changing the background color of the selected article image to a color different from the background color of an article image that is not selected. For example, when the first display information is generated, the display generating unit 190 may generate the first display information indicating the first display image in which an image indicating a check box is associated with each of the plurality of article images, and, when an article image is selected by user's operation, the display generating unit 190 may generate the first display information indicating the first display image in which an image indicating a check box corresponding to the article image selected by the user's operation among the plurality of article images included in the first display image is changed to an image indicating the state in which the check box is checked.

The request generating unit 130 generates request information for requesting execution of predetermined processing regarding the one or more selected articles specified by the article specifying unit 120 on the basis of the operation information acquired by the operation acquiring unit 110.

The request output unit 140 outputs the request information generated by the request generating unit 130.

Specifically, for example, the request output unit 140 outputs the request information to the server device 200. The server device 200 acquires the request information output by the request output unit 140 and executes the predetermined processing regarding the one or more selected articles indicated by the request information on each of the one or more selected articles. More specifically, for example, the server device 200 sequentially executes the predetermined processing regarding one or more selected articles indicated by the request information on each of the one or more selected articles. In a case where there is a plurality of selected articles indicated by the request information, the server device 200 may perform the predetermined processing on the plurality of selected articles indicated by the request information by collectively performing the predetermined processing on two or more selected articles among the plurality of selected articles. Hereinafter, description will be given on the premise that the server device 200 sequentially executes the predetermined processing on one or more selected articles indicated by the request information.

Incidentally, examples of the predetermined processing regarding an article includes processing of concluding a guarantee contract of the article, processing for concluding a contract for extending a guarantee period of a guarantee contract already concluded for the article (hereinafter referred to as "extended guarantee contract"), processing for concluding a new guarantee contract (hereinafter referred to as "new guarantee contract") starting from with any time after the contract period of a guarantee contract already concluded for the article expires, or any time when the article is not guaranteed, such as a case where no guarantee has been available for the article when the article has been purchased or transferred.

For example, in a case where a home electric device and appliance (hereinafter referred to as "home electric appliance") is purchased at a store, a guarantee contract is often added to the home electric appliance so that a manufacturer who has manufactured the home electric appliance repairs or replaces the home electric appliance free of charge or the like in a case where a failure occurs in the home electric appliance during a predetermined period such as one year starting from the date of purchase when the home electric appliance has been purchased at the store. In recent years, there has been guarantee business operators such as a manufacturer, a distributor, or a guarantee company that provides services of an extended guarantee contract for further extending the guarantee for two years, four years, or the like for a fee after expiration of the guarantee contract that has been added when the home electric appliance has been purchased.

Hereinafter, description will be given on the premise that a guarantee company provides services of extended guarantee contracts and new guarantee contracts for a fee.

Hereinafter, extended guarantee contracts and new guarantee contracts are collectively referred to as "extended guarantee contracts."

In addition, hereinafter, a valid guarantee contract by the manufacturer of an article starting from the date of purchase when the article has been purchased and a valid extended guarantee contract that has been already concluded will be collectively referred to as the "guarantee contract," and a state in which the article is guaranteed by a guarantee contract will be referred to as "under guarantee."

In a case where the predetermined processing regarding an article is processing for concluding an extended guarantee contract of the article, the request generating unit 130 generates request information for requesting execution of processing for concluding the extended guarantee contract for the one or more selected articles specified by the article specifying unit 120 on the basis of the operation information acquired by the operation acquiring unit 110.

The server device 200 acquires the request information output by the request output unit 140 and executes processing for concluding an extended guarantee contract on the one or more selected articles indicated by the request information on each of the one or more selected articles. More specifically, for example, the server device 200 sequentially executes the processing for concluding an extended guarantee contract regarding the one or more selected articles indicated by the request information on each of the one or more selected articles. In a case where there is a plurality of selected articles indicated by the request information, the server device 200 may perform the processing for concluding an extended guarantee contract on the plurality of selected articles indicated by the request information by collectively performing the processing for concluding the extended guarantee contract on two or more selected articles among the plurality of selected articles.

The predetermined processing regarding the article is not limited to the processing for concluding the extended guarantee contract of the article.

For example, the predetermined processing regarding the article may be processing of selling the article on an auction site, a flea market site, or a used product sales site. In addition, the predetermined processing regarding the article may be processing of selling the article on a sales site in a case where the user is a seller or a wholesaler that sells new articles as a business. Moreover, the predetermined processing regarding the article may be processing of performing a procedure for recycling or discarding the article. Furthermore, in a case where the article is an insurance contract such as life insurance or non-life insurance signed by the user, the predetermined processing regarding the article may be processing of claiming an insurance money based on the insurance contract after an incident occurs that allows for an insurance claim due to a natural disaster or the like.

Hereinafter, in the first embodiment, description will be given on the premise that the predetermined processing regarding an article is processing for concluding an extended guarantee contract of the article.

The first display image indicated by the first display information generated by the display generating unit 190 included in the display control device 100 according to the first embodiment will be described by referring to FIG. 4.

FIG. 4 is an explanatory diagram illustrating an example of the first display image indicated by the first display information generated by the display generating unit 190 included in the display control device 100 according to the first embodiment.

As illustrated in FIG. 4, article images corresponding to respective articles owned by the user are arranged in the first display image indicated by the first display information generated by the display generating unit 190.

After selecting one or more article images among the plurality of article images illustrated in FIG. 4, the user collectively requests processing for concluding extended guarantee contracts for articles each corresponding to one of the one or more article images selected by the user.

With this configuration, the display control device 100 allows the user to select one or more articles and to collectively request to execute predetermined processing on the selected one or more articles. As a result, the information processing system 1 allows the user to select one or more articles and to collectively request to execute predetermined processing on the selected one or more articles.

The guarantee state acquiring unit 152 included in the information acquiring unit 150 acquires, for each of the plurality of articles owned by the user, guarantee state information indicating whether or not the article is guaranteed.

Specifically, for example, the guarantee state acquiring unit 152 acquires guarantee state information corresponding to each of the plurality of pieces of article information corresponding to the user information among guarantee state information stored in advance in the storage device 30. Specifically, for example, the guarantee state acquiring unit 152 acquires guarantee state information corresponding to each of the plurality of pieces of article information corresponding to the user information among the guarantee state information stored in advance in the storage device 30 via the server device 200. More specifically, for example, the guarantee state acquiring unit 152 requests the server device 200 for all pieces of guarantee state information corresponding to the user information. On the basis of the request, the server device 200 searches and acquires the guarantee state information corresponding to each of all the pieces of article information corresponding to the user information from the guarantee state information stored in advance in the storage device 30 and outputs the acquired guarantee state information to the display control device 100. The guarantee state acquiring unit 152 acquires a plurality of pieces of guarantee state information corresponding to the user information by acquiring the guarantee state information output by the server device 200.

Note that the guarantee state acquiring unit 152 may generate and acquire the guarantee state information indicating whether or not an article is guaranteed by determining whether or not it is in the guarantee period of the article indicated by the guarantee period information on the basis of the guarantee period information acquired by the guarantee period acquiring unit 153 to be described later. Incidentally, a guarantee period is a period during which the article is guaranteed by the guarantee contract of the article, and the article being guaranteed by the guarantee contract can receive the guarantee predetermined in the guarantee contract in a case where a failure occurs or the like.

Furthermore, the guarantee state acquiring unit 152 may request all pieces of guarantee state information corresponding to the user information from the server device 200, and the server device 200 may search and acquire guarantee period information corresponding to each of all pieces of article information corresponding to the user information from the guarantee period information stored in advance in the storage device 30 on the basis of the request. The server device 200 may generate the guarantee state information indicating whether or not the article is in the guaranteed state by determining whether or not it is in the guarantee period of the article indicated by the acquired guarantee period information and output the generated guarantee state information to the display control device 100, and the guarantee state acquiring unit 152 may acquire the plurality of pieces of guarantee state information corresponding to the user information by acquiring the guarantee state information output by the server device 200.

In a case where the information acquiring unit 150 includes the guarantee state acquiring unit 152, for example, in a case where guarantee state information corresponding to a certain article indicates that the article is in a guaranteed state on the basis of the guarantee state information acquired by the guarantee state acquiring unit 152, the display generating unit 190 generates the first display information indicating the first display image in which an image indicating that the article is in a guaranteed state (hereinafter referred to as an "under-guarantee image") is associated with an article image corresponding to the article. Note that the under-guarantee image may be, for example, an image obtained by making a graphic from characters indicating that the article is in a guaranteed state (hereinafter, referred to as a "under-guarantee character image") or an icon image indicating that the article is in a guaranteed state (hereinafter, referred to as an "under-guarantee icon image").

In the first display image illustrated in FIG. 4, as an example of the under-guarantee image, an under-guarantee icon image including characters "under guarantee" indicating that the article is in a guaranteed state is disposed in a heart-shaped graphic at a position corresponding to the article image. The under-guarantee image illustrated in FIG. 4 is merely an example, and the shape and the like of the under-guarantee image are not limited to those of the under-guarantee image illustrated in FIG. 4.

With the above configuration, the display control device 100 can allow the user to intuitively grasp which article is in a guaranteed state and which article is in a non-guaranteed state among the plurality of articles owned by the user. As a result, the information processing system 1 can allow the user to intuitively grasp which article is in a guaranteed state and which article is in a non-guaranteed state among the plurality of articles owned by the user.

Note that, in a case where guarantee state information corresponding to a certain article indicates that the article is in a non-guaranteed state on the basis of the guarantee state information acquired by the guarantee state acquiring unit 152, the display generating unit 190 may generate the first display information indicating the first display image in which an image indicating that the article is in the non-guaranteed state is associated with an article image corresponding to the article.

The guarantee period acquiring unit 153 included in information acquiring unit 150 acquires, for each of the plurality of articles owned by the user, guarantee period information indicating the guarantee period of the article.

Specifically, for example, the guarantee period acquiring unit 153 acquires guarantee period information corresponding to each of the plurality of pieces of article information corresponding to the user information among the guarantee period information stored in advance in the storage device 30. Specifically, for example, the guarantee period acquiring unit 153 acquires guarantee period information corresponding to each of the plurality of pieces of article information corresponding to the user information among the guarantee period information stored in advance in the storage device 30 via the server device 200. More specifically, for example, the guarantee period acquiring unit 153 requests the server device 200 for all pieces of guarantee period information corresponding to the user information. On the basis of the request, the server device 200 searches and acquires the guarantee period information corresponding to each of all the pieces of article information corresponding to the user information from the guarantee period information stored in advance in the storage device 30 and outputs the acquired guarantee period information to the display control device 100. The guarantee period acquiring unit 153 acquires a plurality of pieces of guarantee period information corresponding to the user information by acquiring the guarantee period information output from the server device 200.

In a case where the information acquiring unit 150 includes the guarantee period acquiring unit 153, for example, the display generating unit 190 generates the first display information indicating the first display image in which an image (hereinafter, referred to as a "guarantee period image") indicating the guarantee period of the article indicated by the guarantee period information is associated with an article image corresponding to the article on the basis of the guarantee period information acquired by the guarantee period acquiring unit 153. Note that the guarantee period image may be, for example, an image (hereinafter referred to as "guarantee period character image") obtained by making a graphic from characters indicating the guarantee period or characters indicating an end of the guarantee period or may indicate the guarantee period of the article by an under-guarantee image in a mode corresponding to the guarantee period of the article indicated by the guarantee period information.

In a case where an under-guarantee image indicates the guarantee period of an article, the display generating unit 190 generates the under-guarantee image having a mode corresponding to the guarantee period by changing the color of the under-guarantee image depending on, for example, the length of the remaining period of the guarantee period and generates the first display information indicating the first display image by associating the under-guarantee image with an article image corresponding to the article.

The mode of the under-guarantee image depending on the guarantee period is not limited to the one in which the color of the under-guarantee image is changed depending on the guarantee period and may be, for example, one in which the shape, the size, or the like of the under-guarantee image is changed depending on the guarantee period.

In the first display image illustrated in FIG. 4, a guarantee period character image, which is obtained by making characters indicating the end of the guarantee period into a graphic, is associated with an article image corresponding to the article as an example of the guarantee period image.

As described above, in a case where a guarantee period of an article is indicated by a difference in modes of the under-guarantee image, the display control device 100 can allow the user to intuitively grasp the article of which guarantee period is about to expire while allowing the user to intuitively grasp which article is in a guaranteed state and which article is in a non-guaranteed state among the plurality of articles owned by the user. As a result, the information processing system 1 can allow the user to intuitively grasp the article of which guarantee period is about to expire while allowing the user to intuitively grasp which article is in a guaranteed state and which article is in a non-guaranteed state among the plurality of articles owned by the user.

Furthermore, in a case where a guarantee period of an article is indicated by the guarantee period image in which characters indicating an end of the guarantee period is made into a graphic, the display control device 100 can allow the user to grasp the end of the guarantee period while allowing the user to intuitively grasp which article is in the guaranteed state and which article is in the non-guaranteed state among the plurality of articles owned by the user. As a result, the information processing system 1 can allow the user to grasp the end of the guarantee period while allowing the user to intuitively grasp which article is in a guaranteed state and which article is in a non-guaranteed state among the plurality of articles owned by the user.

Note that, on the basis of the guarantee period information acquired by the guarantee period acquiring unit 153, the display generating unit 190 may generate the first display information indicating the first display image in which an article image corresponding to an article is associated with a guarantee period image indicating the start of the guarantee period in addition to the guarantee period or the end of the guarantee period indicated by the guarantee period information corresponding to the article.

Moreover, in a case where the guarantee period information acquired by the guarantee period acquiring unit 153 includes information indicating the guarantee period of an extended guarantee contract of the article in which the guarantee period is extended after expiration of the guarantee contract of the article, the extended guarantee contract of the article having been already concluded, in addition to the information indicating the guarantee period of the guarantee contract of the article, the display generating unit 190 may generate the first display information indicating the first display image in which an image indicating the guarantee period of the extended guarantee contract of the article indicated by the guarantee period information is associated with the article image corresponding to the article in addition to the image (guarantee period image) indicating the guarantee period of the article indicated by the guarantee period information.

The guarantee availability acquiring unit 154 included in the information acquiring unit 150 acquires guarantee availability information indicating whether or not an extended guarantee contract is available for each of the plurality of articles owned by the user.

Specifically, for example, the guarantee availability acquiring unit 154 acquires guarantee availability information corresponding to each of the plurality of pieces of article information corresponding to the user information among guarantee availability information stored in advance in the storage device 30. Specifically, for example, the guarantee availability acquiring unit 154 acquires guarantee availability information corresponding to each of the plurality of pieces of article information corresponding to the user information among the guarantee availability information stored in advance in the storage device 30 via the server device 200. More specifically, for example, the guarantee availability acquiring unit 154 requests the server device 200 for all pieces of guarantee availability information corresponding to the user information. On the basis of the request, the server device 200 searches and acquires the guarantee availability information corresponding to each of all the pieces of article information corresponding to the user information from the guarantee availability information stored in advance in the storage device 30 and outputs the acquired guarantee availability information to the display control device 100. The guarantee availability acquiring unit 154 acquires a plurality of pieces of guarantee availability information corresponding to the user information by acquiring the guarantee availability information output by the server device 200.

In a case where the information acquiring unit 150 includes the guarantee availability acquiring unit 154, for example, as illustrated in FIG. 4, in a case where it is indicated that an extended guarantee contract is available with respect to guarantee availability information corresponding to a certain article on the basis of the guarantee availability information acquired by the guarantee availability acquiring unit 154, the display generating unit 190 generates the first display information indicating the first display image in which an image (hereinafter referred to as a "guarantee availability image") indicating that the extended guarantee contract is available is associated with the article image corresponding to the article.

With the above configuration, the display control device 100 can cause the user to grasp articles for which an extended guarantee contract can be concluded among the plurality of articles owned by the user. The information processing system 1 can cause the user to grasp an article for which an extended guarantee contract can be concluded among the plurality of articles owned by the user.

Note that the guarantee availability image illustrated in FIG. 4 is an image obtained by making a graphic from characters indicating that an extended guarantee contract is available (hereinafter referred to as a "guarantee availability character image"), however, the guarantee availability image illustrated in FIG. 4 is merely an example, and the guarantee availability image is not limited to the guarantee availability character image as long as the image indicates that an extended guarantee contract is available.

For example, the guarantee availability image may be a predetermined icon image (hereinafter referred to as a "guarantee availability icon image") indicating that an extended guarantee contract is available. Furthermore, for example, in a case where the guarantee availability image is the guarantee availability icon image and the image indicating that the article is in the guaranteed state is the under-guarantee icon image, the display generating unit 190 may generate the first display image in which the under-guarantee icon image indicating that the article is in the guaranteed state is superimposed with the guarantee availability icon image indicating availability of an extended guarantee contract for extending the guarantee period of the guarantee contract.

With the above configuration, the information processing system 1 can cause the user to intuitively grasp articles for which an extended guarantee contract can be concluded among the plurality of articles owned by the user.

In addition, in a case where the information acquiring unit 150 includes the guarantee availability acquiring unit 154, for example, in a case where guarantee availability information corresponding to a certain article indicates that no extended guarantee contract is available on the basis of the guarantee availability information acquired by the guarantee availability acquiring unit 154, the display generating unit 190 may generate the first display information indicating the first display image indicating that an article image indicating the article cannot be selected by user's operation.

Specifically, for example, the display generating unit 190 generates the first display information indicating the first display image indicating that an article image indicating an article for which no extended guarantee contract is available cannot be selected by user's operation by generating the first display information indicating the first display image in which the luminance of an article image indicating the article, for which no extended guarantee contract is available, is set to have a smaller value as compared to the luminance of another article image.

The method of generating, by the display generating unit 190, the first display information indicating the first display image indicating that the article image indicating the article, for which no extended guarantee contract is available, cannot be selected by user's operation is not limited to the method of generating the first display information indicating the first display image in which the luminance of the article image indicating the article, for which no extended guarantee contract is available, is set to have a smaller value as compared to the luminance of another article image.

Specifically, for example, the display generating unit 190 may generate the first display information indicating the first display image indicating that an article image indicating an article, for which no extended guarantee contract is available, cannot be selected by user's operation by generating the first display information indicating the first display image in which an image, which indicates a check box aligned in correspondence with the article image indicating the article for which no extended guarantee contract is available, is grayed out.

With the above configuration, the display control device 100 can allow the user to easily select, by user's operation, an article image corresponding to an article for which an extended guarantee contract can be concluded while allowing the user to easily grasp an article for which an extended guarantee contract can be concluded among the plurality of articles owned by the user. As a result, the information processing system 1 can allow the user to easily select, by user's operation, an article image corresponding to an article for which an extended guarantee contract can be concluded while allowing the user to easily grasp an article for which an extended guarantee contract can be concluded among the plurality of articles owned by the user.

In addition, in a case where the information acquiring unit 150 includes the guarantee availability acquiring unit 154, for example, in a case where guarantee availability information corresponding to a certain article indicates that no extended guarantee contract is available on the basis of the guarantee availability information acquired by the guarantee availability acquiring unit 154, the operation acquiring unit 110 may not acquire the operation information indicating user's operation for selecting an article image corresponding to the article.

Moreover, in a case where the information acquiring unit 150 includes the guarantee availability acquiring unit 154, the display generating unit 190 may generate display information indicating a notification image such as "No extended guarantee contract is available for the selected article." in a case where the operation information indicates user's operation of selecting the article image indicating the article for which no extended guarantee contract is available on the basis of the operation information acquired by the operation acquiring unit 110 and the guarantee availability information acquired by the guarantee availability acquiring unit 154.

For example, the display output unit 199 outputs display information indicating the notification image generated by the display generating unit 190 to the display output device 20 and causes the display output device 20 to display the notification image indicated by the display information by a pop-up.

With the above configuration, the display control device 100 can prevent the user from erroneously selecting the article image corresponding to the article by the user's operation with respect to an article for which an extended guarantee contract is not available among the plurality of articles owned by the user and outputting the request information for requesting an extended guarantee contract of the article. As a result, the information processing system 1 can prevent the user from erroneously selecting the article image corresponding to the article by the user's operation with respect to an article for which an extended guarantee contract is not available among the plurality of articles owned by the user and outputting the request information for requesting an extended guarantee contract of the article. In addition, with the above configuration, the display control device 100 can suppress an application for an extended guarantee contract to a guarantee company for an article for which the extended guarantee contract is not available, and thus both the business efficiency of the guarantee company and the customer satisfaction can be improved. As a result, the information processing system 1 can suppress an application for an extended guarantee contract to a guarantee company for an article for which the extended guarantee contract is not available, and thus both the business efficiency of the guarantee company and the customer satisfaction can be improved.

In a case where guarantee availability information corresponding to a certain article indicates that an extended guarantee contract is available on the basis of the guarantee availability information acquired by the guarantee availability acquiring unit 154, the guarantee contract fee acquiring unit 155 included in the information acquiring unit 150 acquires guarantee contract fee information indicating the guarantee contract fee which is the amount of money required for the extended guarantee contract of the article.

Specifically, for example, the guarantee contract fee acquiring unit 155 acquires the guarantee contract fee information corresponding to article information corresponding to the guarantee availability information indicating that an extended guarantee contract is available among the guarantee contract fee information stored in advance in the storage device 30. Specifically, for example, the guarantee contract fee acquiring unit 155 acquires, via the server device 200, guarantee contract fee information corresponding to each of one or more pieces of article information corresponding to the guarantee availability information indicating that an extended guarantee contract is available among the guarantee contract fee information stored in advance in the storage device 30. More specifically, for example, the guarantee contract fee acquiring unit 155 requests the guarantee contract fee information corresponding to all pieces of article information corresponding to the guarantee availability information indicating that an extended guarantee contract is available to the server device 200. On the basis of the request, the server device 200 searches and acquires guarantee contract fee information corresponding to each of all the pieces of article information corresponding to the guarantee availability information indicating that an extended guarantee contract is available from the guarantee contract fee information stored in advance in the storage device 30 and outputs the acquired guarantee contract fee information to the display control device 100. The guarantee contract fee acquiring unit 155 acquires a plurality of pieces of guarantee contract fee information corresponding to the user information by acquiring the guarantee contract fee information output from the server device 200.

In a case where the information acquiring unit 150 includes the guarantee contract fee acquiring unit 155, for example, as illustrated in FIG. 4, the display generating unit 190 generates the first display information indicating the first display image in which an image indicating the guarantee contract fee indicated by the guarantee contract fee information (hereinafter referred to as a "guarantee contract fee image") is associated with an article image indicating the article corresponding to the guarantee contract fee information on the basis of the guarantee contract fee information acquired by the guarantee contract fee acquiring unit 155. The guarantee contract fee image is, for example, a graphic of characters indicating the guarantee contract fee.

With the above configuration, the display control device 100 can allow the user to grasp the amount of money required for an extended guarantee contract of the article while allowing the user to grasp an article for which an extended guarantee contract is available among the plurality of articles owned by the user. As a result, the information processing system 1 can allow the user to grasp the amount of money required for an extended guarantee contract of the article while allowing the user to grasp an article for which an extended guarantee contract is available among the plurality of articles owned by the user.

The guarantee contract fee indicated by the guarantee contract fee information acquired by the guarantee contract fee acquiring unit 155 is not limited to one guarantee contract fee even for articles having the same model number.

For example, a guarantee contract fee for an extended guarantee contract of an article may differ depending on the number of days elapsed from the date of purchase of the article even for articles having the same model number.

In this case, for example, the guarantee contract fee information may include information indicating the guarantee contract fee corresponding to the number of days elapsed from the date of purchase, and the display generating unit 190 may specify the guarantee contract fee of the article on the basis of the guarantee contract fee information and the number of days elapsed from the date of purchase of the article corresponding to the guarantee contract fee information and generate the first display information indicating the first display image in which a guarantee contract fee image indicating the specified guarantee contract fee is associated.

Moreover, in this case, for example, the guarantee contract fee information may include information indicating a calculation formula for calculating the guarantee contract fee on the basis of the number of days elapsed from the date of purchase, and the display generating unit 190 may specify the guarantee contract fee of the article by calculating the guarantee contract fee on the basis of the guarantee contract fee information and the number of days elapsed from the date of purchase of the article corresponding to the guarantee contract fee information and generate the first display information indicating the first display image in which a guarantee contract fee image indicating the specified guarantee contract fee is associated.

Note that, when searching for the guarantee contract fee information corresponding to all the respective pieces of article information corresponding to the guarantee availability information indicating that an extended guarantee contract is available from among the guarantee contract fee information stored in advance in the storage device 30, the server device 200 may search for and acquire the guarantee contract fee information on the basis of information indicating the date of purchase of the articles included in the respective pieces of article information and output the acquired guarantee contract fee information to the display control device 100. By configuring the server device 200 in this manner, even in this case, the information processing system 1 can generate the first display information indicating the first display image in which the guarantee contract fee image indicating the guarantee contract fee corresponding to the number of days elapsed from the date of purchase of the article without imposing an extra load on the display control device 100.

Meanwhile, for example, in a case where the user selects a "sort" button illustrated in FIG. 4 by predetermined user's operation such as single tap or single click, that is, in a case where the operation acquiring unit 110 acquires operation information based on the user's operation of selecting the "sort" button, the display generating unit 190 may generate the first display information in which the arrangement order of the article images in the first display image is changed. Specifically, for example, in this case, the display generating unit 190 determines the arrangement order of the article images in the first display image in accordance with a predetermined sorting condition based on information such as the article information associated with the articles corresponding to the respective article images, the guarantee state information, the guarantee period information, or the guarantee availability information and generates the first display information indicating the first display image in which the article images are arranged in accordance with the determined arrangement order.

With this configuration, the display control device 100 can allow the user to find a desired article image in a short time even in a case where a large number of article images are arranged in the first display image. As a result, the information processing system 1 can allow the user to find a desired article image in a short time even in a case where a large number of article images are arranged in the first display image.

Furthermore, for example, in a case where the user selects a "refine" button illustrated in FIG. 4 by predetermined user's operation such as single tap or single click, that is, in a case where the operation acquiring unit 110 acquires operation information based on the user's operation of selecting the "refine" button, the display generating unit 190 may generate the first display information in which only article images conforming to a condition designated by the user are arranged from among the plurality of article images included in the first display image. Specifically, for example, in this case, the display generating unit 190 extracts, from the plurality of article images included in the first display image, an article image conforming to information designated by the user from information such as the article information, the guarantee state information, the guarantee period information, or the guarantee availability information associated with the articles corresponding to the respective article images. The display generating unit 190 generates the first display information indicating the first display image in which only the extracted article images are arranged.

With this configuration, the display control device 100 can allow the user to find a desired article image in a short time even in a case where a large number of article images are arranged in the first display image. As a result, the information processing system 1 can allow the user to find a desired article image in a short time even in a case where a large number of article images are arranged in the first display image.

The total amount acquiring unit 156 included in the information acquiring unit 150 acquires total amount information indicating the total amount of respective guarantee contract fees of one or more selected articles specified by the article specifying unit 120.

Specifically, for example, the total amount acquiring unit 156 requests the server device 200 for the total amount information indicating the total amount, which is the fee required for concluding extended guarantee contracts for all of the one or more selected articles. More specifically, for example, the total amount acquiring unit 156 outputs selected article information, which is article information indicating each of the one or more selected articles, to the server device 200 and requests total amount information indicating the total amount, which is the fee required for concluding the extended guarantee contract for all the selected articles indicated by one or more respective pieces of selected article information. The server device 200 searches and acquires guarantee contract fee information corresponding to each of one or more selected articles from the guarantee contract fee information stored in advance in the storage device 30 on the basis of the request. The server device 200 further calculates the total amount by adding up the guarantee fees indicated by all the acquired respective pieces of guarantee contract fee information and outputs total amount information indicating the total amount to the display control device 100. Total amount acquiring unit 156 acquires the total amount information by acquiring the total amount information output from the server device 200.

The method by which the total amount acquiring unit 156 acquires the total amount information is not limited to the method of requesting the server device 200 for the total amount information. For example, the total amount acquiring unit 156 may calculate the total amount by adding up the respective guarantee contract fees of the one or more selected articles on the basis of the guarantee contract fee information acquired by the guarantee contract fee acquiring unit 155 and the one or more selected articles specified by the article specifying unit 120 and acquire the total amount information indicating the total amount.

In a case where the information acquiring unit 150 includes the guarantee availability acquiring unit 154 and the total amount acquiring unit 156, the display generating unit 190 generates the first display information indicating the first display image in which a total amount image indicating the total amount indicated by the total amount information acquired by the total amount acquiring unit 156 is included in the first display image indicated by the first display information.

Specifically, for example, the display control device 100 transmits the selected article information to the server device 200 every time the user selects an article image by user's operation, and the total amount acquiring unit 156 acquires the total amount information corresponding to the selected article information every time the selected article information is acquired. Furthermore, every time the total amount acquiring unit 156 acquires the total amount information, the display generating unit 190 generates the first display information indicating the first display image including the total amount image indicating the total amount indicated by the total amount information.

Note that the display control device 100 may transmit the selected article information to the server device 200 every time the user cancels the selection of an article image by user's operation from the article images that have been already selected by user's operation.

In addition, every time the total amount acquiring unit 156 acquires the total amount information, when generating the first display information indicating the first display image including the total amount image indicating the total amount indicated by the total amount information, the display generating unit 190 may generate the first display information indicating the first display image including the total amount image expressed by animation of the transition from the total amount indicated by the total amount image in the first display image indicated by the first display information generated immediately before by the display generating unit 190 to the total amount indicated by the total amount information acquired by the total amount acquiring unit 156.

The first display image indicated by the first display information generated by the display generating unit 190 included in the display control device 100 according to the first embodiment will be described by referring to FIG. 5.

FIG. 5 is an explanatory diagram illustrating an example of the first display image indicated by the first display information generated by the display generating unit 190 included in the display control device 100 according to the first embodiment.

As illustrated in FIG. 5, article images corresponding to respective articles owned by the user are arranged in the first display image indicated by the first display information generated by the display generating unit 190. In addition, in the first display image illustrated in FIG. 5, a total amount image indicating a total amount in a case where all the articles corresponding to three respective article images selected by the user by user's operation are subjected to an extended guarantee contract is arranged at an upper portion of the first display image.

With the above configuration, the display control device 100 can present, to the user, the total amount required when the user concludes an extended guarantee contract for all the articles for which the user desires an extended guarantee contract while allowing the user to select an article image corresponding to the article for which the user desires the extended guarantee contract among the plurality of articles owned by the user. As a result, the information processing system 1 can present, to the user, the total amount required when the user concludes an extended guarantee contract for all the articles for which the user desires an extended guarantee contract while allowing the user to select an article image corresponding to the article for which the user desires the extended guarantee contract among the plurality of articles owned by the user.

In addition to acquiring the total amount information, in a case where the amount of money required for extended guarantee contracts is discounted by concluding a blanket extended guarantee contract for all of two or more selected articles among the plurality of selected articles specified by the article specifying unit 120, the total amount acquiring unit 156 may acquire discount amount information indicating the amount of money discounted from the total amount in a case where the blanket extended guarantee contract is concluded (hereinafter referred to as the "discount amount") or the total amount after the discount obtained by subtracting the discount amount from the total amount in a case where the blanket guarantee contract is concluded (hereinafter referred to as the "discounted amount").

Specifically, for example, the total amount acquiring unit 156 requests the server device 200 for the total amount information indicating the total amount, which is the fee required for concluding extended guarantee contracts for all of the plurality of selected articles. More specifically, for example, the total amount acquiring unit 156 outputs selected article information, which is article information indicating each of the one or more selected articles, to the server device 200 and requests total amount information indicating the total amount, which is the fee required for concluding the extended guarantee contract for all the selected articles indicated by one or more respective pieces of selected article information.

The server device 200 searches and acquires guarantee contract fee information corresponding to each of the plurality of selected articles from the guarantee contract fee information stored in advance in the storage device 30 on the basis of the request. The server device 200 further calculates the total amount by adding up the guarantee fees indicated by all the acquired respective pieces of guarantee contract fee information and outputs total amount information indicating the total amount to the display control device 100.

In addition, in a case where the amount of money required for extended guarantee contracts is discounted by concluding a blanket extended guarantee contract for all of two or more selected articles among the plurality of selected articles, the server device 200 acquires discount information indicating a predetermined discount amount discounted when the blanket extended guarantee contract is concluded or the discount rate.

Incidentally, the discount amount or the discount rate indicated by the discount information is predetermined on the basis of, for example, the number of selected articles, a predetermined combination of selected articles of different types, the number of selected articles of the same type, the total amount obtained by adding up guarantee fees indicated by the guarantee contract fee information corresponding to the respective selected articles, or others.

Specifically, for example, the discount amount predetermined on the basis of the number of selected articles is an amount of money calculated by multiplying the discount amount serving as a reference (hereinafter referred to as the "reference discount amount") by n in a case where the number of selected articles is n (n is a natural number greater than or equal to 2).

In addition, for example, the discount rate predetermined on the basis of the number of selected articles is for calculating the discount amount corresponding to a predetermined rate such as n % of the total amount obtained by adding up the guarantee fees indicated by the guarantee contract fee information corresponding to the respective selected articles in a case where the number of selected articles is n.

In addition, for example, the discount amount predetermined on the basis of a predetermined combination of selected articles of different types is a predetermined amount of money in a case where the selected articles are of a predetermined combination of different types, such as a case where the selected articles are a washing machine and a refrigerator.

In addition, for example, the discount rate predetermined on the basis of a predetermined combination of selected articles of different types is for calculating an amount of money corresponding to a predetermined rate such as 30% of the total amount obtained by adding up guarantee fees indicated by the guarantee contract fee information corresponding to the respective selected articles corresponding to the combination in a case where the selected articles are of a predetermined combination of different types such as a case where the selected articles are a washing machine and a refrigerator.

Furthermore, for example, the discount amount predetermined on the basis of the number of selected articles of the same type is an amount of money calculated by multiplying the reference discount amount predetermined for each type by n where the number of selected articles of the same type is n, such as a case where the selected articles are n air conditioners.

In addition, for example, the discount rate predetermined on the basis of the number of selected articles of the same type is for calculating the discount amount corresponding to a predetermined rate such as n % of the total amount obtained by adding up the guarantee fees indicated by the guarantee contract fee information corresponding to the respective selected articles where the number of selected articles of the same type is n, such as a case where the selected articles are n air conditioners.

Meanwhile, for example, the discount amount predetermined on the basis of the total amount obtained by adding up the guarantee fees indicated by the guarantee contract fee information corresponding to the respective selected articles is a predetermined amount of money corresponding to the total amount obtained by adding up the guarantee fees indicated by the guarantee contract fee information corresponding to the respective selected articles.

Meanwhile, for example, the discount rate predetermined on the basis of the total amount obtained by adding up the guarantee fees indicated by the guarantee contract fee information corresponding to the respective selected articles is a predetermined rate corresponding to the total amount obtained by adding up the guarantee fees indicated by the guarantee contract fee information corresponding to the respective selected articles, the predetermined rate for calculating an amount of money corresponding to a predetermined rate such as 30% of the total amount.

The server device 200 calculates the discount amount at the time of concluding the blanket extended guarantee contract on the basis of the acquired discount information and generates discount amount information indicating the discount amount. The server device 200 outputs the generated discount amount information to display control device 100 in addition to the total amount information. The discount amount information output from the server device 200 is not limited to the information indicating the discount amount at the time of concluding the blanket extended guarantee contract. For example, server device 200 may output, to display control device 100, information indicating the discounted amount that is the total amount obtained by subtracting the discount amount from the total amount as the discount amount information. The total amount acquiring unit 156 acquires the discount amount information in addition to the total amount information by acquiring the total amount information and the discount amount information output from the server device 200.

The total amount acquiring unit 156 may acquire the total amount information and the discount amount information by the following method.

For example, first, the user selects a "package" button as illustrated in FIG. 4 by predetermined user's operation such as single tap or single click. When the "package" button is selected by user's operation, the operation acquiring unit 110 acquires operation information based on the user's operation. After the operation acquiring unit 110 acquires the operation information based on the user's operation, the display generating unit 190 generates a plan image (not illustrated in FIG. 4) indicating each of one or more package plans and generates plan selecting menu information indicating a plan selecting menu image (not illustrated in FIG. 4) in which one or more plan images that have been generated are arranged. The display output unit 199 outputs the plan selecting menu information generated by the display generating unit 190 to the display output device 20 and causes the display output device 20 to display the plan selecting menu image (not illustrated in FIG. 4) indicated by the plan selecting menu information.

The user selects a desired package plan from among the one or more package plans by selecting a desired plan image from among the one or more plan images included in the plan selecting menu image by user's operation.

Incidentally, in a package plan, for example, in a case where the number of selected articles is less than or equal to a predetermined number such as five or less, the amount of money required for concluding all the extended guarantee contracts of the plurality of selected articles is a predetermined maximum amount regardless of the total amount obtained by adding up the guarantee fees indicated by the guarantee contract fee information corresponding to the respective selected articles (hereinafter, this package plan is referred to as "the number-of-items plan").

In a package plan, for example, in a case where the total amount obtained by adding up the guarantee fees indicated by the guarantee contract fee information corresponding to the respective selected articles is less than or equal to a predetermined amount of money (hereinafter referred to as the "allowable amount of money"), the amount of money required for concluding all the extended guarantee contracts of the plurality of selected articles is a predetermined maximum amount of money regardless of the total amount (hereinafter, this package plan is referred to as "the price plan").

When a plan image is selected by user's operation, the operation acquiring unit 110 acquires operation information based on the user's operation. When the operation acquiring unit 110 acquires the operation information based on the user's operation, the total amount acquiring unit 156 outputs, to the server device 200, plan information corresponding to a package plan indicated by the plan image selected by the user's operation.

Upon receiving the plan information output by the total amount acquiring unit 156, the server device 200 outputs, to the display control device 100, the total amount information indicating the total amount obtained by adding up the guarantee fees indicated by the guarantee contract fee information corresponding to the one or more respective selected articles, information indicating the maximum amount of money in the package plan corresponding to the plan information, or the discount amount information indicating the amount of money obtained by subtracting the maximum amount of money from the total amount.

The total amount acquiring unit 156 acquires the total amount information and the discount amount information output from the server device 200.

Note that, in a case where the package plan indicated by the plan image selected by the user's operation is the number-of-items plan, the operation acquiring unit 110 may be configured not to acquire operation information based on user's operation of further selecting an article when the number of selected articles has reached a predetermined number.

Furthermore, in a case where the package plan indicated by the plan image selected by the user's operation is the number-of-items plan, when the number of selected articles exceeds a predetermined number, the display generating unit 190 may generate notification display information for notifying the user that articles exceeding the predetermined number have been selected, and the display output unit 199 may output the notification display information generated by the display generating unit 190 to the display output device 20.

For example, the image indicated by the notification display information generated by the display generating unit 190 is displayed on the display output device 20 in a pop-up manner.

For example, when the number of selected articles is reduced by user's operation and the number of selected articles becomes less than or equal to the predetermined number, the display generating unit 190 stops generating the notification display information and prevents the pop-up from being displayed on the display output device 20.

Likewise, in a case where the package plan indicated by the plan image selected by the user's operation is the price plan, when the total amount obtained by adding up the guarantee fees indicated by the guarantee contract fee information corresponding to the respective selected articles exceeds the predetermined allowable amount of money, the display generating unit 190 may generate notification display information for notifying the user that the total amount exceeds the allowable amount, and the display output unit 199 may output the notification display information generated by the display generating unit 190 to the display output device 20.

For example, the image indicated by the notification display information generated by the display generating unit 190 is displayed on the display output device 20 in a pop-up manner.

For example, when the number of selected articles is reduced by user's operation and the total amount becomes less than or equal to the predetermined allowable amount of money, the display generating unit 190 stops generating the notification display information and prevents the pop-up from being displayed on the display output device 20.

In a case where the total amount acquiring unit 156 acquires the total amount information and the discount amount information, for example, as illustrated in FIG. 5, in addition to the total amount image, the display generating unit 190 generates the first display information indicating the first display image in which a discount amount image, indicating the discount amount at the time of concluding the blanket extended guarantee contract or the amount after the discount at the time of concluding the blanket extended guarantee contract indicated by the discount amount information acquired by the total amount acquiring unit 156, is associated with the total amount image.

With the above configuration, the display control device 100 can present, to the user, the amount of money discounted or the total amount after the discount when the user concludes an extended guarantee contract for all the articles for which the user desires an extended guarantee contract in addition to the total amount required when the user concludes an extended guarantee contract for all the articles for which the user desires an extended guarantee contract while allowing the user to select an article image corresponding to the article for which the user desires the extended guarantee contract among the plurality of articles owned by the user. As a result, the information processing system 1 can present, to the user, the amount of money discounted or the total amount after the discount when the user concludes an extended guarantee contract for all the articles for which the user desires an extended guarantee contract t in addition to the total amount required when the user concludes an extended guarantee contract for all the articles for which the user desires an extended guarantee contract while allowing the user to select an article image corresponding to the article for which the user desires the extended guarantee contract among the plurality of articles owned by the user.

In a case where the article specifying unit 120 specifies a plurality of selected articles, the blanket contract discount availability acquiring unit 157 included in the information acquiring unit 150 acquires the blanket contract discount availability information indicating whether or not an amount of money required for the extended guarantee contract is discounted by concluding the blanket extended guarantee contract for all of two or more selected articles among the plurality of selected articles specified by the article specifying unit 120.

Specifically, for example, the blanket contract discount availability acquiring unit 157 acquires, via the server device 200, the blanket contract discount availability information corresponding to article information corresponding to the respective articles owned by the user from among the blanket contract discount availability information stored in advance in the storage device 30. More specifically, for example, the blanket contract discount availability acquiring unit 157 requests the server device 200 for the blanket contract discount availability information corresponding to the article information corresponding to the respective articles owned by the user. The server device 200 searches and acquires blanket contract discount availability information corresponding to the article information corresponding to the respective articles owned by the user from the blanket contract discount availability information stored in advance in the storage device 30 on the basis of the request and outputs the acquired blanket contract discount availability information to the display control device 100. The blanket contract discount availability acquiring unit 157 acquires the blanket contract discount availability information corresponding to the respective pieces of article information by acquiring the blanket contract discount availability information output by the server device 200.

In a case where the information acquiring unit 150 includes the blanket contract discount availability acquiring unit 157, as illustrated in FIG. 5, the display generating unit 190 generates the first display information indicating the first display image in which an image (hereinafter, referred to as the "blanket-discounted item image"), indicating that the article is an article for which the amount of money required for an extended guarantee contract is discounted by concluding a blanket extended guarantee contract, is associated with an article image indicating an article corresponding to the blanket contract discount availability information on the basis of the blanket contract discount availability information acquired by the blanket contract discount availability acquiring unit 157.

Note that the blanket-discounted item image illustrated in FIG. 5 is an image (hereinafter referred to as "blanket-discounted item character image") obtained by making a graphic of characters indicating that the article is a target article for which the amount of money required for an extended guarantee contract is discounted by concluding a blanket extended guarantee contract. The blanket-discounted item image illustrated in FIG. 5 is merely an example, and the blanket-discounted item image is not limited to the blanket-discounted item character image. For example, the blanket-discounted item image may be an icon image (hereinafter referred to as the "blanket-discounted item icon image") indicating that the article is a target article for which the amount of money required for an extended guarantee contract is discounted by concluding a blanket extended guarantee contract.

With the above configuration, the display control device 100 allows the user to grasp an article, for which the amount of money required for an extended guarantee contract is discounted by concluding a blanket extended guarantee contract, while allowing the user to grasp an article for which an extended guarantee contract is available among the plurality of articles owned by the user. As a result, the information processing system 1 allows the user to grasp an article, for which the amount of money required for an extended guarantee contract is discounted by concluding a blanket extended guarantee contract, while allowing the user to grasp an article for which an extended guarantee contract is available among the plurality of articles owned by the user.

The blanket contract discount availability information acquired by the blanket contract discount availability acquiring unit 157 may include information indicating the discount amount or the discount rate applied in a case where a blanket extended guarantee contract is concluded for the article as information in a case where the amount of money required for an extended guarantee contract of the article is discounted by concluding the blanket extended guarantee contract.

For example, in a case where the amount of money required for the extended guarantee contract of the article is discounted by concluding the blanket extended guarantee contract, the server device 200 acquires discount information corresponding to the article and outputs the acquired discount information to the display control device 100 as the blanket contract discount availability information.

In a case where the blanket contract discount availability information includes the information indicating the discount amount or the discount rate, for example, the display generating unit 190 may generate, on the basis of the blanket contract discount availability information, the first display information indicating the first display image, in which the blanket-discounted item image indicating the article is an article for which the amount of money required for an extended guarantee contract is discounted by concluding a blanket extended guarantee contract, the blanket-discounted item image indicating the discount amount or the discount rate applied to the extended guarantee contract of the article in a case where the blanket extended guarantee contract is concluded, is associated with an article image indicating the article corresponding to the blanket contract discount availability information.

With this configuration, the display control device 100 allows the user to grasp an article, for which the amount of money required for an extended guarantee contract is discounted by concluding a blanket extended guarantee contract, while allowing the user to grasp an article for which an extended guarantee contract is available among the plurality of articles owned by the user. Furthermore, in a case where a blanket extended guarantee contract is concluded for an article for which the amount of money required for an extended guarantee contract is discounted by concluding the blanket extended guarantee contract, the display control device 100 can allow the user to grasp the discount amount or the discount rate applied to the extended guarantee contract of the article. As a result, the information processing system 1 allows the user to grasp an article, for which the amount of money required for an extended guarantee contract is discounted by concluding a blanket extended guarantee contract, while allowing the user to grasp an article for which an extended guarantee contract is available among the plurality of articles owned by the user. Furthermore, in a case where a blanket extended guarantee contract is concluded for an article for which the amount of money required for an extended guarantee contract is discounted by concluding the blanket extended guarantee contract, the information processing system 1 can allow the user to grasp the discount amount or the discount rate applied to the extended guarantee contract of the article.

Note that, as described above, the discount amount or the discount rate indicated is determined on the basis of, for example, the number of selected articles, a predetermined combination of selected articles of different types, the number of selected articles of the same type, the total amount obtained by adding up guarantee fees indicated by the guarantee contract fee information corresponding to the respective selected articles, or others. Therefore, the discount amount or the discount rate indicated by the blanket-discounted item image included in the first display image indicated by the first display information dynamically fluctuates depending on the number of selected articles, the type of selected articles, the number of selected articles of the same type, the total amount obtained by adding up guarantee fees indicated by the guarantee contract fee information corresponding to the respective selected articles, or others, when the first display information is output.

Therefore, with this configuration, the user can grasp an article image corresponding to an article for which an extended guarantee contract that is advantageously bracketed can be concluded by additionally selecting the article with respect to the currently selected article.

In addition to the first display information indicating the first display image in which the article images corresponding to the respective articles owned by the user are arranged, the display generating unit 190 may generate second display information indicating a second display image indicating detailed information regarding an article corresponding to one article image selected by user's operation on the basis of the operation information acquired by the operation acquiring unit 110.

Specifically, for example, in a case where the user selects a certain article image by predetermined user's operation such as single tap or double click in an area corresponding to the article image in the first display image, the display generating unit 190 generates the second display information indicating the second display image indicating detailed information regarding the article corresponding to the article image.

The second display image indicated by the second display information generated by the display generating unit 190 includes an image corresponding to at least one of, for example, guarantee state information indicating whether or not the article corresponding to the second display image is in a guaranteed state, guarantee period information indicating the guarantee period of the article, guarantee availability information indicating whether or not an extended guarantee contract is available for the article, guarantee contract fee information indicating an amount of money required for the extended guarantee contract, or blanket contract discount availability information indicating whether or not the amount of money required for the extended guarantee contract is discounted by concluding a blanket extended guarantee contract by combining the article and another article different from the article.

In a case where the display generating unit 190 generates the first display information and the second display information, the display output unit 199 outputs the second display information instead of the first display information, for example, when the display generating unit 190 generates the second display information.

In a case where the display output unit 199 outputs the second display information, for example, with the user performing predetermined user's operation, the display generating unit 190 generates the first display information indicating the first display image, and the display output unit 199 outputs the first display information generated by the display generating unit 190 instead of the second display information.

In the first embodiment, description will be given on the premise that, in a case where the display generating unit 190 generates the first display information and the second display information, the display control device 100 outputs the second display information instead of the first display information when generating the second display information and outputs the first display information instead of the second display information when generating the first display information. However, in a case where the display generating unit 190 generates the first display information and the second display information, the display control device 100 may output the first display information and the second display information so that the first display image indicated by the first display information and the second display image indicated by the second display information are simultaneously displayed in different display areas in the display output device 20.

The second display image indicated by the second display information generated by the display generating unit 190 according to the first embodiment will be described by referring to FIG. 6.

FIG. 6 is an explanatory diagram illustrating an example of the second display image indicated by the second display information generated by the display generating unit 190 according to the first embodiment.

For example, as illustrated in FIG. 6, the second display image includes images each indicating one of the name of the article, the type of the article, the manufacturer of the article, the model number of the article, the date of purchase of the article, and the shop where the article was purchased.

Further, as illustrated in FIG. 6, the second display image may include an image indicating whether or not the article is in a guaranteed state, the guarantee period of the article, whether or not an extended guarantee contract is available for the article, an amount of money required for the extended guarantee contract, or whether or not the amount of money required for the extended guarantee contract is discounted by executing a blanket extended guarantee contract bracketed by combining the article and another article different from the article.

Note that the second display image illustrated in FIG. 6 is merely an example, and the second display image does not necessarily include all of the images indicating whether or not the article is in a guaranteed state, the guarantee period of the article, whether or not an extended guarantee contract is available for the article, an amount of money required for the extended guarantee contract, and whether or not the amount of money required for the extended guarantee contract is discounted by executing a blanket extended guarantee contract bracketed by combining the article and another article different from the article and may include some of the images.

Although not illustrated in FIG. 6, the second display image may include an image indicating an amount of money discounted from the amount of money required for the extended guarantee contract when the extended guarantee contract of the article is concluded, the discount rate, or the amount of money after the discount of the extended guarantee contract.

With the above configuration, the display control device 100 can present, to the user, detailed information of an article corresponding to an article image selected by the user among the plurality of article images arranged in the first display image. As a result, the display control device 100 allows the user to view detailed information of the article corresponding to the article image selected by the user, thereby allowing the user to easily determine whether or not the user concludes the extended guarantee contract. Furthermore, as a result, the information processing system 1 can present, to the user, detailed information of an article corresponding to an article image selected by the user among the plurality of article images arranged in the first display image. As a result, the information processing system 1 allows the user to view detailed information of the article corresponding to the article image selected by the user, thereby allowing the user to easily determine whether or not the user concludes the extended guarantee contract.

Moreover, the second display image indicated by the second display information generated by the display generating unit 190 may include, for example, as illustrated in FIG. 6, a contact desk image corresponding to contact desk information indicating a contact desk for the article corresponding to the second display image in addition to, for example, an image corresponding to the guarantee state information, the guarantee period information, the guarantee availability information, the guarantee contract fee information, or the blanket contract discount availability information as illustrated in FIG. 6.

Incidentally, the contact desk information indicates a point of contact such as a telephone number or an e-mail address of a contact desk such as a user support counter provided by the manufacturer of the article, a shop where the article was purchased, a business operator who provides a guarantee or an extended guarantee of the article, or others.

By selecting the contact desk image by user's operation, the user can contact the point of contact such as the telephone number or the e-mail address of the contact desk indicated by the contact desk information and consult about a failure or the like of the article.

Note that the point of contact indicated by the contact desk information is not limited to a telephone number or an e-mail address and may be a link to an inquiry form or an interactive chat, a connection destination of a video call, or the like.

Incidentally, information indicating an appropriate point of contact may be selected on the basis of the number of days elapsed from the date of purchase of the article so that the contact desk information indicates, for example, a point of contact such as a user support desk provided by the manufacturer of the article in a case where it is within one year from the date of purchase and, in a case where one year has elapsed from the date of purchase, a point of contact such as a user support desk provided by a business operator providing a guarantee or an extended guarantee of the article that guarantees the article.

The contact desk information is acquired by, for example, the contact desk acquiring unit 159 included in the information acquiring unit 150.

Specifically, for example, the contact desk acquiring unit 159 included in the information acquiring unit 150 acquires the contact desk information corresponding to the article corresponding to the second display image from among contact desk information stored in advance in the storage device 30. More specifically, for example, the contact desk acquiring unit 159 transmits the article information indicating the article corresponding to the second display image to the server device 200 and requests for contact desk information corresponding to the article information. The server device 200 searches and acquires contact desk information corresponding to the article information from among the contact desk information stored in advance in the storage device 30 on the basis of the request and outputs the acquired contact desk information to the display control device 100. The contact desk acquiring unit 159 acquires the contact desk information corresponding to the article corresponding to the second display image by acquiring the contact desk information output by the server device 200.

With the above configuration, the display control device 100 allows the user to easily contact the contact desk indicated by the contact desk information when the user consults about a failure or the like of the article. As a result, the information processing system 1 allows the user to easily contact the contact desk indicated by the contact desk information when the user consults about a failure or the like of the article.

Moreover, the second display image indicated by the second display information generated by the display generating unit 190 may include, for example, as illustrated in FIG. 6, a user's manual storage location image corresponding to user's manual storage location information for acquiring the user's manual of the article corresponding to the second display image in addition to an image corresponding to the guarantee state information, the guarantee period information, the guarantee availability information, the guarantee contract fee information, or the blanket contract discount availability information.

Incidentally, the user's manual storage location information for acquiring the user's manual is information indicating a uniform resource locator (URL) or the like indicating the storage location of the user's manual.

The user can cache or download the user's manual and view the user's manual by selecting the user's manual storage location image by user's operation.

Specifically, for example, the user's manual is cached or downloaded by the user's manual acquiring unit 158.

More specifically, for example, the user's manual acquiring unit 158 acquires the user's manual by caching or downloading the user's manual from the storage location of the user's manual indicated by the user's manual storage location information.

The user's manual storage location information is acquired by, for example, the user's manual storage location acquiring unit 160 included in the information acquiring unit 150.

Specifically, for example, the user's manual storage location acquiring unit 160 included in the information acquiring unit 150 acquires user's manual storage location information corresponding to an article corresponding to the second display image from among user's manual storage location information stored in advance in the storage device 30. More specifically, for example, the user's manual storage location acquiring unit 160 transmits the article information indicating the article corresponding to the second display image to the server device 200 and requests for the user's manual storage location information corresponding to the article information. On the basis of the request, the server device 200 searches and acquires the user's manual storage location information corresponding to the article information from among the user's manual storage location information stored in advance in the storage device 30 and outputs the acquired user's manual storage location information to the display control device 100. The user's manual storage location acquiring unit 160 acquires the user's manual storage location information corresponding to the article corresponding to the second display image by acquiring the user's manual storage location information output from the server device 200.

With the above configuration, the display control device 100 allows the user to easily view the user's manual when the user refers to the user's manual of the article to check how to use or the like. As a result, the information processing system 1 allows the user to easily view the user's manual when the user refers to the user's manual of the article to check how to use or the like.

When the remaining period of the guarantee period indicated by the guarantee period information corresponding to a certain article has become shorter than a predetermined period on the basis of the guarantee period information acquired by the guarantee period acquiring unit 153, the notification generating unit 170 generates notification information indicating that the remaining period of the guarantee period of the article has become shorter than the predetermined period.

The notification output unit 171 outputs the notification information generated by the notification generating unit 170.

Specifically, for example, the notification information generated by the notification generating unit 170 is an e-mail indicating that the remaining period of the guarantee period of the article has become shorter than the predetermined period. In a case where the notification generating unit 170 generates an e-mail as the notification information indicating that the remaining period of the guarantee period of the article has become shorter than the predetermined period, the notification output unit 171 transmits the e-mail generated by the notification generating unit 170 to an e-mail address designated in advance by the user via a mail server (not illustrated in FIG. 1), thereby outputting the notification information.

The notification information generated by the notification generating unit 170 is not limited to the e-mail, and the output destination to which the notification output unit 171 outputs the notification information is not limited to the mail server.

For example, the notification output unit 171 may output the notification information to the display output unit 199. In a case where the notification output unit 171 outputs the notification information to the display output unit 199, the notification generating unit 170 generates, as the notification information, information indicating a pop-up image indicating that the remaining period of the guarantee period of the article has become shorter than the predetermined period. In this case, the notification output unit 171 outputs the notification information generated by the notification generating unit 170 to the display output unit 199, and the notification output unit 171 causes the display output unit 199 to display the pop-up image on the display output device 20.

Alternatively, for example, the notification output unit 171 may output the notification information to an audio output device such as a speaker (not illustrated in FIG. 1). In a case where the notification output unit 171 outputs the notification information to an audio output device such as a speaker (not illustrated in FIG. 1), for example, the notification generating unit 170 generates, as the notification information, an audio signal indicating that the remaining period of the guarantee period of the article has become shorter than the predetermined period. In this case, the notification output unit 171 outputs the notification information generated by the notification generating unit 170 to the audio output device, and the notification output unit 171 causes the audio output device to output audio indicating that the remaining period of the guarantee period of the article has become shorter than the predetermined period.

With the above configuration, the display control device 100 can notify the user that the end of the guarantee period of the article is approaching when the remaining period of the guarantee period of the article has become shorter than the predetermined period. As a result, the display control device 100 can prevent the user from forgetting to conclude an extended guarantee contract for an article for which the end of the guarantee period thereof is approaching. Furthermore, as a result, the information processing system 1 can prevent the user from forgetting to check the presence or absence of an article for which the end of a guarantee period thereof is approaching or can prevent the user from forgetting to request repair or the like of a defective part within the guarantee period.

Furthermore, as a result, the information processing system 1 can notify the user that the end of the guarantee period of the article is approaching when the remaining period of the guarantee period of the article has become shorter than the predetermined period. As a result, the information processing system 1 can prevent the user from forgetting to conclude an extended guarantee contract for an article for which the end of the guarantee period thereof is approaching. Furthermore, as a result, the information processing system 1 can prevent the user from forgetting to check the presence or absence of an article for which the end of a guarantee period thereof is approaching or can prevent the user from forgetting to request repair or the like of a defective part within the guarantee period.

Note that the output destination to which the notification output unit 171 outputs the notification information is not limited to the mail server, the display output unit 199, the audio output device, or the like. For example, the notification output unit 171 may output the notification information generated by the notification generating unit 170 to basic software included in the display control device 100, the basic software in which each unit included in the display control device 100 operates. For example, upon receiving the notification information output by the notification output unit 171, the basic software included in the display control device 100 sends, to the user, a push notification indicating that the remaining period of the guarantee period of the article indicated by the notification information has become shorter than the predetermined period.

With this configuration, even in a case where the display output unit 199 does not output the first display information or the second display information, the display control device 100 can notify the user that the end of the guarantee period of the article is approaching when the remaining period of the guarantee period of the article has become shorter than the predetermined period. As a result, the information processing system 1 can notify the user that the end of the guarantee period of the article is approaching when the remaining period of the guarantee period of the article has become shorter than the predetermined period.

In a case where the guarantee availability information indicates that an extended guarantee contract is available on the basis of the guarantee availability information acquired by the guarantee availability acquiring unit 154, the notification generating unit 170 may generate notification information including information indicating that the extended guarantee contract is available for the article in addition to the information indicating that the remaining period of the guarantee period of the article has become shorter than the predetermined period.

With the above configuration, the display control device 100 can notify the user that the end of the guarantee period of an article for which an extended guarantee contract is available is approaching when the remaining period of the guarantee period of the article has become shorter than the predetermined period. As a result, the display control device 100 can prevent the user from forgetting to conclude an extended guarantee contract for an article for which the end of the guarantee period thereof is approaching. Furthermore, as a result, the information processing system 1 can notify the user that the end of the guarantee period of an article for which an extended guarantee contract is available is approaching when the remaining period of the guarantee period of the article has become shorter than the predetermined period. As a result, the information processing system 1 can prevent the user from forgetting to conclude an extended guarantee contract for an article for which the end of the guarantee period thereof is approaching.

Moreover, with respect to the article indicated to be in a non-guaranteed state by the guarantee state information, in a case where the guarantee availability information corresponding to the article indicates that a new guarantee contract, among the extended guarantee contract, is available, the notification generating unit 170 may generate notification information indicating that there is an article for which the new guarantee contract is available, but no guarantee contract has been concluded yet, in addition to the notification information indicating that the remaining period of the guarantee period of the article has become shorter than the predetermined period.

In a case where the notification generating unit 170 generates the notification information indicating that no guarantee contract has been concluded yet for the article, the notification output unit 171 outputs the notification information generated by the notification generating unit 170 to the mail server, the display output unit 199, the audio output device, the basic software, or the like.

With this configuration, the display control device 100 can promote the user to conclude a new guarantee contract for an article for which no guarantee contract has been concluded yet. As a result, the information processing system 1 can promote the user to conclude a new guarantee contract for an article for which no guarantee contract has been concluded yet.

The viewing history output unit 180 outputs viewing history information indicating a viewing history of the user of viewing related information regarding each of a plurality of articles owned by the user in association with the user information indicating the user and article information indicating the article.

Incidentally, the related information regarding an article is the user's manual of the article, information regarding the article posted on a website operated by the manufacturer of the article, information regarding the article posted on a website operated by a business operator different from the manufacturer of the article, the website including reviews or the like such as word-of-mouth information or ratings regarding an article of other users who are using similar articles, or the like.

The viewing information indicating the related information viewed by the user is acquired by, for example, the viewing acquiring unit 161 included in the information acquiring unit 150. Specifically, the viewing information acquired by the viewing acquiring unit 161 is information indicating the name of related information, information indicating a posted place or the like such as a URL of a web page on which the related information is posted, information indicating a viewing time or an accumulated viewing time for the web page or each article on which the related information is posted, or the like. The viewing history output unit 180 sets viewing information corresponding to each of the articles owned by the user as the viewing history information and outputs the viewing history information in association with the user information and the article information. Specifically, for example, the viewing history output unit 180 outputs the viewing history information and writes the viewing history information in the storage device 30 in association with the user information and the article information, thereby storing the viewing history information in the storage device 30 in association with the user information and the article information.

When the user makes an inquiry about a certain article among the plurality of articles owned by the user to a contact desk, for example, the user history notifying unit 181 reads and acquires the viewing history information corresponding to the article from the storage device 30 and notifies the contact desk of the acquired viewing history information.

With the above configuration, the display control device 100 can provide a person in charge at the contact desk with the viewing history information indicating the viewing history of the user of viewing related information of the article. As a result, when a person in charge at the contact desk responds to an inquiry about an article from the user, the person in charge can respond to the inquiry about the article from the user while referring to the viewing history information output by the viewing history output unit 180, that is, the viewing history information of the user corresponding to the article inquired by the user to the contact desk, on the basis of the user information notified by the user history notifying unit 181 and the viewing history information output by the viewing history output unit 180. In this manner, a person in charge at the contact desk responds to an inquiry about an article from the user while referring to the viewing history information, whereby the person in charge can accurately and promptly respond to the inquiry. As a result, a person in charge can respond to the inquiry from the user without irritating the user who has already viewed the related information regarding the article such as the user's manual of the article, and the customer satisfaction can be improved.

As a result, the information processing system 1 can provide a person in charge at the contact desk with the viewing history information indicating the viewing history of the user of viewing related information of the article. As a result, when a person in charge at the contact desk responds to an inquiry about an article from the user, the person in charge can respond to the inquiry about the article from the user while referring to the viewing history information output by the viewing history output unit 180, that is, the viewing history information of the user corresponding to the article inquired by the user to the contact desk, on the basis of the user information notified by the user history notifying unit 181 and the viewing history information output by the viewing history output unit 180. In this manner, a person in charge at the contact desk responds to an inquiry about an article from the user while referring to the viewing history information, whereby the person in charge can accurately and promptly respond to the inquiry. As a result, a person in charge can respond to the inquiry from the user without irritating the user who has already viewed the related information regarding the article such as the user's manual of the article, and the customer satisfaction can be improved.

By referring to FIGS. 7A and 7B, the hardware configuration of the main part of the display control device 100 according to the first embodiment will be described.

Figure 7A:
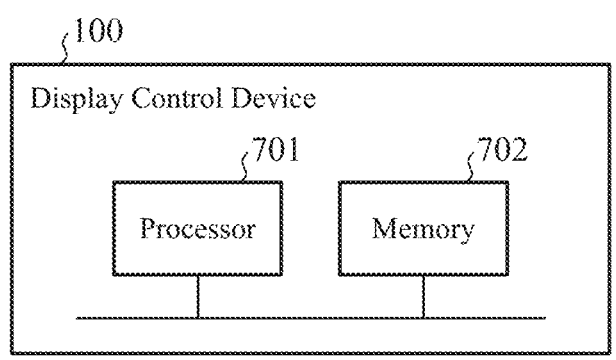
FIGS. 7A and 7B are diagrams each illustrating an example of the hardware configuration of the display control device according to the first embodiment.
Figure 7B:
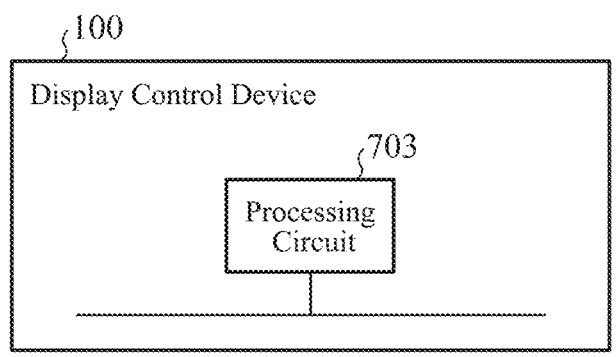

FIGS. 7A and 7B are diagrams each illustrating an example of the hardware configuration of the display control device 100 according to the first embodiment.

As illustrated in FIG. 7A, the display control device 100 includes a computer, and the computer includes a processor 701 and a memory 702. The memory 702 stores programs for causing the computer to function as the operation acquiring unit 110, the user authentication requesting unit 111, the display generating unit 190, the display output unit 199, the article specifying unit 120, the request generating unit 130, the request output unit 140, the information acquiring unit 150, the notification generating unit 170, the notification output unit 171, the viewing history output unit 180, and the user history notifying unit 181. With the processor 701 reading and executing the programs stored in the memory 702, the functions of the operation acquiring unit 110, the user authentication requesting unit 111, the display generating unit 190, the display output unit 199, the article specifying unit 120, the request generating unit 130, the request output unit 140, the information acquiring unit 150, the notification generating unit 170, the notification output unit 171, the viewing history output unit 180, and the user history notifying unit 181 are implemented.

Furthermore, as illustrated in FIG. 7B, the functions of the operation acquiring unit 110, the user authentication requesting unit 111, the display generating unit 190, the display output unit 199, the article specifying unit 120, the request generating unit 130, the request output unit 140, the information acquiring unit 150, the notification generating unit 170, the notification output unit 171, the viewing history output unit 180, and the user history notifying unit 181 may be implemented by a processing circuit 703.

Further alternatively, the display control device 100 may include the processor 701, the memory 702, and the processing circuit 703 (not illustrated). In this case, some of the functions of the operation acquiring unit 110, the user authentication requesting unit 111, the display generating unit 190, the display output unit 199, the article specifying unit 120, the request generating unit 130, the request output unit 140, the information acquiring unit 150, the notification generating unit 170, the notification output unit 171, the viewing history output unit 180, and the user history notifying unit 181 may be implemented by the processor 701 and the memory 702, and the rest of the functions may be implemented by the processing circuit 703.

As the processor 701, for example, a central processing unit (CPU), a graphics processing unit (GPU), a microprocessor, a micro controller, or a digital signal processor (DSP) is used.

As the memory 702, for example, a semiconductor memory or a magnetic disk is used. More specifically, as the memory 702, a random access memory (RAM), a read only memory (ROM), a flash memory, an erasable programmable read-only memory (EPROM), or an electrically erasable programmable read-only memory (EEPROM), an SSD, or an HDD is used.

The processing circuit 703 includes, for example, an application specific integrated circuit (ASIC), a programmable logic device (PLD), a field-programmable gate array (FPGA), a system-on-a-chip (SoC), or a system large-scale integration (LSI).

The operation of the display control device 100 according to the first embodiment will be described by referring to FIGS. 8A, 8B, and 8C.

Figure 8A:
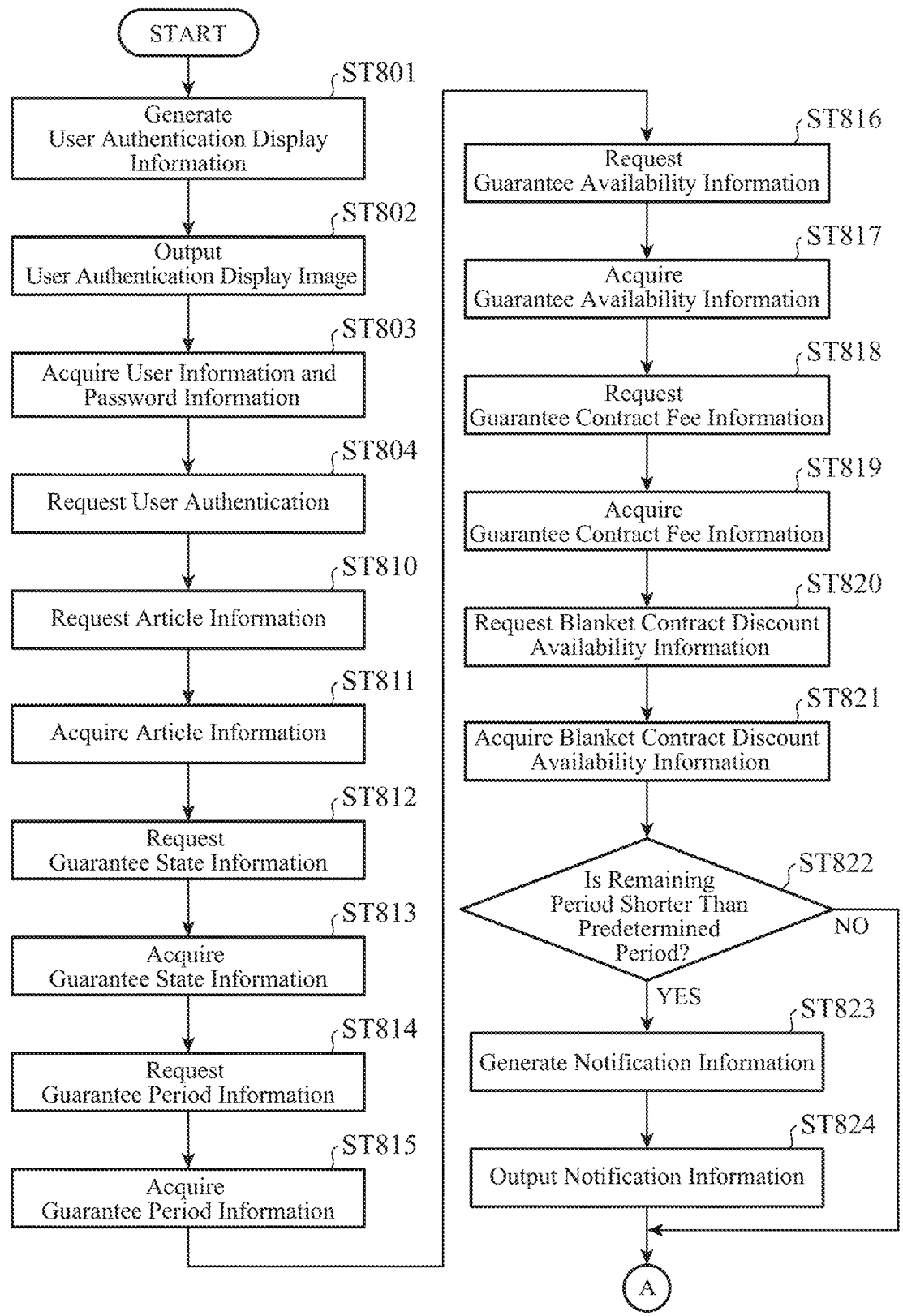
FIG. 8A is a part of a flowchart illustrating an example of processing of the display control device according to the first embodiment.
Figure 8B:
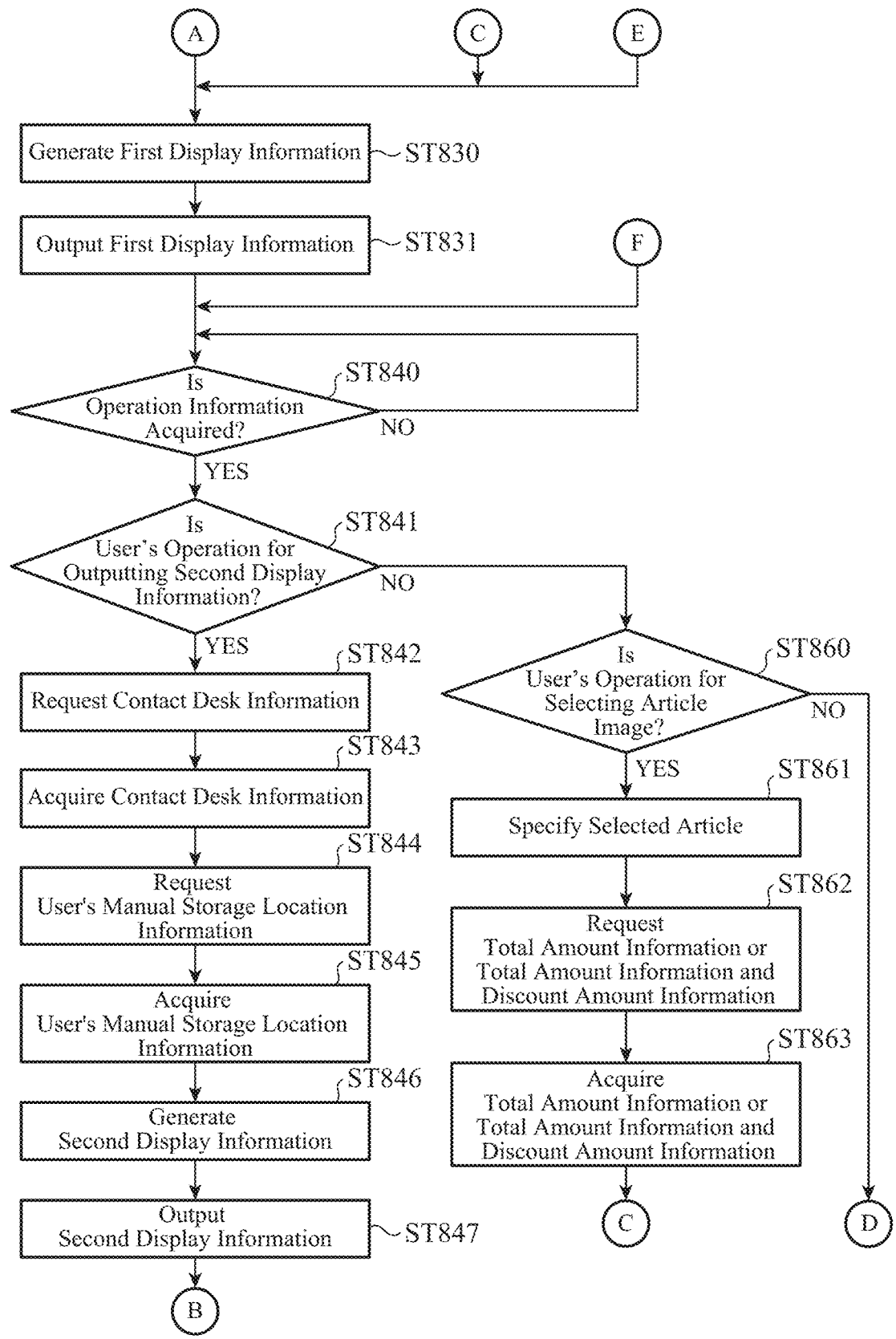
FIG. 8B is a part of a flowchart illustrating an example of processing of the display control device according to the first embodiment.
Figure 8C:
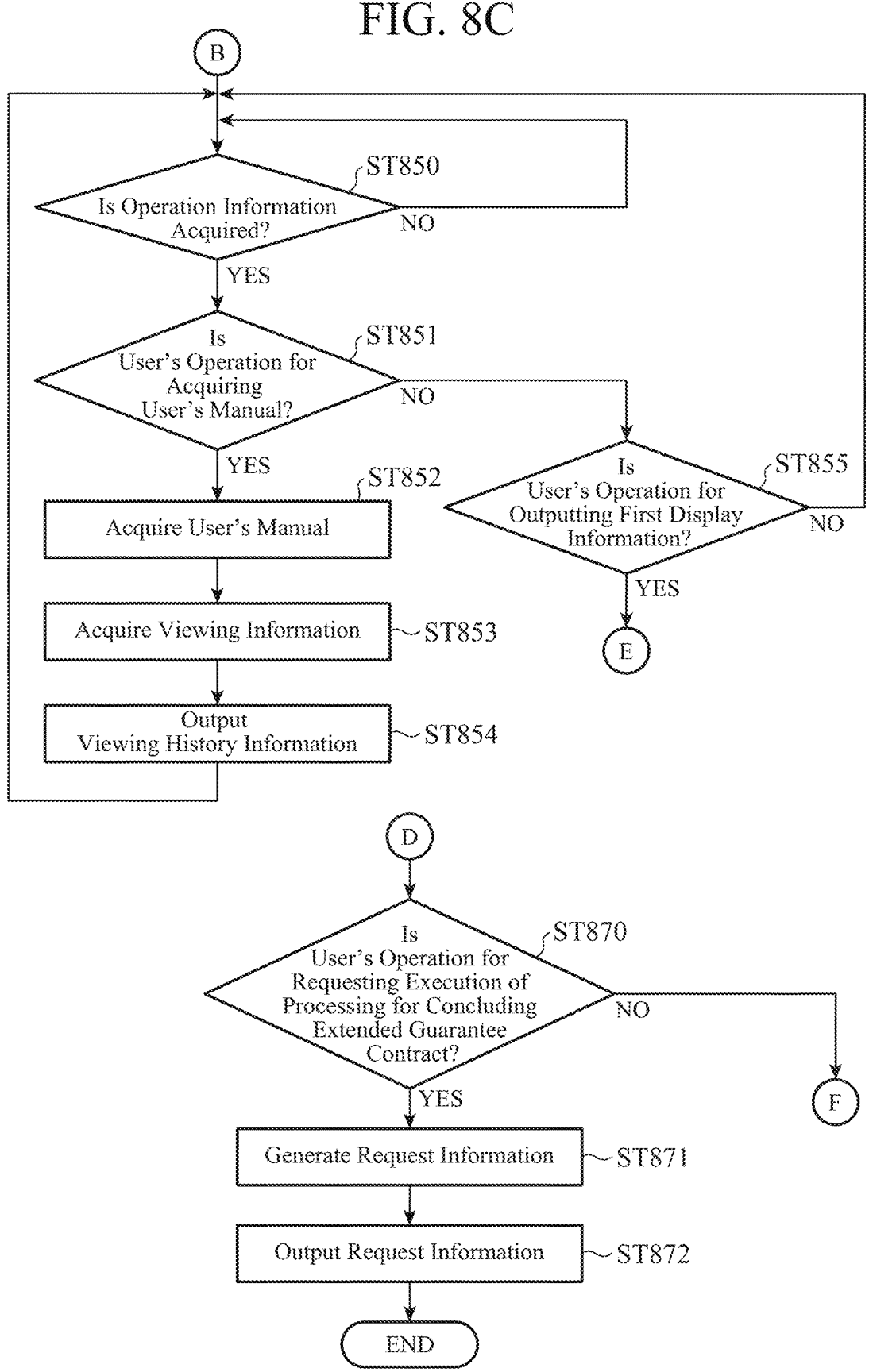
FIG. 8C is a part of a flowchart illustrating an example of processing of the display control device according to the first embodiment.

FIGS. 8A, 8B, and 8C are a part of a flowchart illustrating an example of the processing of the display control device 100 according to the first embodiment. A series of processing of the display control device 100 according to the first embodiment is illustrated by all the flowcharts illustrated in FIGS. 8A, 8B, and 8C. Hereinafter, FIGS. 8A, 8B, and 8C will be collectively referred to as FIG. 8.

For example, the display control device 100 repeatedly executes the processing of the flowcharts illustrated in FIG. 8.

First, in step ST801, the display generating unit 190 generates the user authentication display information.

Next, in step ST802, the display output unit 199 outputs the user authentication display image.

Next, in step ST803, the operation acquiring unit 110 acquires the user information and the password information as the operation information.

Next, the user authentication requesting unit 111 transmits the user information and the password information to the server device 200 and requests user authentication in step ST804.

Hereinafter, description will be given on the premise that the user authentication requested by the user authentication requesting unit 111 to the server device 200 has been successful.

After step ST804, in step ST810, the article acquiring unit 151 included in the information acquiring unit 150 requests the server device 200 for a plurality of pieces of article information corresponding to the user information.

After step ST810, in step ST811, the article acquiring unit 151 included in the information acquiring unit 150 acquires a plurality of pieces of article information corresponding to the user information.

After step ST811, in step ST812, the guarantee state acquiring unit 152 included in the information acquiring unit 150 requests the server device 200 for guarantee state information corresponding to each of the plurality of pieces of article information.

After step ST812, in step ST813, the guarantee state acquiring unit 152 included in the information acquiring unit 150 acquires the guarantee state information corresponding to each of the plurality of pieces of article information.

After step ST813, in step ST814, the guarantee period acquiring unit 153 included in the information acquiring unit 150 requests the server device 200 for guarantee period information corresponding to each of the plurality of pieces of article information.

After step ST814, in step ST815, the guarantee period acquiring unit 153 included in the information acquiring unit 150 acquires the guarantee period information corresponding to each of the plurality of pieces of article information.

After step ST815, in step ST816, the guarantee availability acquiring unit 154 included in the information acquiring unit 150 requests the server device 200 for guarantee availability information corresponding to each of the plurality of pieces of article information.

After step ST816, in step ST817, the guarantee availability acquiring unit 154 included in the information acquiring unit 150 acquires the guarantee availability information corresponding to each of the plurality of pieces of article information.

After step ST817, in step ST818, the guarantee contract fee acquiring unit 155 included in the information acquiring unit 150 requests the server device 200 for guarantee contract fee information corresponding to each of the plurality of pieces of article information.

After step ST818, in step ST819, the guarantee contract fee acquiring unit 155 included in the information acquiring unit 150 acquires the guarantee contract fee information corresponding to each of the plurality of pieces of article information.

After step ST819, in step ST820, the blanket contract discount availability acquiring unit 157 included in the information acquiring unit 150 requests the server device 200 for blanket contract discount availability information corresponding to each of the plurality of pieces of article information.

After step ST820, in step ST821, the blanket contract discount availability acquiring unit 157 included in the information acquiring unit 150 acquires the blanket contract discount availability information corresponding to each of the plurality of pieces of article information.

After step ST821, in step ST822, the notification generating unit 170 determines whether or not the remaining period of the guarantee period is shorter than a predetermined period for each of the plurality of articles owned by the user.

In step ST822, in a case where the notification generating unit 170 determines that the remaining period of the guarantee period is shorter than the predetermined period for any of the plurality of articles owned by the user, the notification generating unit 170 generates notification information in step ST823.

After step ST823, in step ST824, the notification output unit 171 outputs the notification information.

After step ST824, the display control device 100 executes the processing of step ST830 described later.

In step ST822, in a case where the notification generating unit 170 determines that the remaining period of the guarantee period is not shorter than the predetermined period for any of the plurality of articles owned by the user, the display control device 100 executes processing of step ST830 described later.

After step ST824 or in step ST822, in a case where the notification generating unit 170 determines that the remaining period of the guarantee period is not shorter than the predetermined period for any of the plurality of articles owned by the user, the display generating unit 190 generates the first display information in step ST830.

After step ST830, in step ST831, the display output unit 199 outputs the first display information to the display output device 20.

After step ST831, in step ST840, the display control device 100 waits until the operation acquiring unit 110 acquires the operation information. Specifically, in step ST840, the operation acquiring unit 110 determines whether or not the operation information has been acquired.

If it is determined in step ST840 that the operation acquiring unit 110 has not acquired the operation information, the display control device 100 repeatedly executes the processing of step ST840 until it is determined that the operation acquiring unit 110 has acquired the operation information.

If it is determined in step ST840 that the operation acquiring unit 110 has acquired the operation information, in step ST841, the operation acquiring unit 110 determines whether or not user's operation indicated by the acquired operation information is for outputting the second display information.

If the operation acquiring unit 110 determines in step ST841 that the user's operation indicated by the operation information is for outputting the second display information, the contact desk acquiring unit 159 requests the server device 200 for contact desk information in step ST842.

After step ST842, in step ST843, the contact desk acquiring unit 159 acquires the contact desk information.

After step ST843, in step ST844, the user's manual storage location acquiring unit 160 requests the server device 200 for user's manual storage location information.

After step ST844, in step ST845, the user's manual storage location acquiring unit 160 acquires the user's manual storage location information.

After step ST845, in step ST846, the display generating unit 190 acquires the second display information.

After step ST846, in step ST847, the display output unit 199 outputs the second display information.

After step ST847, in step ST850, the operation acquiring unit 110 determines whether or not the operation information has been acquired.

If it is determined in step ST850 that the operation acquiring unit 110 has not acquired the operation information, the display control device 100 repeatedly executes the processing of step ST850 until it is determined that the operation acquiring unit 110 has acquired the operation information.

If it is determined in step ST850 that the operation acquiring unit 110 has acquired the operation information, in step ST851, the operation acquiring unit 110 determines whether or not the user's operation indicated by the acquired operation information is for acquiring a user's manual.

In step ST851, if the operation acquiring unit 110 determines that the user's operation indicated by the operation information is for acquiring a user's manual, in step ST852, the user's manual acquiring unit 158 acquires the user's manual.

After step ST852, in step ST853, the viewing acquiring unit 161 acquires the viewing information.

After step ST853, in step ST854, the viewing history output unit 180 outputs the viewing history information.

After step ST854, the display control device 100 returns to the processing of step ST850 and executes the processing of step ST850.

In step ST851, if the operation acquiring unit 110 determines that the user's operation indicated by the operation information is not for acquiring the user's manual, in step ST855, the operation acquiring unit 110 determines whether or not the user's operation indicated by the acquired operation information is for outputting the first display information.

In step ST855, if the operation acquiring unit 110 determines that the user's operation indicated by the operation information is for outputting the first display information, the display control device 100 returns to the processing of step ST830 and executes the processing of and after step ST830.

In step ST855, if the operation acquiring unit 110 determines that the user's operation indicated by the operation information is not for outputting the first display information, the display control device 100 returns to the processing of step ST850 and executes the processing of and after step ST850.

In step ST841, if the operation acquiring unit 110 determines that the user's operation indicated by the operation information is not for outputting the second display information, in step ST860, the operation acquiring unit 110 determines whether or not the user's operation indicated by the acquired operation information is for selecting an article image.

In step ST860, in a case where the operation acquiring unit 110 determines that the user's operation indicated by the operation information is for selecting an article image, the article specifying unit 120 specifies the selected article in step ST861.

After step ST861, in step ST862, the total amount acquiring unit 156 requests the server device 200 for total amount information or the total amount information and discount amount information.

After step ST862, in step ST863, the total amount acquiring unit 156 acquires the total amount information or the total amount information and the discount amount information.

After step ST863, the display control device 100 returns to the processing of step ST830 and executes the processing of and after step ST830.

In step ST860, if the operation acquiring unit 110 determines that the user's operation indicated by the operation information is not for selecting an article image, in step ST870, the operation acquiring unit 110 determines whether or not the user's operation indicated by the acquired operation information is for requesting execution of processing for concluding an extended guarantee contract.

In step ST870, if the operation acquiring unit 110 determines that the user's operation indicated by the operation information is not for requesting execution of the processing for concluding an extended guarantee contract, the display control device 100 returns to the processing of step ST840 and executes the processing of and after step ST840.

In step ST870, if the operation acquiring unit 110 determines that the user's operation indicated by the operation information is for requesting execution of processing for concluding the extended guarantee contract, the request generating unit 130 generates request information in step ST871.

After step ST871, in step ST872, the request output unit 140 outputs request information.

After step ST872, the display control device 100 ends the processing of the flowchart, returns to the processing of step ST801 after ending it, and repeatedly executes the processing of the flowchart.

The configuration of the main part of the server device 200 according to the first embodiment will be described by referring to FIG. 9.

Figure 9:
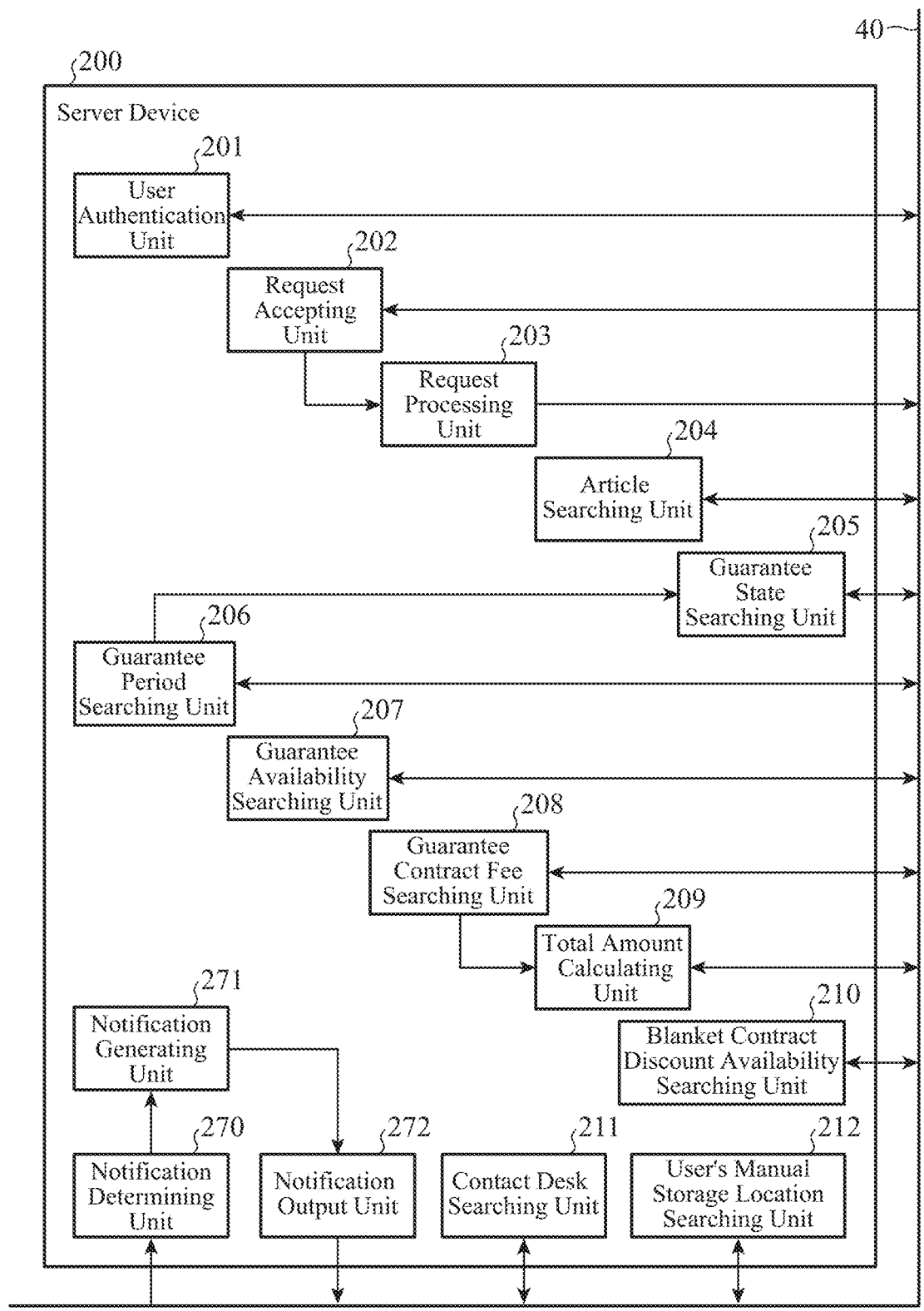
FIG. 9 is a block diagram illustrating an example of the configuration of the main part of a server device according to the first embodiment.

FIG. 9 is a block diagram illustrating an example of the configuration of the main part of the server device 200 according to the first embodiment.

The server device 200 includes a user authentication unit 201, a request accepting unit 202, a request processing unit 203, and an article searching unit 204.

In addition to the above configuration, the server device 200 may further include a guarantee state searching unit 205, a guarantee period searching unit 206, a guarantee availability searching unit 207, a guarantee contract fee searching unit 208, a total amount calculating unit 209, a blanket contract discount availability searching unit 210, a contact desk searching unit 211, and a user's manual storage location searching unit 212.

Furthermore, in the above description, the display control device 100 has been described as including the notification generating unit 170 and the notification output unit 171. However, the server device 200 may include a notification determining unit 270, a notification generating unit 271, and a notification output unit 272 in addition to the above configuration instead of the display control device 100 including the notification generating unit 170 and the notification output unit 171.

Description will be given on the premise that the server device 200 according to the first embodiment includes the user authentication unit 201, the request accepting unit 202, the request processing unit 203, the article searching unit 204, the guarantee state searching unit 205, the guarantee period searching unit 206, the guarantee availability searching unit 207, the guarantee contract fee searching unit 208, the total amount calculating unit 209, the blanket contract discount availability searching unit 210, the contact desk searching unit 211, the user's manual storage location searching unit 212, the notification determining unit 270, the notification generating unit 271, and the notification output unit 272.

The user authentication unit 201 receives the user information and the password information output from the display control device 100 via the network 40 and compares the user information and the password information that have been received with the user information and the password information included in the authentication information stored in advance in the storage device 30, thereby performing user authentication. The user authentication unit 201 transmits authentication result information indicating the authentication result to the display control device 100 via the network 40.

The request accepting unit 202 receives the request information output from the display control device 100 via the network 40 and accepts predetermined processing regarding one or more selected articles indicated by the received request information. Specifically, for example, the predetermined processing regarding the article that is accepted by the request accepting unit 202 is processing for concluding an extended guarantee contract of the article.

The request processing unit 203 executes, for each of the one or more selected articles, the predetermined processing regarding the one or more selected articles, which is the processing received by the request accepting unit 202. Specifically, for example, the request processing unit 203 sequentially executes processing for concluding an extended guarantee contract for each of the one or more selected articles. In a case where there is a plurality of selected articles indicated by the request information, the request processing unit 203 may perform the processing for concluding an extended guarantee contract on the plurality of selected articles indicated by the request information by collectively performing the processing for concluding the extended guarantee contract on two or more selected articles among the plurality of selected articles. Hereinafter, description will be given on the premise that the request processing unit 203 sequentially executes processing for concluding an extended guarantee contract for one or more selected articles indicated by the request information.

Meanwhile, there are cases where a business operator that provides the services of the extended guarantee contract is different for each selected article. For example, in a case where the business operator who provides services of the extended guarantee contract is different for each of the one or more selected articles, the request processing unit 203 executes processing of concluding an extended guarantee contract of a selected article with a business operator who provides the services of the extended guarantee contract of each of the one or more selected articles. Executing the processing of concluding an extended guarantee contract of a selected article is, for example, processing of generating an application document for the extended guarantee contract of the selected article and sending the generated application document to the business operator who provides services of the extended guarantee contract via the network 40 or the like. Note that, in a case where the business operator who manages the server device 200 is a business operator who provides the services of the extended guarantee contract, for example, execution of the processing of concluding an extended guarantee contract of a selected article means processing of applying for the procedure of the extended guarantee contract of the selected article.

The article searching unit 204 receives the user information and information indicating a request for all the article information corresponding to the user information output from the display control device 100, searches for article information corresponding to the acquired user information from the article information stored in advance in the storage device 30, and reads and acquires the corresponding article information from the storage device 30. The article searching unit 204 transmits the acquired article information to the display control device 100 via the network 40.

On the basis of the user information output from the display control device 100 and the article information corresponding to the user information, the guarantee period searching unit 206 searches for the guarantee period information corresponding to each of the plurality of pieces of article information corresponding to the user information from among the guarantee period information stored in advance in the storage device 30 and reads and acquires the corresponding guarantee period information from the storage device 30. The guarantee period searching unit 206 transmits the acquired guarantee period information to the display control device 100 via the network 40.

On the basis of the user information and the article information corresponding to the user information output from the display control device 100, the guarantee state searching unit 205 searches for the guarantee state information corresponding to each of the plurality of pieces of article information corresponding to the user information from among the guarantee state information stored in advance in the storage device 30 and reads and acquires the corresponding guarantee state information from the storage device 30. The guarantee state searching unit 205 transmits the acquired guarantee state information to the display control device 100 via the network 40.

The guarantee state searching unit 205 may generate and acquire the guarantee state information by determining whether or not the article is in the guarantee period indicated by the guarantee period information corresponding to each of the plurality of pieces of article information on the basis of the guarantee period information acquired by the guarantee period searching unit 206.

On the basis of the user information output from the display control device 100 and the article information corresponding to the user information, the guarantee availability searching unit 207 searches for the guarantee availability information corresponding to each of the plurality of pieces of article information corresponding to the user information from among the guarantee availability information stored in advance in the storage device 30 and reads and acquires the corresponding guarantee availability information from the storage device 30. The guarantee availability searching unit 207 transmits the acquired guarantee availability information to the display control device 100 via the network 40.

On the basis of the user information and the article information corresponding to the user information output from the display control device 100, the guarantee contract fee searching unit 208 searches for the guarantee contract fee information corresponding to each of the plurality of pieces of article information corresponding to the user information from among the guarantee contract fee information stored in advance in the storage device 30 and reads and acquires the corresponding guarantee contract fee information from the storage device 30. The guarantee contract fee searching unit 208 transmits the acquired guarantee contract fee information to the display control device 100 via the network 40.

The total amount calculating unit 209 searches for the guarantee contract fee information corresponding to each of the one or more pieces of selected article information on the basis of the user information and the one or more pieces of selected article information output from the display control device 100 and reads and acquires the corresponding guarantee contract fee information from the storage device 30. The total amount calculating unit 209 calculates the total amount for concluding extended guarantee contracts for all the selected articles corresponding to the one or more respective pieces of selected article information by adding up the guarantee contract fees indicated by the one or more respective pieces of acquired guarantee contract fee information. The total amount calculating unit 209 outputs total amount information indicating the calculated total amount to the display control device 100 via the network 40.

Furthermore, the total amount calculating unit 209 may output the discount amount information in addition to the total amount information to the display control device 100 via the network 40.

Specifically, for example, on the basis of the user information and the plurality of pieces of selected article information output by the display control device 100, the total amount calculating unit 209 acquires discount information indicating a predetermined discount amount discounted when a blanket extended guarantee contract is concluded or the discount rate for a selected article for which the amount of money required for an extended guarantee contract is discounted by concluding the blanket extended guarantee contract for all of two or more selected articles among the respective selected articles corresponding to the plurality of pieces of selected article information. The total amount calculating unit 209 calculates the discount amount at the time of concluding the blanket extended guarantee contract on the basis of the acquired discount information. The total amount calculating unit 209 outputs, to the display control device 100 via the network 40, the calculated discount amount or the discount amount information indicating the discounted amount that is the total amount obtained by subtracting the discount amount from the total amount indicated by the total amount information in addition to the total amount information.

Since the method by which the total amount calculating unit 209 calculates the discount amount or the discounted amount has been described above, the description thereof will be omitted.

Furthermore, for example, in a case where the total amount calculating unit 209 acquires the plan information indicating the package plan output by the display control device 100, the total amount calculating unit 209 may output, to the display control device 100, the total amount information indicating the total amount obtained by adding up the guarantee fees indicated by the guarantee contract fee information corresponding to the one or more respective selected articles, information indicating the maximum amount of money in the package plan corresponding to the plan information, or the discount amount information indicating the amount of money obtained by subtracting the maximum amount of money from the total amount.

On the basis of the user information output from the display control device 100 and the article information corresponding to the user information, the blanket contract discount availability searching unit 210 searches for the blanket contract discount availability information corresponding to each of the plurality of pieces of article information corresponding to the user information from among the blanket contract discount availability information stored in advance in the storage device 30 and reads and acquires the corresponding blanket contract discount availability information from the storage device 30. The blanket contract discount availability searching unit 210 transmits the acquired blanket contract discount availability information to the display control device 100 via the network 40.

In a case where the blanket contract discount availability information acquired from the storage device 30 indicates that the amount required for the extended guarantee contract of the article is discounted by concluding the blanket extended guarantee contract, the blanket contract discount availability searching unit 210 may transmit the discount information acquired by the total amount calculating unit 209 to the display control device 100 as the blanket contract discount availability information instead of transmitting the blanket contract discount availability information to the display control device 100.

The contact desk searching unit 211 searches for contact desk information corresponding to the article information from among the contact desk information stored in advance in the storage device 30 on the basis of the user information and the article information output from the display control device 100 and reads and acquires the corresponding contact desk information from the storage device 30. The contact desk searching unit 211 transmits the acquired contact desk information to the display control device 100 via the network 40.

The user's manual storage location searching unit 212 searches for user's manual storage location information corresponding to the article information from among the user's manual storage location information stored in advance in the storage device 30 on the basis of the user information and the article information output by the display control device 100 and reads and acquires the corresponding user's manual storage location information from the storage device 30. The user's manual storage location searching unit 212 transmits the acquired user's manual storage location information to the display control device 100 via the network 40.

The notification determining unit 270 acquires a plurality of pieces of guarantee period information stored in advance in the storage device 30. The notification determining unit 270 determines whether or not the remaining period of the guarantee period of an article indicated by each of the plurality of pieces of acquired guarantee period information is shorter than a predetermined period.

For an article for which the notification determining unit 270 determines that the remaining period of the guarantee period of the article is shorter than the predetermined period, the notification generating unit 271 generates notification information indicating that the remaining period of the guarantee period of the article has become shorter than the predetermined period.

Moreover, with respect to the article indicated to be in a non-guaranteed state by the guarantee state information, in a case where the guarantee availability information corresponding to the article indicates that a new guarantee contract, among the extended guarantee contract, is available, the notification generating unit 271 may generate notification information indicating that there is an article for which the new guarantee contract is available, but no guarantee contract has been concluded yet, in addition to the notification information indicating that the remaining period of the guarantee period of the article has become shorter than the predetermined period.

The notification output unit 272 outputs the notification information generated by the notification generating unit 271.

For example, the notification information generated by the notification generating unit 271 is an e-mail indicating that the remaining period of the guarantee period of the article has become shorter than the predetermined period or that there is an article for which a new guarantee contract is available, but no guarantee contract has been concluded yet. In a case where the notification generating unit 271 generates an e-mail as the notification information, the notification output unit 272 transmits the e-mail generated by the notification generating unit 271 to an e-mail address designated in advance by the user via a mail server, thereby outputting the notification information.

The notification information generated by the notification generating unit 271 is not limited to an e-mail, and the notification output unit 272 is not limited to outputting the notification information by transmitting the e-mail generated by the notification generating unit 271 to the e-mail address.

For example, the notification output unit 272 may output the notification information generated by the notification generating unit 271 to the display control device 100 via the network 40. For example, in a case where the notification output unit 272 outputs the notification information to the display control device 100 via the network 40, the display control device 100 may receive the notification information and output, to the display output device 20 or the audio output device (not illustrated) the fact that the remaining period of the guarantee period of the article has become shorter than the predetermined period or the fact that there is an article for which a new guarantee contract is available, but no guarantee contract has been concluded yet on the basis of the notification information.

With the above configuration, the display control device 100 can notify the user that the end of the guarantee period of the article is approaching when the remaining period of the guarantee period of the article has become shorter than the predetermined period. As a result, the display control device 100 can prevent the user from forgetting to conclude an extended guarantee contract for an article for which the end of the guarantee period thereof is approaching. Furthermore, as a result, the display control device 100 can prevent the user from forgetting to confirm the presence or absence of an article for which the end of a guarantee period thereof is approaching or can prevent the user from forgetting to request repair or the like of a defective part within the guarantee period.

In addition, the display control device 100 can notify the user that a new guarantee contract is available when there is an article for which a new guarantee contract is available, but no guarantee contract has been concluded yet. As a result, the display control device 100 can prevent the user from forgetting to conclude a guarantee contract of the article while the article is left without a guarantee.

Furthermore, with the above configuration, the information processing system 1 can notify the user that the end of the guarantee period of the article is approaching when the remaining period of the guarantee period of the article has become shorter than the predetermined period. As a result, the information processing system 1 can prevent the user from forgetting to conclude an extended guarantee contract for an article for which the end of the guarantee period thereof is approaching. Furthermore, as a result, the information processing system 1 can prevent the user from forgetting to confirm the presence or absence of an article for which the end of a guarantee period thereof is approaching or can prevent the user from forgetting to request repair or the like of a defective part within the guarantee period.

In addition, the information processing system 1 can notify the user that a new guarantee contract is available when there is an article for which a new guarantee contract is available, but no guarantee contract has been concluded yet. As a result, the information processing system 1 can prevent the user from forgetting to conclude a guarantee contract of the article while the article is left without a guarantee.

By referring to FIGS. 10A and 10B, the hardware configuration of the main part of the server device 200 according to the first embodiment will be described.

Figure 10A:
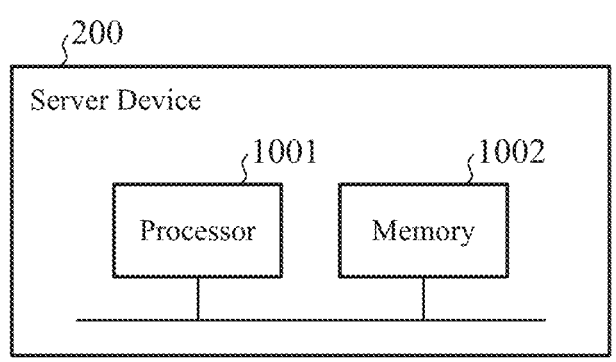
FIGS. 10A and 10B are diagrams each illustrating an example of the hardware configuration of the server device according to the first embodiment.
Figure 10B:
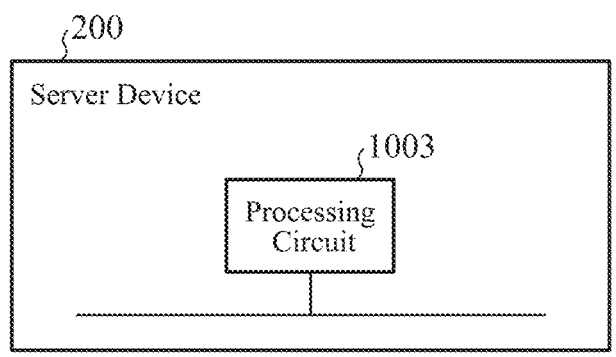

FIGS. 10A and 10B are diagrams each illustrating an example of the hardware configuration of the server device 200 according to the first embodiment.

As illustrated in FIG. 10A, the server device 200 includes a computer, and the computer includes a processor 1001 and a memory 1002. The memory 1002 stores programs for causing the computer to function as the user authentication unit 201, the request accepting unit 202, the request processing unit 203, the article searching unit 204, the guarantee state searching unit 205, the guarantee period searching unit 206, the guarantee availability searching unit 207, the guarantee contract fee searching unit 208, the total amount calculating unit 209, the blanket contract discount availability searching unit 210, the contact desk searching unit 211, the user's manual storage location searching unit 212, the notification determining unit 270, the notification generating unit 271, and the notification output unit 272. With the processor 1001 reading and executing the programs stored in the memory 1002, the functions of the user authentication unit 201, the request accepting unit 202, the request processing unit 203, the article searching unit 204, the guarantee state searching unit 205, the guarantee period searching unit 206, the guarantee availability searching unit 207, the guarantee contract fee searching unit 208, the total amount calculating unit 209, the blanket contract discount availability searching unit 210, the contact desk searching unit 211, the user's manual storage location searching unit 212, the notification determining unit 270, the notification generating unit 271, and the notification output unit 272 are implemented.

Alternatively, as illustrated in FIG. 10B, the functions of the user authentication unit 201, the request accepting unit 202, the request processing unit 203, the article searching unit 204, the guarantee state searching unit 205, the guarantee period searching unit 206, the guarantee availability searching unit 207, the guarantee contract fee searching unit 208, the total amount calculating unit 209, the blanket contract discount availability searching unit 210, the contact desk searching unit 211, the user's manual storage location searching unit 212, the notification determining unit 270, the notification generating unit 271, and the notification output unit 272 may be implemented by a processing circuit 1003.

Further alternatively, the server device 200 may include the processor 1001, the memory 1002, and the processing circuit 1003 (not illustrated). In this case, some of the functions of the user authentication unit 201, the request accepting unit 202, the request processing unit 203, the article searching unit 204, the guarantee state searching unit 205, the guarantee period searching unit 206, the guarantee availability searching unit 207, the guarantee contract fee searching unit 208, the total amount calculating unit 209, the blanket contract discount availability searching unit 210, the contact desk searching unit 211, the user's manual storage location searching unit 212, the notification determining unit 270, the notification generating unit 271, and the notification output unit 272 may be implemented by the processor 1001 and the memory 1002, and the rest of the functions may be implemented by the processing circuit 1003.

Note that the processor 1001, the memory 1002, and the processing circuit 1003 are similar to the processor 701, the memory 702, and the processing circuit 703, respectively, and thus description thereof is omitted.

The operation of the server device 200 according to the first embodiment will be described by referring to FIG. 11.

Figure 11:
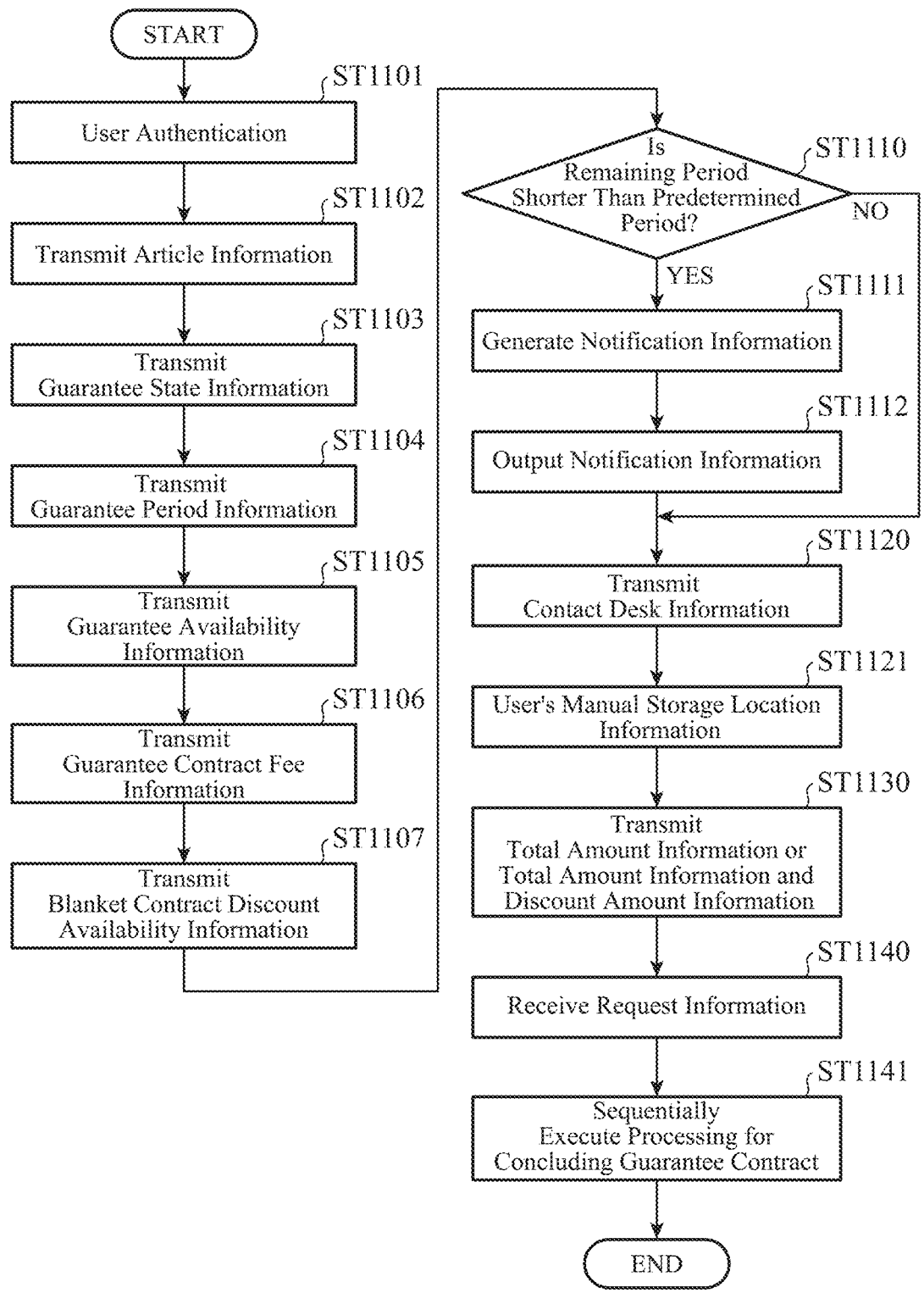
FIG. 11 is a flowchart illustrating an example of processing of the server device according to the first embodiment.

FIG. 11 is a flowchart illustrating an example of processing of the server device 200 according to the first embodiment.

For example, the server device 200 repeatedly executes the processing of the flowchart.

After the display control device 100 performs the processing of step ST804 illustrated in FIG. 8, in step ST1101, the user authentication unit 201 performs user authentication and transmits authentication result information indicating a result of the user authentication to the display control device 100.

Hereinafter, a case where the authentication result indicated by the authentication result information indicates successful authentication will be described. Note that user information for which user authentication has been successful will be simply referred to as user information in the description below.

After step ST1101, the display control device 100 performs the processing of step ST810 illustrated in FIG. 8, then, in step ST1102, the article searching unit 204 transmits a plurality of pieces of article information corresponding to the user information to the display control device 100.

After step ST1102, the display control device 100 performs the processing of step ST812 illustrated in FIG. 8, then, in step ST1103, the guarantee state searching unit 205 transmits guarantee state information corresponding to each of the plurality of pieces of article information to the display control device 100.

After step ST1103, the display control device 100 performs the processing of step ST814 illustrated in FIG. 8, then, in step ST1104, the guarantee period searching unit 206 transmits guarantee period information corresponding to each of the plurality of pieces of article information to the display control device 100.

After step ST1104, the display control device 100 performs the processing of step ST816 illustrated in FIG. 8, then, in step ST1105, the guarantee availability searching unit 207 transmits guarantee availability information corresponding to each of the plurality of pieces of article information to the display control device 100.

After step ST1105, the display control device 100 performs the processing of step ST818 illustrated in FIG. 8, then, in step ST1106, the guarantee contract fee searching unit 208 transmits guarantee contract fee information corresponding to each of the plurality of pieces of article information to the display control device 100.

After step ST1106, the display control device 100 performs the processing of step ST820 illustrated in FIG. 8, then, in step ST1107, the blanket contract discount availability searching unit 210 transmits blanket contract discount availability information corresponding to each of the plurality of pieces of article information to the display control device 100.

For example, after step ST1107, in step ST1110, the notification determining unit 270 determines whether or not the remaining period of the guarantee period of the article is shorter than the predetermined period.

After step ST1110, in step ST1111, the notification generating unit 271 generates notification information for the article for which the notification determining unit 270 has determined that the remaining period of the guarantee period of the article is shorter than the predetermined period.

After step ST1111, in step ST1112, the notification output unit 272 outputs the notification information.

Note that the processing from step ST1110 to step ST1112 may be executed in the server device 200 at predetermined timing by, for example, background processing.

For example, after step ST1112, the display control device 100 performs the processing of step ST842 illustrated in FIG. 8, then, in step ST1120, the contact desk searching unit 211 transmits contact desk information corresponding to the article information to the display control device 100.

After step ST1120, the display control device 100 performs the processing of step ST844 illustrated in FIG. 8, then, in step ST1121, the user's manual storage location searching unit 212 transmits user's manual storage location information corresponding to the article information to the display control device 100.

For example, after step ST1121, the display control device 100 performs the processing of step ST862 illustrated in FIG. 8, then, in step ST1130, the total amount calculating unit 209 transmits total amount information or the total amount information and discount amount information corresponding to extended guarantee contracts for a plurality of selected articles to the display control device 100.

For example, after step ST1130, the display control device 100 performs the processing of step ST872 illustrated in FIG. 8, then, in step ST1140, the request processing unit 203 receives the request information.

After step ST1140, in step ST1141, the request processing unit 203 sequentially executes processing for concluding an extended guarantee contract for each of the plurality of selected articles on the basis of the request information. After step ST1141, the server device 200 ends the processing of the flowchart, returns to step ST1101, and repeatedly executes the processing of the flowchart.

As described above, the information processing system 1 according to the first embodiment includes: the operation acquiring unit 110 to acquire operation information based on user's operation; the display generating unit 190 to generate display information indicating a display image in which article images corresponding to respective articles owned by the user are arranged; the display output unit 199 to output the display information generated by the display generating unit 190; the article specifying unit 120 to specify, on the basis of the operation information acquired by the operation acquiring unit 110 among the plurality of article images included in the display image indicated by the display information generated by the display generating unit 190, a selected article that is the article corresponding to each of one or more selected article images that are one or more of the article images selected by the user's operation; the request generating unit 130 to generate request information for requesting execution of predetermined processing regarding one or more of the selected articles specified by the article specifying unit 120 on the basis of the operation information acquired by the operation acquiring unit 110; and the request output unit 140 to output the request information generated by the request generating unit 130.

With this configuration, the information processing system 1 allows the user to select one or more articles and to collectively request to execute predetermined processing on the selected one or more articles.

Moreover, in the information processing system 1 according to the first embodiment, in particular, the request information generated by the request generating unit 130 is information for requesting extended guarantee contracts of one or more selected articles specified by the article specifying unit 120 among the plurality of articles owned by the user.

With such a configuration, the information processing system 1 allows the user to select one or more articles and to collectively perform the request processing of extended guarantee contracts for the selected one or more articles.

Furthermore, in addition to the above configuration, the information processing system 1 according to the first embodiment further includes the guarantee state acquiring unit 152 to acquire, for each of the plurality of articles owned by the user, guarantee state information indicating whether or not the article is in a guaranteed state, in which, in a case where guarantee state information corresponding to a certain article indicates that the article is in a guaranteed state on the basis of the guarantee state information acquired by the guarantee state acquiring unit 152, the display generating unit 190 generates the display information indicating the display image in which an under-guarantee image indicating that the article is in the guaranteed state is associated with an article image corresponding to the article.

With the above configuration, the information processing system 1 can allow the user to intuitively grasp which article is in a guaranteed state and which article is in a non-guaranteed state among the plurality of articles owned by the user while allowing the user to select one or more articles and to collectively perform the request processing of extended guarantee contracts for the selected one or more articles.

In addition, the information processing system 1 according to the first embodiment further includes, in addition to the above configuration, the guarantee period acquiring unit 153 that acquires the guarantee period information indicating the guarantee period of the article for each of the plurality of articles owned by the user, in which the display generating unit 190 generates the display information indicating the display image in which an under-guarantee image of a mode corresponding to the guarantee period of the article indicated by the guarantee period information is associated with an article image corresponding to the article on the basis of the guarantee period information acquired by the guarantee period acquiring unit 153.

With the above configuration, the information processing system 1 can allow the user to intuitively grasp which article is in a guaranteed state and which article is in a non-guaranteed state among the plurality of articles owned by the user while allowing the user to select one or more articles and to collectively perform the request processing of extended guarantee contracts for the selected one or more articles.

The information processing system 1 according to the first embodiment further includes, in addition to the above configuration, the guarantee period acquiring unit 153 that acquires the guarantee period information indicating the guarantee period of the article for each of the plurality of articles owned by the user, in which the display generating unit 190 generates the display information indicating the display image in which the guarantee period image indicating at least the end of the guarantee period indicated by the guarantee period information corresponding to the article is associated with an article image corresponding to the article on the basis of the guarantee period information acquired by the guarantee period acquiring unit 153.

With this configuration, the information processing system 1 can allow the user to grasp the end of the guarantee period for an article that is in a guaranteed state while allowing the user to select one or more articles and to collectively perform the request processing of the extended guarantee contract for the selected one or more articles.

Moreover, the information processing system 1 according to the first embodiment further includes, in addition to the above configuration, the guarantee period acquiring unit 153 that acquires the guarantee period information indicating the guarantee period of the article for each of the plurality of articles owned by the user, the notification generating unit 170 that generates notification information indicating that the remaining period of the guarantee period of the article has become shorter than the predetermined period when the remaining period of the guarantee period indicated by the guarantee period information corresponding to a certain article has become shorter than the predetermined period on the basis of the guarantee period information acquired by the guarantee period acquiring unit 153, and the notification output unit 171 that outputs the notification information generated by the notification generating unit 170.

With this configuration, the information processing system 1 can notify the user that the end of the guarantee period of the article is approaching when the remaining period of the guarantee period of the article has become shorter than the predetermined period while allowing the user to select one or more articles and to collectively perform the request processing of the extended guarantee contract for the selected one or more articles. As a result, the information processing system 1 can prevent the user from forgetting to conclude an extended guarantee contract for an article for which the end of the guarantee period thereof is approaching. Furthermore, as a result, the information processing system 1 can prevent the user from forgetting to check the presence or absence of an article for which the end of a guarantee period thereof is approaching or can prevent the user from forgetting to request repair or the like of a defective part within the guarantee period.

In addition to the above configuration, the information processing system 1 according to the first embodiment further includes the guarantee availability acquiring unit 154 that acquires the guarantee availability information indicating whether or not an extended guarantee contract is available for each of the plurality of articles owned by the user, in which the notification generating unit 170 generates the notification information including the information indicating that the extended guarantee contract is available for the article in addition to the information indicating that the remaining period of the guarantee period of the article has become shorter than the predetermined period in a case where the guarantee availability information indicates that a guarantee contract is available on the basis of the guarantee availability information acquired by the guarantee availability acquiring unit 154.

With this configuration, the information processing system 1 can notify the user that the end of the guarantee period of an article for which an extended guarantee contract is available is approaching when the remaining period of the guarantee period of the article has become shorter than the predetermined period while allowing the user to select one or more articles and to collectively perform the request processing of the extended guarantee contract for the selected one or more articles. As a result, the information processing system 1 can prevent the user from forgetting to conclude an extended guarantee contract for an article for which the end of the guarantee period thereof is approaching.

In addition to the above configuration, the information processing system 1 according to the first embodiment includes the guarantee availability acquiring unit 154 that acquires the guarantee availability information indicating whether or not an extended guarantee contract is available for each of the plurality of articles owned by the user, in which the display generating unit 190 generates the display information indicating the display image in which the guarantee availability image indicating that the extended guarantee contract is available is associated with an article image corresponding to a certain article in a case where the guarantee availability information corresponding to the article indicates that the extended guarantee contract is available on the basis of the guarantee availability information acquired by the guarantee availability acquiring unit 154.

With this configuration, the information processing system 1 can allow the user to grasp an article for which an extended guarantee contract is available among the plurality of articles owned by the user while allowing the user to select one or more articles and to collectively perform the request processing of extended guarantee contracts for the selected one or more articles. As a result, the information processing system 1 can allow the user to easily select an article image corresponding to an article for which the extended guarantee contract can be concluded by user's operation.

In addition to the above configuration, the information processing system 1 according to the first embodiment further includes the guarantee availability acquiring unit 154 that acquires the guarantee availability information indicating whether or not an extended guarantee contract is available for each of the plurality of articles owned by the user, in which the display generating unit 190 generates the display information indicating the display image indicating that an article image indicating a certain article cannot be selected by user's operation in a case where the guarantee availability information corresponding to the article indicates that no extended guarantee contract is available on the basis of the guarantee availability information acquired by the guarantee availability acquiring unit 154.

With this configuration, the information processing system 1 can prevent the user from erroneously selecting, by user's operation, an article image corresponding to the article for which no extended guarantee contract is available among the plurality of articles owned by the user and outputting request information for requesting an extended guarantee contract of the article while allowing the user to select one or more articles and to collectively perform the request processing of extended guarantee contracts for the selected one or more articles.

In addition to the above configuration, the information processing system 1 according to the first embodiment further includes the guarantee availability acquiring unit 154 that acquires the guarantee availability information indicating whether or not an extended guarantee contract is available for each of the plurality of articles owned by the user, in which the operation acquiring unit 110 does not acquire operation information indicating user's operation for selecting an article image indicating a certain article in a case where the guarantee availability information corresponding to the article indicates that no extended guarantee contract is available on the basis of the guarantee availability information acquired by the guarantee availability acquiring unit 154.

With this configuration, the information processing system 1 can prevent the user from erroneously selecting, by user's operation, an article image corresponding to the article for which no extended guarantee contract is available among the plurality of articles owned by the user and outputting request information for requesting an extended guarantee contract of the article while allowing the user to select one or more articles and to collectively perform the request processing of extended guarantee contracts for the selected one or more articles.

In addition, with the above configuration, the information processing system 1 can suppress an application for an extended guarantee contract to a guarantee company for an article for which the extended guarantee contract is not available, and thus both the business efficiency of the guarantee company and the customer satisfaction can be improved.

In addition to the above configuration, the information processing system 1 according to the first embodiment further includes the guarantee availability acquiring unit 154 that acquires the guarantee availability information indicating whether or not an extended guarantee contract is available for each of the plurality of articles owned by the user and the guarantee contract fee acquiring unit 155 that acquires guarantee contract fee information indicating the guarantee contract fee which is the amount of money required for an extended guarantee contract of a certain article in a case where guarantee availability information corresponding to the article indicates that the extended guarantee contract is available on the basis of the guarantee availability information acquired by the guarantee availability acquiring unit 154, in which the display generating unit 190 generates the display information indicating the display image in which the guarantee contract fee image indicating the guarantee contract fee indicated by the guarantee contract fee information is associated with an article image indicating the article corresponding to the guarantee contract fee information on the basis of the guarantee contract fee information acquired by the guarantee contract fee acquiring unit 155.

With this configuration, the information processing system 1 can allow the user to grasp an article for which an extended guarantee contract is available among the plurality of articles owned by the user and to grasp the amount of money required for the extended guarantee contract of the article while allowing the user to select one or more articles and to collectively perform the request processing of extended guarantee contracts for the selected one or more articles.

In addition to the above configuration, the information processing system 1 according to the first embodiment further includes the total amount acquiring unit 156 that acquires the total amount information indicating the total amount of the respective guarantee contract fees of the one or more selected articles specified by the article specifying unit 120, in which the display generating unit 190 generates the display information indicating the display image in which the total amount image indicating the total amount indicated by the total amount information acquired by the total amount acquiring unit 156 is included in the display image indicated by the display information.

With this configuration, the information processing system 1 can present, to the user, the total amount required when the user concludes an extended guarantee contract for all the articles for which the user desires an extended guarantee while allowing the user to select one or more articles and to collectively perform the request processing of extended guarantee contracts for the selected one or more articles.

Furthermore, in addition to the above configuration, in the information processing system 1 according to the first embodiment, the total amount acquiring unit 156 acquires, in addition to acquiring the total amount information, for all of two or more selected articles among the plurality of selected articles specified by the article specifying unit 120, the discount amount information indicating the discount amount at the time of concluding a blanket extended guarantee contract or the total amount after the discount at the time of concluding the blanket extended guarantee contract in a case where the amount of money required for the extended guarantee contract is discounted by concluding the blanket extended guarantee contract, in which the display generating unit 190 generates the display information indicating the display image in which, in addition to the total amount image, a discount amount image, which indicates the discount amount at the time of concluding the blanket extended guarantee contract or the amount of money after the discount at the time of concluding the blanket extended guarantee contract indicated by the discount amount information acquired by the total amount acquiring unit 156, is associated with the total amount image.

With this configuration, the information processing system 1 can present, to the user, the amount of money to be discounted or the total amount after the discount when the user concludes an extended guarantee contract for all the articles for which the user desires an extended guarantee contract in addition to the total amount required when the user concludes an extended guarantee contract for all the articles for which the user desires an extended guarantee contract while allowing the user to select one or more articles and to collectively perform the request processing of the extended guarantee contracts for the selected one or more articles.

In addition to the above configuration, the information processing system 1 according to the first embodiment further includes the blanket contract discount availability acquiring unit 157 that acquires blanket contract discount availability information indicating whether or not an amount of money required for an extended guarantee contract is discounted by concluding a blanket extended guarantee contract for all of two or more selected articles among a plurality of selected articles specified by the article specifying unit 120 in a case where the article specifying unit 120 specifies the plurality of selected articles, in which the display generating unit 190 generates the display information indicating the display image in which a blanket-discounted item image indicating an article, for which the amount of money required for an extended guarantee contract is discounted by concluding a blanket extended guarantee contract is associated with an article image indicating the article corresponding to the blanket contract discount availability information on the basis of the blanket contract discount availability information acquired by the blanket contract discount availability acquiring unit 157.

With this configuration, the information processing system 1 allows the user to grasp an article, for which the amount of money required for an extended guarantee contract is discounted by concluding a blanket extended guarantee contract, while allowing the user to grasp an article for which an extended guarantee contract is available among the plurality of articles owned by the user.

Furthermore, in the information processing system 1 according to the first embodiment, in the above configuration, the display generating unit 190 generates the second display information indicating the second display image indicating detailed information regarding an article corresponding to one article image selected by user's operation on the basis of the operation information acquired by the operation acquiring unit 110 in addition to the first display information indicating the first display image in which article images corresponding to the plurality of articles owned by the user are arranged, the display output unit 199 outputs the second display information instead of the first display information when the display generating unit 190 generates the second display information, and the second display image indicated by the second display information generated by the display generating unit 190 includes an image corresponding to at least one of guarantee state information indicating whether or not the article corresponding to the second display image is in a guaranteed state, guarantee period information indicating the guarantee period of the article, guarantee availability information indicating whether or not an extended guarantee contract is available for the article, guarantee contract fee information indicating an amount of money required for the extended guarantee contract, and blanket contract discount availability information indicating whether or not the amount of money required for the extended guarantee contract is discounted by concluding the extended guarantee contract by combining the article and another article different from the article.

With the above configuration, the information processing system 1 can present, to the user, detailed information of an article corresponding to an article image selected by the user among the plurality of article images arranged in the first display image. As a result, the information processing system 1 allows the user to view detailed information of the article corresponding to the article image selected by the user, thereby allowing the user to easily determine whether or not the user concludes the extended guarantee contract.

Moreover, in the above configuration, the information processing system 1 according to the first embodiment is configured so that the second display image indicated by the second display information generated by the display generating unit 190 includes the contact desk image corresponding to the contact desk information indicating the contact desk for the article corresponding to the second display image in addition to an image corresponding to the guarantee state information, the guarantee period information, the guarantee availability information, the guarantee contract fee information, or the blanket contract discount availability information.

With the above configuration, the information processing system 1 allows the user to easily contact a contact desk indicated by the contact desk information when the user consults about a failure or the like of an article while presenting, to the user, the detailed information of the article corresponding to the article image selected by the user from among the plurality of article images arranged in the first display image.

In addition, in the above configuration, the information processing system 1 according to the first embodiment is configured so that the second display image indicated by the second display information generated by the display generating unit 190 includes a user's manual storage location image corresponding to user's manual storage location information for acquiring the user's manual of the article corresponding to the second display image in addition to an image corresponding to the guarantee state information, the guarantee period information, the guarantee availability information, the guarantee contract fee information, or the blanket contract discount availability information.

With the above configuration, the information processing system 1 allows the user to easily contact a contact desk indicated by the contact desk information when the user consults about a failure or the like of an article while presenting, to the user, the detailed information of the article corresponding to the article image selected by the user from among the plurality of article images arranged in the first display image.

With the above configuration, the information processing system 1 allows the user to easily view the user's manual when the user refers to the user's manual of the article to check how to use and the like while presenting, to the user, the detailed information of the article corresponding to the article image selected by the user from among the plurality of article images arranged in the first display image.

Furthermore, in addition to the above configuration, the information processing system 1 according to the first embodiment further includes: the viewing history output unit 180 that outputs the viewing history information, which indicates the viewing history of the user of viewing the related information regarding each of the plurality of articles owned by the user, in association with the user information indicating the user and the article information indicating the article; and the user history notifying unit 181 that notifies a contact desk of the user information indicating the user when the user makes an inquiry to the contact desk about a certain article among the plurality of articles owned by the user.

With this configuration, when a person in charge at the contact desk responds to an inquiry about an article from the user, the information processing system 1 allows a person in charge to refer to the viewing history information output by the viewing history output unit 180, that is, the viewing history information of the user corresponding to the article inquired by the user to the contact desk on the basis of the user information notified by the user history notifying unit 181 and the viewing history information output by the viewing history output unit 180.

Since the information processing system 1 provides a person in charge at the contact desk with the viewing history information indicating the viewing history of the user of viewing the related information of the article, the person in charge at the contact desk can respond to the inquiry about the article from the user while referring to the viewing history indicated by the viewing history information when the person in charge responds to the inquiry about the article from the user. In this manner, the person in charge at the contact desk responds to an inquiry about an article from the user while referring to the viewing history information, whereby the person in charge can accurately and promptly respond to the inquiry. As a result, a person in charge can respond to the inquiry from the user without irritating the user who has already viewed the related information regarding the article such as the user's manual of the article, and the customer satisfaction can be improved.

Second Embodiment

An information processing system 1*a* according to a second embodiment will be described by referring to FIGS. 12 to 20.

The configuration of the main part of the information processing system 1*a* according to the second embodiment will be described by referring to FIG. 12.

Figure 12:
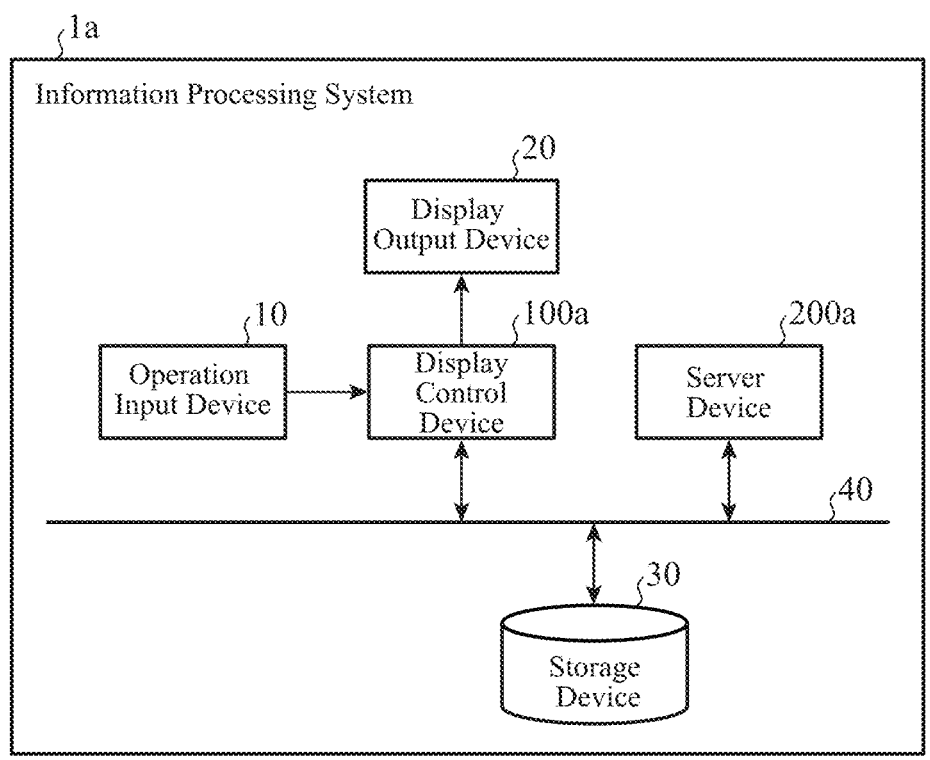
FIG. 12 is a block diagram illustrating an example of the configuration of the main part of an information processing system according to a second embodiment.

FIG. 12 is a block diagram illustrating an example of the configuration of the main part of the information processing system 1*a* according to the second embodiment.

The information processing system 1*a* includes a display control device 100*a*, a server device 200*a*, an operation input device 10, a display output device 20, a storage device 30, and a network 40.

The information processing system 1*a* is different from the information processing system 1 according to the first embodiment in that the display control device 100 and the server device 200 included in the information processing system 1 according to the first embodiment are replaced with the display control device 100*a* and the server device 200*a*.

Note that in FIG. 12 the same symbol is given to a block similar to that illustrated in FIG. 1, and description thereof is omitted.

Similarly to the display control device 100 according to the first embodiment, the display control device 100*a* is disposed inside a general-purpose computer such as a personal computer or an electronic device such as a portable terminal such as a smartphone or a tablet terminal.

Similarly to the server device 200 according to the first embodiment, the server device 200*a* is disposed inside an electronic device such as a general-purpose computer such as a personal computer.

The display control device 100*a* and the server device 200*a* can mutually transmit and receive information via the network 40.

In the first embodiment, the display control device 100 generates the display information indicating the display image in which article images corresponding to the respective articles owned by the user are arranged, and the display control device 100 outputs the display information generated by the display control device 100 to the display output device 20, whereby the display control device 100 causes the display output device 20 to display the display image.

On the other hand, in the second embodiment, the server device 200*a* generates the display information indicating the display image in which the article images corresponding to the respective articles owned by the user are arranged, and the server device 200*a* outputs the display information generated by the server device 200*a* to the display control device 100*a*. In the second embodiment, the display control device 100*a* acquires the display information output by the server device 200*a* and generates a display image by performing rendering processing on the acquired display information. The display control device 100*a* outputs a display signal indicating the display image generated by the display control device 100*a* to the display output device 20, thereby causing the display output device 20 to display the display image.

Specifically, the display information generated by the server device 200*a* is information described in a markup language such as Hypertext Markup Language (HTML). The display information generated by the server device 200*a* may be, for example, obtained by embedding a script such as Server Side Include (SSI), Hypertext Preprocessor (PUP), Active Server Pages (ASP), or the like in information described in a markup language or may be obtained by embedding a mechanism for operating a program in the server device 200*a* such as a Common Gateway Interface (CGI). By embedding a script in the display information generated by the server device 200*a* or a mechanism for operating a program in the server device 200*a*, the display control device 100*a* can display an interactive display image on the display output device 20 depending on the operation performed by the user.

The configuration of the main part of the server device 200*a* according to the second embodiment will be described by referring to FIG. 13.

Figure 13:
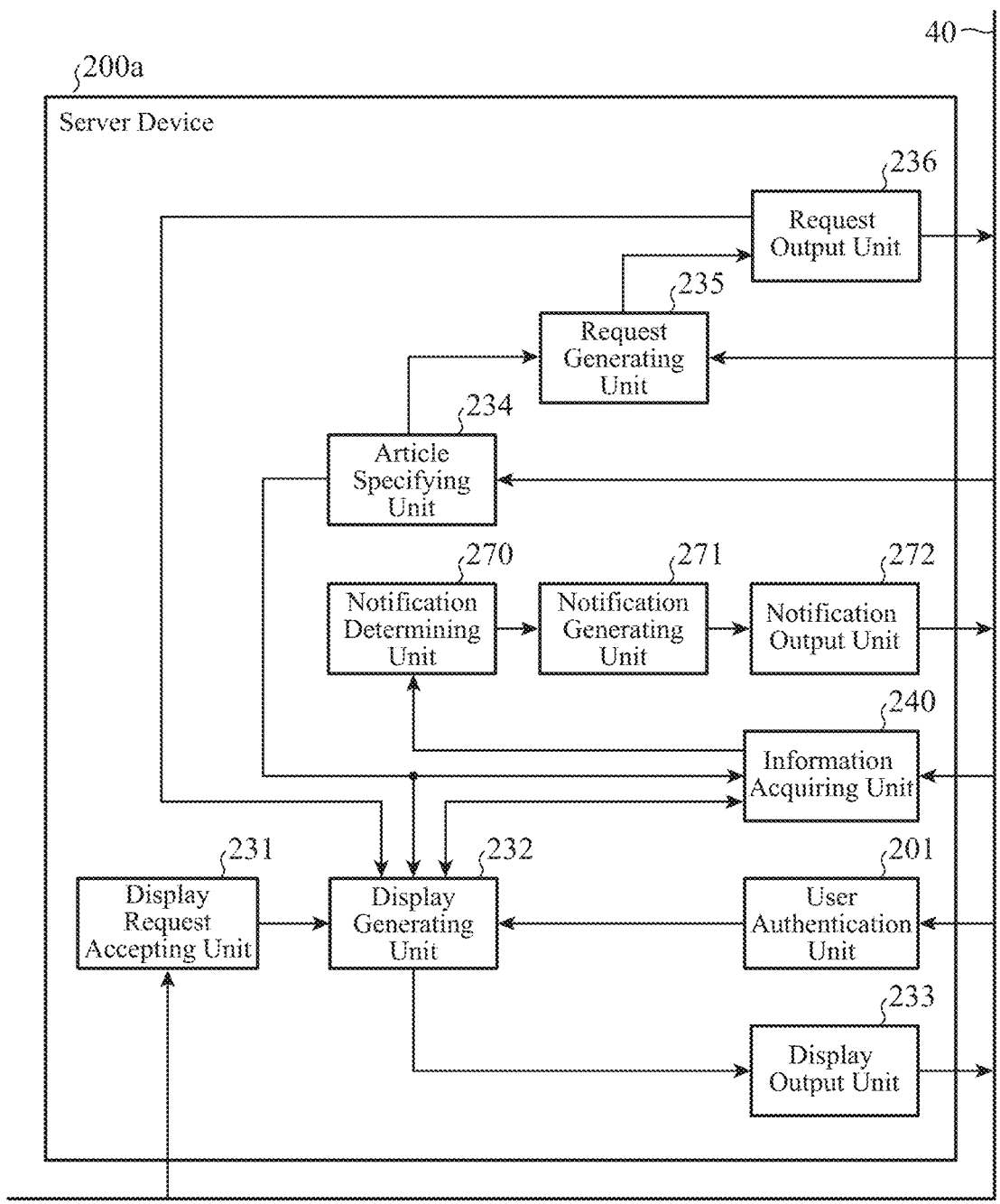
FIG. 13 is a block diagram illustrating an example of the configuration of the main part of a server device according to the second embodiment.

FIG. 13 is a block diagram illustrating an example of the configuration of the main part of the server device 200*a* according to the second embodiment.

The server device 200*a* includes a display generating unit 232, a display output unit 233, an article specifying unit 234, a request generating unit 235, a request output unit 236, and an information acquiring unit 240.

In addition to the above configuration, the server device 200*a* may further include a display request accepting unit 231, a user authentication unit 201, a notification determining unit 270, a notification generating unit 271, and a notification output unit 272.

As illustrated in FIG. 13, description will be given on the premise that the server device 200*a* according to the second embodiment includes the display generating unit 232, the display output unit 233, the article specifying unit 234, the request generating unit 235, the request output unit 236, the display request accepting unit 231, the information acquiring unit 240, the user authentication unit 201, the notification determining unit 270, the notification generating unit 271, and the notification output unit 272.

Note that in FIG. 13 the same symbol is given to a block similar to that illustrated in FIG. 9, and description thereof is omitted.

The display generating unit 232 generates display information (hereinafter, referred to as "first display information") indicating a display image (hereinafter, referred to as a "first display image") in which article images corresponding to respective articles owned by a user is arranged.

The display output unit 233 outputs the first display information generated by the display generating unit 232. Specifically, the display output unit 233 outputs the first display information to the display control device 100a via the network 40. The display control device 100a acquires the first display information output by the display output unit 233 and generates the first display image by performing rendering processing on the acquired first display information. The display control device 100a outputs a display signal indicating the generated first display image to the display output device 20, thereby causing the display output device 20 to display the first display image.

Information used when the display generating unit 232 generates the first display information is stored in advance in the storage device 30, and the information is acquired by the information acquiring unit 240, for example.

The information acquiring unit 240 acquires information stored in the storage device 30 via the network 40 or a dedicated line.

The configuration of the main part of the information acquiring unit 240 included in the server device 200a according to the second embodiment will be described by referring to FIG. 14.

Figure 14:
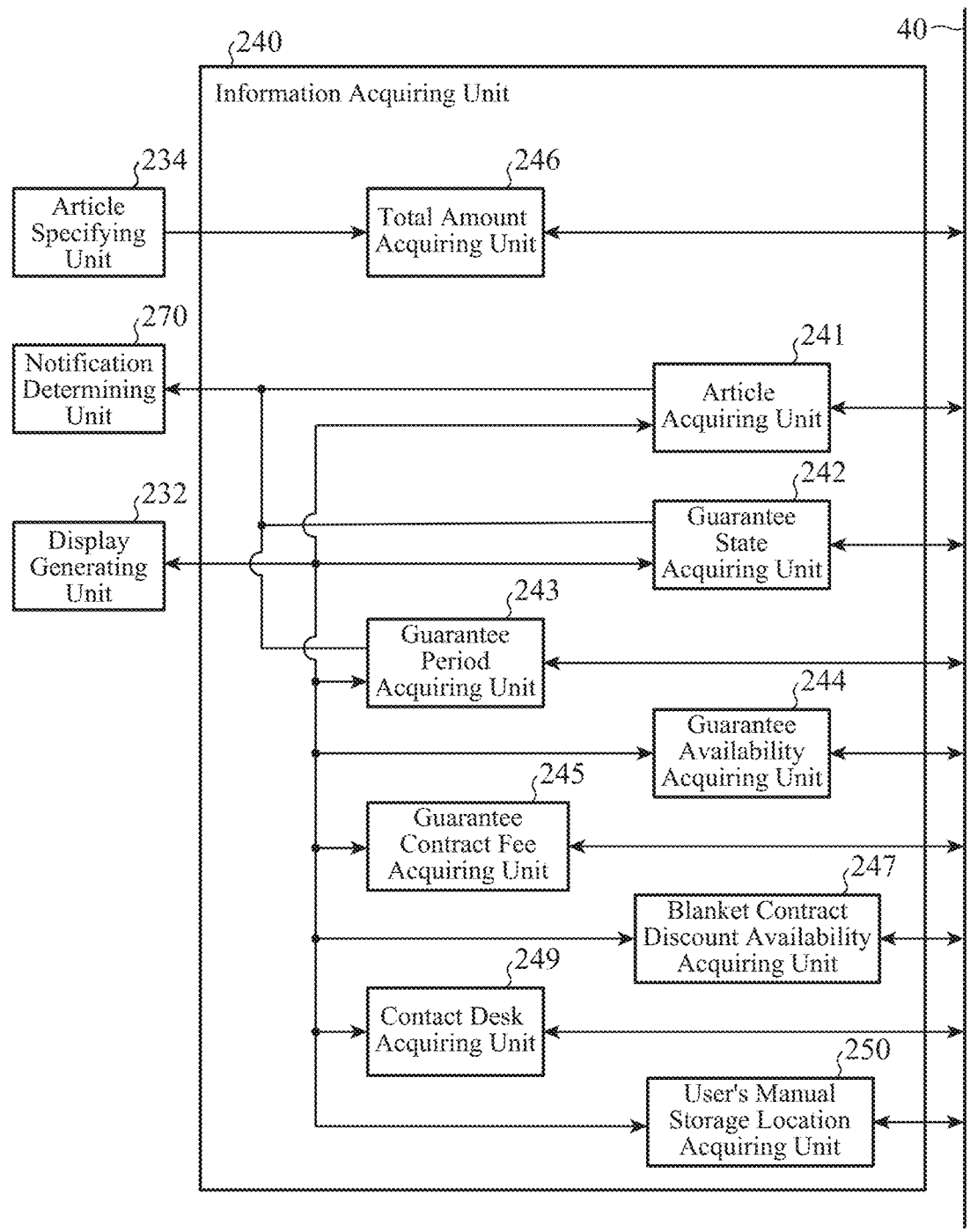
FIG. 14 is a block diagram illustrating an example of the configuration of the main part of an information acquiring unit included in the server device according to the second embodiment.

FIG. 14 is a block diagram illustrating an example of the configuration of the main part of the information acquiring unit 240 included in the server device 200a according to the second embodiment.

The information acquiring unit 240 includes an article acquiring unit 241. The information acquiring unit 240 may further include, in addition to the article acquiring unit 241, a guarantee state acquiring unit 242, a guarantee period acquiring unit 243, a guarantee availability acquiring unit 244, a guarantee contract fee acquiring unit 245, a total amount acquiring unit 246, a blanket contract discount availability acquiring unit 247, a contact desk acquiring unit 249, and a user's manual storage location acquiring unit 250.

Hereinafter, description will be given on the premise that the information acquiring unit 240 includes the article acquiring unit 241, the guarantee state acquiring unit 242, the guarantee period acquiring unit 243, the guarantee availability acquiring unit 244, the guarantee contract fee acquiring unit 245, the total amount acquiring unit 246, the blanket contract discount availability acquiring unit 247, the contact desk acquiring unit 249, and the user's manual storage location acquiring unit 250.

The article acquiring unit 241 acquires the user information output by the display control device 100a among the article information stored in advance in the storage device 30 and acquires a plurality of pieces of article information corresponding to the acquired user information.

Since the article information has been described above, description thereof is omitted.

The guarantee state acquiring unit 242, the guarantee period acquiring unit 243, the guarantee availability acquiring unit 244, the guarantee contract fee acquiring unit 245, the total amount acquiring unit 246, the blanket contract discount availability acquiring unit 247, the contact desk acquiring unit 249, and the user's manual storage location acquiring unit 250 will be described later.

The article specifying unit 234 specifies articles (selected articles) corresponding to one or more respective article images (selected article images) selected by user's operation among the plurality of article images included in the first display image indicated by the first display information generated by the display generating unit 232.

Specifically, for example, the display control device 100a acquires operation information output from the operation input device 10 with the user operating the operation input device 10. In a case where the user's operation indicated by the operation information is for selecting one or more article images from among the plurality of article images included in the first display image, the display control device 100a outputs article information (selected article information) corresponding to the selected article images selected by the user's operation to the server device 200a via the network 40. The article specifying unit 234 acquires the selected article information output by the display control device 100a and specifies articles corresponding to the acquired selected article information.

The request generating unit 235 generates request information for requesting execution of predetermined processing regarding the one or more selected articles specified by the article specifying unit 234.

Specifically, for example, the display control device 100a acquires operation information output from the operation input device 10 with the user operating the operation input device 10. In a case where the user's operation indicated by the operation information is for requesting execution of predetermined processing regarding the articles corresponding to the selected article images, the display control device 100a outputs request notification information for requesting the server device 200a to execute processing to the server device 200a via the network 40. The request generating unit 235 acquires the request notification information output by the display control device 100a. When the request notification information is acquired, the request generating unit 235 generates request information for requesting execution of the predetermined processing regarding the one or more selected articles specified by the article specifying unit 234.

The request output unit 236 outputs the request information generated by the request generating unit 235.

Incidentally, the predetermined processing regarding the article is, for example, processing for concluding an extended guarantee contract of the article. Since the extended guarantee contract has been described above, description thereof is omitted. Note that, hereinafter, description will be given on the premise that extended guarantee contracts include contracts for extending a guarantee contract of the article and new guarantee contracts. Since the new guarantee contract has been described above, the description thereof will be omitted.

The predetermined processing regarding the article is not limited to the processing for concluding the extended guarantee contract of the article.

For example, the predetermined processing regarding the article may be processing of selling the article on an auction site, a flea market site, or a used product sales site. In addition, the predetermined processing regarding the article may be processing of selling the article on a sales site in a case where the user is a seller or a wholesaler that sells new articles as a business. Moreover, the predetermined processing regarding the article may be processing of performing a procedure for recycling or discarding the article. Furthermore, in a case where the article is an insurance contract such as life insurance or non-life insurance signed by the user, the predetermined processing regarding the article may be processing of claiming an insurance money based on the insurance contract after an incident occurs that allows for an insurance claim due to a natural disaster or the like.

Hereinafter, in the second embodiment, description will be given on the premise that the predetermined processing regarding an article is processing for concluding an extended guarantee contract of the article.

In a case where the predetermined processing regarding the article is processing for concluding an extended guarantee contract of the article, the request generating unit 235 generates request information for requesting execution of processing for concluding the extended guarantee contract for the one or more selected articles specified by the article specifying unit 234. More specifically, for example, the request information generated by the request generating unit 235 is information corresponding to an application form necessary for receiving provision of services to the one or more selected articles indicated by the request information from a business operator providing services such as the extended guarantee contract.

The request output unit 236 transmits the acquired request information to a business operator that acquires the request information output by the request output unit 236 and provides services such as a guarantee contract. Specifically, for example, the request output unit 236 transmits the request information to an information processing device that is provided by the business operator, the information processing device for accepting an application necessary for receiving provision of the services. The information processing device to which the request output unit 236 transmits the request information may be configured by a general-purpose computer such as a personal computer or a telephone, a facsimile, or the like.

The first display image indicated by the first display information generated by the display generating unit 232 according to the second embodiment will be described by referring to FIG. 15.

FIG. 15 is an explanatory diagram illustrating an example of the first display image indicated by the first display information generated by the display generating unit 232 according to the second embodiment. Specifically, FIG. 15 is similar to the first display image generated by the display control device 100*a* performing rendering processing on the first display information.

For example, as illustrated in FIG. 15, the display generating unit 232 generates the first display image indicating the first display image in which article images corresponding to the respective articles owned by the user are arranged. Specifically, the display generating unit 232 generates the first display information indicating the first display image by generating display information indicating a display image in which article images obtained by making graphics of the plurality of pieces of article information acquired by the article acquiring unit 241 are arranged.

For example, after selecting one or more article images among the plurality of article images illustrated in FIG. 15 by a predetermined user's operation, the user selects an image indicating a "request" button illustrated in FIG. 15 by a predetermined user's operation, thereby collectively requesting processing for concluding the extended guarantee contracts for the articles corresponding to the one or more respective article images selected by the user.

With this configuration, the information processing system 1*a* allows the user to select one or more articles and to collectively request to execute predetermined processing on the selected one or more articles.

The display request accepting unit 231 acquires the display request information output from the display control device 100*a* and causes the display generating unit 232 to generate display information corresponding to the acquired display request information.

In a case where the server device 200*a* includes the display request accepting unit 231, the display generating unit 232 may generate display information corresponding to the display request information acquired by the display request accepting unit 231 in addition to the first display information.

The display information corresponding to the display request information includes the display information (user authentication display information) indicating the display image for user authentication (user authentication display image), the first display information indicating the first display image in which article images corresponding to the plurality of respective articles owned by the user are arranged, the display information (second display information) indicating the display image (second display image) indicating detailed information regarding an article corresponding to one article image selected by user's operation, and the like.

In a case where the display generating unit 232 generates mutually different display information such as the user authentication display information, the first display information, or the second display information, the display output unit 233 outputs the display information when the display generating unit 232 newly generates display information.

The user authentication display image indicated by the user authentication display information generated by the display generating unit 232 according to the second embodiment will be described by referring to FIG. 16.

FIG. 16 is an explanatory diagram illustrating an example of the user authentication display image indicated by the user authentication display information generated by the display generating unit 232 according to the second embodiment. Specifically, illustrated in FIG. 16 is a user authentication display image generated by the display control device 100*a* performing rendering processing on the user authentication display information.

In a case where the display information corresponding to the display request information acquired by the display request accepting unit 231 is the user authentication display information, the display generating unit 232 generates user authentication display information indicating the user authentication display image including, for example, an area for inputting the user information such as a user ID and an area for inputting the password information as illustrated in FIG. 16.

The user authentication unit 201 receives the user information and the password information output from the display control device 100*a* via the network 40 and compares the user information and the password information that have been received with the user information and the password information included in the authentication information stored in advance in the storage device 30, thereby performing user authentication. In a case where the user authentication unit 201 determines that the received user information and the received password information do not match the user information and the password information included in the authentication information stored in advance in the storage device 30, the display generating unit 232 may generate display information indicating a display image indicating that the user authentication has failed and cause the display output unit 233 to output the generated display information.

In a case where the user authentication unit 201 determines that the received user information and the received password information match the user information and the password information included in the authentication information stored in advance in the storage device 30, the display generating unit 232 may, for example, generate the first display information and cause the display output unit 233 to output the generated display information.

Hereinafter, description will be given on the premise that the user authentication unit 201 has determined that the received user information and the password information match the user information and the password information included in the authentication information stored in advance in the storage device 30.

The guarantee state acquiring unit 242 acquires, for each of the plurality of articles owned by the user, guarantee state information indicating whether or not the article is guaranteed. Specifically, for example, the guarantee state acquiring unit 242 acquires guarantee state information corresponding to each of the plurality of pieces of article information corresponding to the user information among guarantee state information stored in advance in the storage device 30.

The guarantee state acquiring unit 242 may generate and acquire the guarantee state information indicating whether or not an article is guaranteed by determining whether or not it is in the guarantee period of the article indicated by the guarantee period information on the basis of the guarantee period information acquired by the guarantee period acquiring unit 243 to be described later.

In a case where the information acquiring unit 240 includes the guarantee state acquiring unit 242, for example, as illustrated in FIG. 15, in a case where guarantee state information corresponding to a certain article indicates that the article is in the guaranteed state on the basis of the guarantee state information acquired by the guarantee state acquiring unit 242, the display generating unit 232 generates the first display information indicating the first display image in which an under-guarantee image indicating that the article is in a guaranteed state is associated with an article image corresponding to the article. Since the under-guarantee image has been described above, detailed description thereof will be omitted.

In the first display image illustrated in FIG. 15, as an example of the under-guarantee image, an under-guarantee icon image including characters "under guarantee" indicating that the article is in a guaranteed state is disposed in a heart-shaped graphic at a position corresponding to the article image. The under-guarantee image illustrated in FIG. 15 is merely an example, and the shape and the like of the under-guarantee image are not limited to those of the under-guarantee image illustrated in FIG. 15.

With the above configuration, the information processing system 1a can allow the user to intuitively grasp which article is in a guaranteed state and which article is in a non-guaranteed state among the plurality of articles owned by the user.

Note that, in a case where guarantee state information corresponding to a certain article indicates that the article is in a non-guaranteed state on the basis of the guarantee state information acquired by the guarantee state acquiring unit 242, the display generating unit 232 may generate the first display information indicating the first display image in which an image indicating that the article is in a non-guaranteed state is associated with an article image corresponding to the article.

The guarantee period acquiring unit 243 acquires, for each of the plurality of articles owned by the user, guarantee period information indicating a guarantee period of the article. Specifically, for example, the guarantee period acquiring unit 243 acquires guarantee period information corresponding to each of the plurality of pieces of article information corresponding to the user information among the guarantee state information stored in advance in the storage device 30.

Furthermore, in a case where the information acquiring unit 240 includes the guarantee period acquiring unit 243, the display generating unit 232 may generate the first display information indicating the first display image in which, for example, a guarantee period image indicating at least the end of the guarantee period indicated by the guarantee period information corresponding to an article is associated with an article image corresponding to the article on the basis of the guarantee period information acquired by the guarantee period acquiring unit 243 as in the first display image illustrated in FIG. 15. Since the guarantee period image has been described above, detailed description thereof will be omitted.

With the above configuration, the information processing system 1a can allow the user to grasp the end of the guarantee period while allowing the user to intuitively grasp which article is in a guaranteed state and which article is in a non-guaranteed state among the plurality of articles owned by the user.

Note that, on the basis of the guarantee period information acquired by the guarantee period acquiring unit 243, the display generating unit 232 may generate the first display information indicating the first display image in which an article image corresponding to an article is associated with a guarantee period image indicating the start of the guarantee period in addition to the end of the guarantee period indicated by the guarantee period information corresponding to the article.

Moreover, in a case where the guarantee period information acquired by the guarantee period acquiring unit 243 includes information indicating the guarantee period of an extended guarantee contract of the article in which the guarantee period is extended after expiration of the guarantee contract of the article, the extended guarantee contract of the article having been already concluded, in addition to the information indicating the guarantee period of the guarantee contract of the article, the display generating unit 232 may generate the first display information indicating the first display image in which an image indicating the guarantee period of the extended guarantee contract of the article indicated by the guarantee period information is associated with the article image corresponding to the article in addition to the image (guarantee period image) indicating the guarantee period of the article indicated by the guarantee period information.

Furthermore, in a case where the information acquiring unit 240 includes the guarantee period acquiring unit 243, the display generating unit 232 may generate the first display information indicating the first display image in which an under-guarantee image of a mode corresponding to the guarantee period of the article indicated by the guarantee period information is associated with an article image corresponding to the article on the basis of the guarantee period information acquired by the guarantee period acquiring unit 243. The display generating unit 232 generates the first display information indicating the first display image in which the under-guarantee image having a mode corresponding to the guarantee period is associated with the article image corresponding to an article by changing the color of the under-guarantee image depending on, for example, the length of the remaining period of the guarantee period g.

The mode of the under-guarantee image corresponding to the guarantee period is not limited to the one in which the color of the under-guarantee image is changed depending on the guarantee period and may be, for example, one in which the shape, the size, or the like of the under-guarantee image is changed depending on the guarantee period.

With the above configuration, the information processing system 1a can allow the user to intuitively grasp the article of which guarantee period is about to expire while allowing the user to intuitively grasp which article is in a guaranteed state and which article is in a non-guaranteed state among the plurality of articles owned by the user.

The guarantee availability acquiring unit 244 acquires guarantee availability information indicating whether or not an extended guarantee contract is available for each of the plurality of articles owned by the user. Specifically, for example, the guarantee availability acquiring unit 244 acquires guarantee availability information corresponding to each of the plurality of pieces of article information corresponding to the user information among guarantee availability information stored in advance in the storage device 30.

In a case where the information acquiring unit 240 includes the guarantee availability acquiring unit 244, for example, as illustrated in FIG. 15, in a case where it is indicated that an extended guarantee contract is available with respect to guarantee availability information corresponding to a certain article on the basis of the guarantee availability information acquired by the guarantee availability acquiring unit 244, the display generating unit 232 generates the first display information indicating the first display image in which the guarantee availability image indicating that the extended guarantee contract is available is associated with the article image corresponding to the article. Since the guarantee availability image has been described above, detailed description thereof will be omitted.

With the above configuration, the information processing system 1a can allow the user to grasp articles for which the guarantee contract can be concluded among the plurality of articles owned by the user.

Note that the guarantee availability image illustrated in FIG. 15 is a guarantee availability character image, however, the guarantee availability image illustrated in FIG. 15 is merely an example, and the guarantee availability image is not limited to the guarantee availability character image.

For example, the guarantee availability image may be the guarantee availability icon image. Moreover, for example, in a case where the guarantee availability image is the guarantee availability icon image and the under-guarantee image is the under-guarantee icon image, the display generating unit 232 may generate the first display image in which the guarantee availability icon image is superimposed on the under-guarantee icon image.

With the above configuration, the information processing system 1a can cause the user to intuitively grasp articles for which an extended guarantee contract can be concluded among the plurality of articles owned by the user.

In addition, in a case where the information acquiring unit 240 includes the guarantee availability acquiring unit 244, for example, in a case where guarantee availability information corresponding to a certain article indicates that no extended guarantee contract is available on the basis of the guarantee availability information acquired by the guarantee availability acquiring unit 244, the display generating unit 232 may generate the first display information indicating the first display image indicating that an article image indicating the article cannot be selected by user's operation.

Specifically, for example, the display generating unit 232 generates the first display information indicating the first display image indicating that an article image indicating an article for which no extended guarantee contract is available cannot be selected by user's operation by generating the first display information indicating the first display image in which the luminance of an article image indicating the article, for which no extended guarantee contract is available, is set to have a smaller value as compared to the luminance of another article image.

The method of generating, by the display generating unit 232, the first display information indicating the first display image indicating that the article image indicating the article, for which no extended guarantee contract is available, cannot be selected by user's operation is not limited to the method of generating the first display information indicating the first display image in which the luminance of the article image indicating the article, for which no extended guarantee contract is available, is set to have a smaller value as compared to the luminance of another article image.

Specifically, for example, the display generating unit 232 may generate the first display information indicating the first display image indicating that an article image indicating an article, for which no extended guarantee contract is available, cannot be selected by user's operation by generating the first display information indicating the first display image in which an image, which indicates a check box aligned in correspondence with the article image indicating the article for which no extended guarantee contract is available, is grayed out.

With the above configuration, the information processing system 1a can allow the user to easily select, by user's operation, an article image corresponding to an article for which a guarantee contract can be concluded while allowing the user to easily grasp an article for which an extended guarantee contract can be concluded among the plurality of articles owned by the user.

In addition, in a case where the information acquiring unit 240 includes the guarantee availability acquiring unit 244, for example, in a case where guarantee availability information corresponding to a certain article indicates that no extended guarantee contract is available on the basis of the guarantee availability information acquired by the guarantee availability acquiring unit 244, the display generating unit 232 may generate the first display information indicating the first display image in which user's operation of selecting the article image indicating the article is not accepted.

Moreover, in a case where the information acquiring unit 240 includes the guarantee availability acquiring unit 244, the display generating unit 232 may generate display information indicating a notification image such as "No extended guarantee contract is available for the selected article." in a case where the operation information indicates user's operation of selecting the article image indicating the article for which no extended guarantee contract is available on the basis of the operation information acquired by the display control device 100a and the guarantee availability information acquired by the guarantee availability acquiring unit 244. Specifically, for example, the display generating unit 232 generates display information in such a manner that the notification image pops up.

With the above configuration, the information processing system 1a can prevent the user from erroneously selecting the article image corresponding to the article by the user's operation with respect to an article for which a guarantee contract is not available among the plurality of articles owned by the user and outputting the request information for requesting a guarantee contract of the article. In addition, with the above configuration, the information processing system 1a can suppress an application for an extended guarantee contract to a guarantee company for an article for which the extended guarantee contract is not available, and thus both the business efficiency of the guarantee company and the customer satisfaction can be improved.

In a case where guarantee availability information corresponding to a certain article indicates that an extended guarantee contract is available on the basis of the guarantee availability information acquired by the guarantee availability acquiring unit 244, the guarantee contract fee acquiring unit 245 acquires guarantee contract fee information indicating the guarantee contract fee which is the amount of money required for the extended guarantee contract of the article. Specifically, for example, the guarantee contract fee acquiring unit 245 acquires the guarantee contract fee information corresponding to article information corresponding to the guarantee availability information indicating that an extended guarantee contract is available among guarantee contract fee information stored in advance in the storage device 30.

In a case where the information acquiring unit 240 includes the guarantee contract fee acquiring unit 245, for example, as illustrated in FIG. 15, the display generating unit 232 generates display information indicating a display image in which a guarantee contract fee image indicating the guarantee contract fee indicated by the guarantee contract fee information is associated with an article image indicating the article corresponding to the guarantee contract fee information on the basis of the guarantee contract fee information acquired by the guarantee contract fee acquiring unit 245.

With the above configuration, the information processing system 1a can allow the user to grasp the amount of money required for an extended guarantee contract of the article while allowing the user to grasp an article for which an extended guarantee contract is available among the plurality of articles owned by the user.

The guarantee contract fee indicated by the guarantee contract fee information acquired by the guarantee contract fee acquiring unit 245 is not limited to one guarantee contract fee even for articles having the same model number.

For example, a guarantee contract fee for an extended guarantee contract of an article may differ depending on the number of days elapsed from the date of purchase of the article even for articles having the same model number. Since this case has been described above, the description thereof will be omitted.

Meanwhile, for example, in a case where the user selects a "sort" button illustrated in FIG. 15 by predetermined user's operation such as single tap or single click, that is, in a case where the display control device 100a acquires operation information based on the user's operation of selecting the "sort" button, the display generating unit 232 may generate the first display information in which the arrangement order of the article images in the first display image is changed. Specifically, for example, in this case, the display generating unit 232 determines the arrangement order of the article images in the first display image in accordance with a predetermined sorting condition on the basis of information such as the article information the guarantee state information, the guarantee period information, or the guarantee availability information associated with the articles corresponding to the respective article images, and generates the first display information indicating the first display image in which the article images are arranged in accordance with the determined arrangement order.

With this configuration, the information processing system 1a can allow the user to find a desired article image in a short time even in a case where a large number of article images are arranged in the first display image. As a result, the information processing system 1a can allow the user to find a desired article image in a short time even in a case where a large number of article images are arranged in the first display image.

Furthermore, for example, in a case where the user selects a "refine" button illustrated in FIG. 15 by predetermined user's operation such as single tap or single click, that is, in a case where the display control device 100a acquires operation information based on the user's operation of selecting the "refine" button, the display generating unit 232 may generate the first display information in which only article images conforming to a condition designated by the user are arranged from among the plurality of article images included in the first display image. Specifically, for example, in this case, the display generating unit 232 extracts, from the plurality of article images included in the first display image, an article image conforming to information designated by the user from information such as the article information, the guarantee state information, the guarantee period information, or the guarantee availability information associated with the articles corresponding to the respective article images. The display generating unit 232 generates the first display information indicating the first display image in which only the extracted article images are arranged.

With this configuration, the information processing system 1a can allow the user to find a desired article image in a short time even in a case where a large number of article images are arranged in the first display image. As a result, the information processing system 1a can allow the user to find a desired article image in a short time even in a case where a large number of article images are arranged in the first display image.

The total amount acquiring unit 246 acquires article information (hereinafter referred to as "selected article information") corresponding to one or more respective article images selected on the basis of the user's operation from the display control device 100a and acquires total amount information indicating the total amount of the guarantee contract fees of the respective articles (hereinafter, referred to as the "selected articles") corresponding to the acquired one or more respective pieces of selected article information. Specifically, for example, the total amount acquiring unit 246 calculates the total amount by adding up the respective guarantee contract fees of the one or more selected articles on the basis of the selected article information acquired from the display control device 100a and the guarantee contract fee information acquired by the guarantee contract fee acquiring unit 245 and acquires the total amount information indicating the total amount.

In a case where the information acquiring unit 240 includes the total amount acquiring unit 246, for example, as illustrated in FIG. 15, the display generating unit 232 generates the first display information indicating the first display image obtained by including, in the display image indicated by the display information, a total amount image indicating the total amount indicated by the total amount information acquired by the total amount acquiring unit 246.

Specifically, for example, the display control device 100*a* transmits the selected article information to the server device 200*a* every time the user selects an article image by user's operation, and the total amount acquiring unit 246 acquires the total amount information corresponding to the selected article information every time the selected article information is acquired. Furthermore, every time the total amount acquiring unit 246 acquires the total amount information, the display generating unit 232 generates the first display information indicating the first display image including the total amount image indicating the total amount indicated by the total amount information.

Note that the display control device 100*a* may transmit the selected article information to the server device 200*a* every time the user cancels the selection of an article image by user's operation from the article images that have been already selected by user's operation.

In addition, every time the total amount acquiring unit 246 acquires the total amount information, when generating the first display information indicating the first display image including the total amount image indicating the total amount indicated by the total amount information, the display generating unit 232 may generate the first display information indicating the first display image including the total amount image expressed by animation of the transition from the total amount indicated by the total amount image in the first display image indicated by the first display information generated immediately before by the display generating unit 232 to the total amount indicated by the total amount information acquired by the total amount acquiring unit 246.

With the above configuration, the information processing system 1*a* can present, to the user, the total amount required when the user concludes an extended guarantee contract for all the articles for which the user desires an extended guarantee contract while allowing the user to select an article image corresponding to the article for which the user desires the extended guarantee contract among the plurality of articles owned by the user.

In addition, in a case where the amount of money required for extended guarantee contracts is discounted by concluding a blanket extended guarantee contract for all of two or more selected articles among the plurality of selected articles, the total amount acquiring unit 246 may acquire discount amount information in addition to acquiring the total amount information.

In a case where the total amount acquiring unit 246 acquires the total amount information and the discount amount information, the display generating unit 232 generates the first display information indicating the first display image in which a discount amount image indicating the discount amount or the discounted amount indicated by the discount amount information acquired by the total amount acquiring unit 246 is associated with the total amount image, in addition to the total amount image.

Note that, in FIG. 15, as an example, the first display image in which the discount amount image indicating the discounted amount is associated with the total amount image is illustrated. Since the discount amount and the discounted amount indicated by the discount amount information have been described above, the description thereof will be omitted.

Specifically, for example, the total amount acquiring unit 246 acquires, for all of two or more selected articles among the plurality of selected articles, the discount information corresponding to each of the selected articles, the discount information indicating a predetermined discount amount or a discount rate.

Since the discount amount and the discount rate indicated by the discount information have been described above, description thereof will be omitted.

The total amount acquiring unit 246 calculates a discount amount at the time of concluding the blanket extended guarantee contract on the basis of the acquired discount information and acquires the discount amount information indicating the calculated discount amount or the discounted amount in addition to the total amount information.

The total amount acquiring unit 246 may acquire the total amount information and the discount amount information by the following method.

For example, first, the user selects a "package" button as illustrated in FIG. 4, which is a "package" button not illustrated in FIG. 15, by predetermined user's operation such as single tap or single click. When the "package" button is selected by the user's operation, the display control device 100*a* acquires operation information based on the user's operation. The display control device 100*a* outputs the operation information based on the user's operation to the server device 200*a*. On the basis of the operation information output by the display control device 100*a*, the display generating unit 232 generates a plan image (not illustrated in FIG. 15) indicating each of one or more package plans and generates plan selecting menu information indicating a plan selecting menu image (not illustrated in FIG. 15) in which the generated one or more plan images are arranged. The display output unit 233 outputs the plan selecting menu information generated by the display generating unit 232 to the display control device 100*a*. The display control device 100*a* acquires the plan selecting menu information output by the display output unit 233. The display control device 100*a* renders the acquired plan selecting menu information and causes the display output device 20 to display a plan selecting menu image (not illustrated in FIG. 15) indicated by the plan selecting menu information.

The user selects a desired package plan from among the one or more package plans by selecting a desired plan image from among the one or more plan images included in the plan selecting menu image by the predetermined user's operation. Since the package plan has been described above, the description thereof will be omitted.

When the plan image is selected by the user's operation, the display control device 100*a* acquires operation information based on the user's operation and outputs the acquired operation information to the server device 200*a*. The total amount acquiring unit 246 acquires the total amount information indicating the total amount obtained by adding up the respective guarantee fees indicated by the guarantee contract fee information corresponding to the one or more selected articles and the discount amount information of the package plan corresponding to the operation information output by the display control device 100*a*.

Note that, in a case where the package plan selected by the user's operation is the number-of-items plan, the display generating unit 232 may generate such a first display information that prevents the display control device 100*a* from acquiring the operation information based on the user's operation of selecting any more articles when the number of selected articles reaches a predetermined number.

Furthermore, in a case where the package plan selected by the user's operation is the number-of-items plan, when the number of selected articles exceeds a predetermined number, the display generating unit 232 may generate notification display information for notifying the user that articles exceeding the predetermined number have been selected, and the display output unit 233 may output the notification display information generated by the display generating unit 232 to the display control device 100*a*. The notification display information output by the display output unit 233 is rendered by the display control device 100*a*, and the display control device 100*a* outputs a display signal corresponding to the image indicated by the notification display information to the display output device 20, thereby causing the image indicated by the notification display information generated by the display generating unit 232 to be displayed as a pop up on the display output device 20, for example. For example, when the number of selected articles is reduced by user's operation and the number of selected articles becomes less than or equal to the predetermined number, the display generating unit 232 stops generating the notification display information and prevents the pop-up from being displayed on the display output device 20.

Likewise, in a case where the package plan selected by the user's operation is the price plan, when the total amount obtained by adding up the guarantee fees indicated by the guarantee contract fee information corresponding to the respective selected articles exceeds the predetermined allowable amount of money, the display generating unit 232 may generate notification display information for notifying the user that the total amount exceeds the allowable amount, and the display output unit 233 may output the notification display information generated by the display generating unit 232 to the display control device 100*a*. The notification display information output by the display output unit 233 is rendered by the display control device 100*a*, and the display control device 100*a* outputs a display signal corresponding to the image indicated by the notification display information to the display output device 20, thereby causing the image indicated by the notification display information generated by the display generating unit 232 to be displayed as a pop up on the display output device 20, for example. For example, when the number of selected articles is reduced by user's operation and the total amount becomes less than or equal to the predetermined allowable amount of money, the display generating unit 232 stops generating the notification display information and prevents the pop-up from being displayed on the display output device 20.

With the above configuration, the information processing system 1*a* can present, to the user, the amount of money discounted or the total amount after the discount when the user concludes an extended guarantee contract for all the articles for which the user desires an extended guarantee contract in addition to the total amount required when the user concludes an extended guarantee contract for all the articles for which the user desires an extended guarantee contract while allowing the user to select an article image corresponding to the article for which the user desires the extended guarantee contract among the plurality of articles owned by the user.

In a case where the article specifying unit 234 specifies a plurality of selected articles, the blanket contract discount availability acquiring unit 247 acquires the blanket contract discount availability information indicating whether or not an amount of money required for the extended guarantee contract is discounted by concluding the blanket extended guarantee contract for all of two or more selected articles among the plurality of selected articles specified by the article specifying unit 234. Specifically, for example, the blanket contract discount availability acquiring unit 247 acquires blanket contract discount availability information corresponding to article information corresponding to the respective articles owned by the user from among the blanket contract discount availability information stored in advance in the storage device 30.

In a case where the information acquiring unit 240 includes the blanket contract discount availability acquiring unit 247, as illustrated in FIG. 15, the display generating unit 232 generates display information indicating a display image in which a blanket-discounted item image indicating that the article is a target article for which the amount of money required for an extended guarantee contract is discounted by concluding a blanket extended guarantee contract, is associated with an article image indicating an article corresponding to the blanket contract discount availability information on the basis of the blanket contract discount availability information acquired by the blanket contract discount availability acquiring unit 247. Since the blanket-discounted item image has been described above, description thereof will be omitted.

Note that the blanket-discounted item image illustrated in FIG. 15 is a blanket-discounted item image, however, the blanket-discounted item image illustrated in FIG. 15 is merely an example, and the blanket-discounted item image may be a blanket-discounted item icon image or the like as long as the blanket-discounted item image indicates that the article is an article for which an amount required for the extended guarantee contract is discounted by concluding the blanket extended guarantee contract.

With the above configuration, the information processing system 1*a* allows the user to grasp an article, for which the amount of money required for an extended guarantee contract is discounted by concluding a blanket extended guarantee contract, while allowing the user to grasp an article for which an extended guarantee contract is available among the plurality of articles owned by the user.

In a case where the article is an article for which the amount required for the extended guarantee contract is discounted by concluding the blanket extended guarantee contract, the display generating unit 232 may use an image indicating a discount amount or a discount rate applied to the extended guarantee contract of the article as a blanket-discounted item image and generate the first display information indicating the first display image in which the image is associated with an article image indicating the article.

With this configuration, the information processing system 1*a* allows the user to grasp an article, for which the amount of money required for an extended guarantee contract is discounted by concluding a blanket extended guarantee contract, while allowing the user to grasp an article for which an extended guarantee contract is available among the plurality of articles owned by the user. Furthermore, in a case where a blanket extended guarantee contract is concluded for an article for which the amount of money required for an extended guarantee contract is discounted by concluding the blanket extended guarantee contract, the information processing system 1*a* can allow the user to grasp the discount amount or the discount rate applied to the extended guarantee contract of the article.

Note that, as described above, the discount amount or the discount rate indicated is determined on the basis of, for example, the number of selected articles, a predetermined combination of selected articles of different types, the number of selected articles of the same type, the total amount obtained by adding up guarantee fees indicated by the guarantee contract fee information corresponding to the respective selected articles, or others. Therefore, the discount amount or the discount rate indicated by the blanket-discounted item image included in the first display image indicated by the first display information dynamically fluctuates depending on the number of selected articles, the type of selected articles, the number of selected articles of the same type, the total amount obtained by adding up guarantee fees indicated by the guarantee contract fee information corresponding to the respective selected articles, or others, when the first display information is output.

Therefore, with this configuration, the user can grasp an article image corresponding to an article for which an extended guarantee contract that is advantageously bracketed can be concluded by additionally selecting the article with respect to the currently selected article.

The contact desk acquiring unit 249 and the user's manual storage location acquiring unit 250 will be described later.

The second display image indicated by the second display information generated by the display generating unit 232 according to the second embodiment will be described by referring to FIG. 17.

FIG. 17 is an explanatory diagram illustrating an example of the second display image indicated by the second display information generated by the display generating unit 232 according to the second embodiment. Specifically, FIG. 17 is similar to the second display image generated by the display control device 100a rendering the second display information.

In a case where the display information corresponding to the display request information acquired by the display request accepting unit 231 is the second display information, the display generating unit 232 generates the second display information indicating the second display image indicating detailed information regarding the article corresponding to one article image selected by the user's operation.

Specifically, for example, the display request information acquired by the display request accepting unit 231 includes information indicating that the display control device 100a is requesting the second display information and article information corresponding to the article image selected by the user's operation. The display generating unit 232 generates the second display information indicating the second display image indicating the detailed information regarding the article corresponding to the article information included in the display request information on the basis of the display request information acquired by the display request accepting unit 231.

Further, as illustrated in FIG. 17, the second display image may include an image indicating whether or not the article is in a guaranteed state, the guarantee period of the article, whether or not an extended guarantee contract is available for the article, an amount of money required for the extended guarantee contract, or whether or not the amount of money required for the extended guarantee contract is discounted by executing a blanket extended guarantee contract bracketed by combining the article and another article different from the article.

Note that the second display image illustrated in FIG. 17 is merely an example, and the second display image does not necessary include all of the images indicating whether or not the article is in a guaranteed state, the guarantee period of the article, whether or not an extended guarantee contract is available for the article, an amount of money required for the extended guarantee contract, and whether or not the amount of money required for the extended guarantee contract is discounted by executing a blanket extended guarantee contract bracketed by combining the article and another article different from the article and may include some of the images.

Although not illustrated in FIG. 17, the second display image may include an image indicating an amount of money discounted from the amount of money required for the extended guarantee contract when the extended guarantee contract of the article is concluded, the discount rate, or the amount of money after the discount of the extended guarantee contract.

With the above configuration, the information processing system 1a can present, to the user, detailed information of an article corresponding to an article image selected by the user among the plurality of article images arranged in the first display image. As a result, the information processing system 1a allows the user to view detailed information of the article corresponding to the article image selected by the user, thereby allowing the user to easily determine whether or not the user concludes the extended guarantee contract.

Note that, in a case where the display generating unit 232 generates the second display information, the display generating unit 232 may generate the second display information instead of the first display information or may generate two pieces of display information of the first display information and the second display information. In a case where the display generating unit 232 generates the two pieces of display information of the first display information and the second display information, the display control device 100a may simultaneously output a display signal corresponding to the first display image and a display signal corresponding to the second display information so that the first display image indicated by the first display information and the second display image indicated by the second display information are simultaneously displayed in different display areas in the display output device 20.

Moreover, the second display image indicated by the second display information generated by the display generating unit 232 may include, for example, as illustrated in FIG. 17, a contact desk image corresponding to contact desk information indicating a contact desk for the article corresponding to the second display image in addition to, for example, an image corresponding to the guarantee state information, the guarantee period information, the guarantee availability information, the guarantee contract fee information, or the blanket contract discount availability information as illustrated in FIG. 17.

Incidentally, the contact desk information indicates a point of contact such as a telephone number or an e-mail address of a contact desk such as a user support counter provided by the manufacturer of the article, a shop where the article was purchased, a business operator who provides a guarantee or an extended guarantee of the article, or others. Since the contact desk information has been described above, the description thereof will be omitted.

By selecting the contact desk image by user's operation, the user can contact the point of contact such as the telephone number or the e-mail address of the contact desk indicated by the contact desk information and consult about a failure or the like of the article.

The contact desk information is acquired by, for example, the contact desk acquiring unit 249 included in the information acquiring unit 240.

Specifically, for example, the contact desk acquiring unit 249 included in the information acquiring unit 240 acquires the contact desk information corresponding to the article corresponding to the second display image from among contact desk information stored in advance in the storage device 30. More specifically, for example, the contact desk acquiring unit 249 searches and acquires contact desk information corresponding to the article information included in the display request information acquired by the display request accepting unit 231 from among the contact desk information stored in advance in the storage device 30.

With the above configuration, the information processing system 1a allows the user to easily contact the contact desk indicated by the contact desk information when the user consults about a failure or the like of an article.

Moreover, the second display image indicated by the second display information generated by the display generating unit 232 may include, for example, as illustrated in FIG. 17, a user's manual storage location image corresponding to user's manual storage location information for acquiring the user's manual of the article corresponding to the second display image in addition to an image corresponding to the guarantee state information, the guarantee period information, the guarantee availability information, the guarantee contract fee information, or the blanket contract discount availability information.

Incidentally, the user's manual storage location information for acquiring the user's manual is information indicating a URL or the like indicating the storage location of the user's manual.

The user can cache or download the user's manual and view the user's manual by selecting the user's manual storage location image by user's operation.

Specifically, for example, the user's manual is cached or downloaded by the display control device 100a.

Meanwhile, the user's manual storage location information is acquired by, for example, the user's manual storage location acquiring unit 250 included in the information acquiring unit 240.

Specifically, for example, the user's manual storage location acquiring unit 250 included in the information acquiring unit 240 acquires user's manual storage location information corresponding to an article corresponding to the second display image from among user's manual storage location information stored in advance in the storage device 30. More specifically, for example, the user's manual storage location acquiring unit 250 searches and acquires the user's manual storage location information corresponding to the article information included in the display request information acquired by the display request accepting unit 231 from among the user's manual storage location information stored in advance in the storage device 30.

With the above configuration, the information processing system 1a allows the user to easily view the user's manual when the user refers to the user's manual of the article to check how to use or the like.

Since the notification determining unit 270, the notification generating unit 271, and the notification output unit 272 have been described in the first embodiment, description thereof will be omitted.

Note that the functions of the display generating unit 232, the display output unit 233, the article specifying unit 234, the request generating unit 235, the request output unit 236, the display request accepting unit 231, the information acquiring unit 240, the user authentication unit 201, the notification determining unit 270, the notification generating unit 271, and the notification output unit 272 included in the server device 200a may be implemented by the processor 1001 and the memory 1002 or may be implemented by the processing circuit 1003 in the hardware configurations exemplified in FIGS. 10A and 10B.

The operation of the server device 200a according to the second embodiment will be described by referring to FIGS. 18A, 18B, and 18C.

Figure 18A:
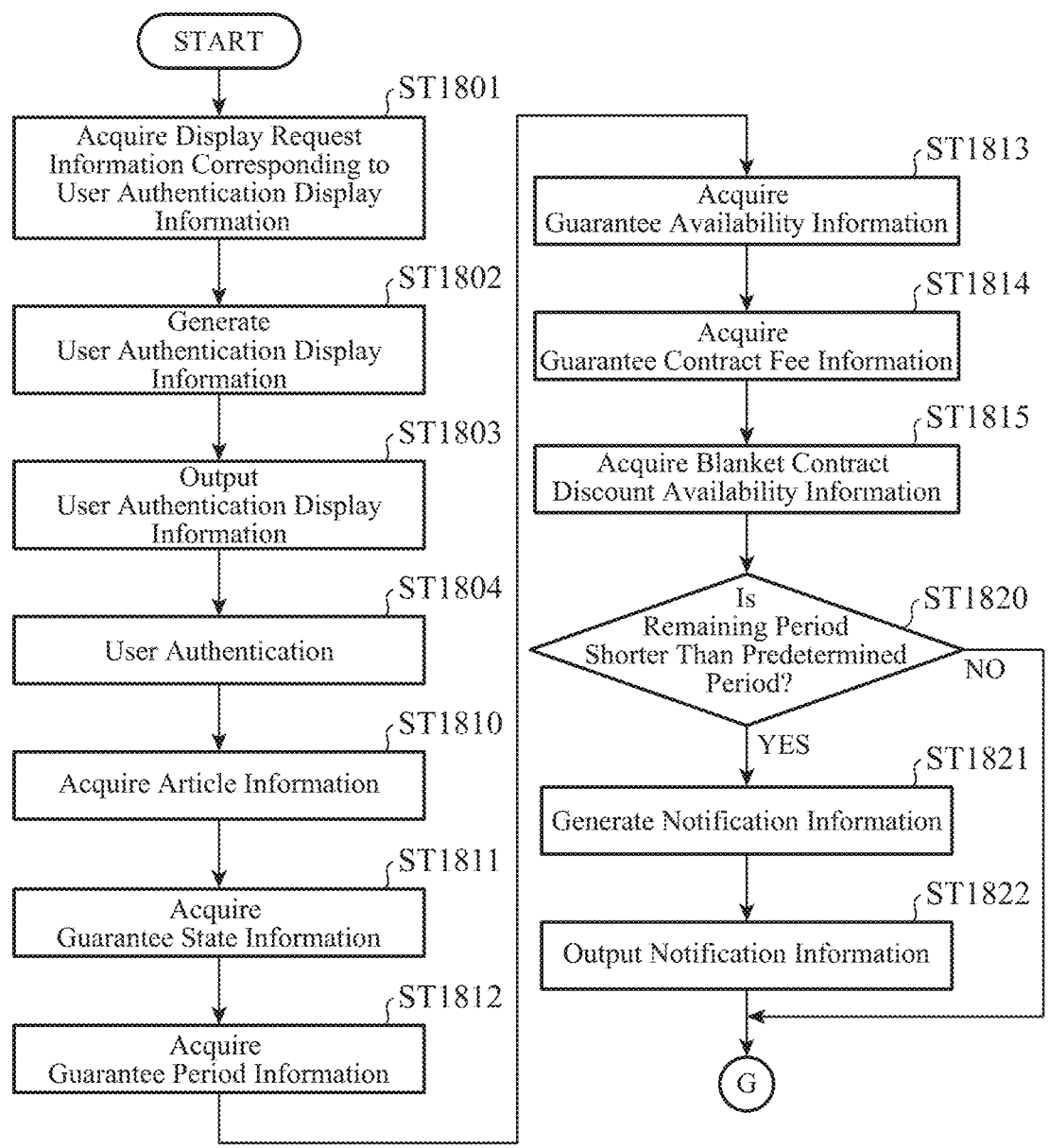
FIG. 18A is a part of a flowchart illustrating an example of processing of the server device according to the second embodiment.
Figure 18B:
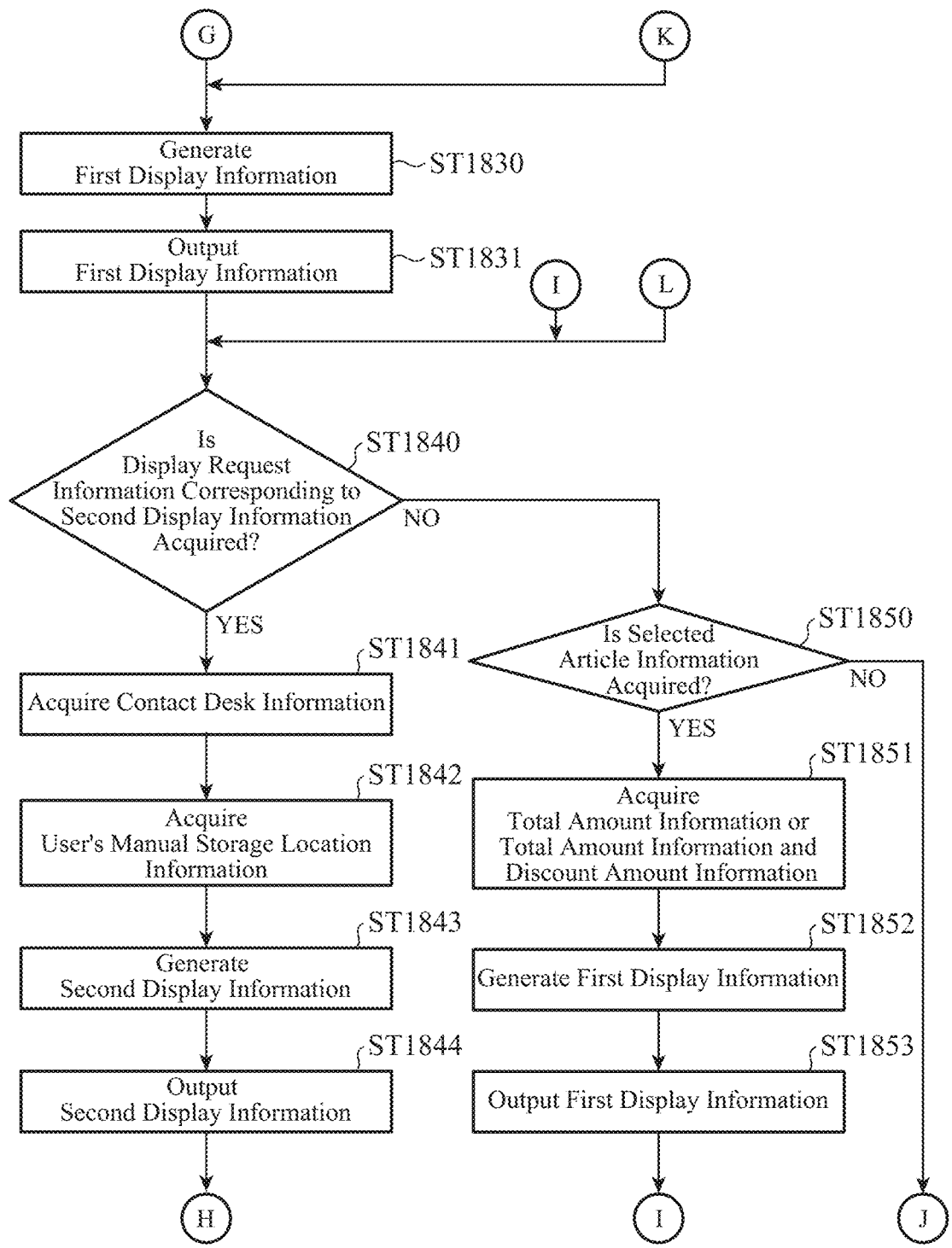
FIG. 18B is a part of a flowchart illustrating an example of processing of the server device according to the second embodiment.

FIGS. 18A, 18B, and 18C are a part of a flowchart illustrating an example of the processing of the server device 200a according to the second embodiment. A series of processing of the server device 200a according to the second embodiment is illustrated by all the flowcharts illustrated in FIGS. 18A, 18B, and 18C. Hereinafter, FIGS. 18A, 18B, and 18C will be collectively referred to as FIG. 18.

For example, the server device 200a repeatedly executes the processing of the flowcharts illustrated in FIG. 18.

First, in step ST1801, the display request accepting unit 231 acquires display request information corresponding to user authentication display information.

Next, in step ST1802, the display generating unit 232 generates the user authentication display information.

Next, in step ST1803, the display output unit 233 outputs the user authentication display information.

Next, in step ST1804, the user authentication unit 201 acquires user information and password information and performs user authentication.

Hereinafter, description will be given on the premise that the user authentication has been successful in step ST1804.

First, in step ST1810, the article acquiring unit 241 included in the information acquiring unit 240 acquires a plurality of pieces of article information corresponding to the user information.

Next, in step ST1811, the guarantee state acquiring unit 242 included in the information acquiring unit 240 acquires guarantee state information corresponding to each of the plurality of pieces of article information.

Next, in step ST1812, the guarantee period acquiring unit 243 included in the information acquiring unit 240 acquires the guarantee period information corresponding to each of the plurality of pieces of article information.

Next, in step ST1813, the guarantee availability acquiring unit 244 included in the information acquiring unit 240 acquires guarantee availability information corresponding to each of the plurality of pieces of article information.

Next, in step ST1814, the guarantee contract fee acquiring unit 245 included in the information acquiring unit 240 acquires guarantee contract fee information corresponding to each of the plurality of pieces of article information.

Next, in step ST1815, the blanket contract discount availability acquiring unit 247 included in the information acquiring unit 240 acquires blanket contract discount availability information corresponding to each of the plurality of pieces of article information.

In step ST1820, the notification determining unit 270 determines whether or not the remaining period of the guarantee period of the article is shorter than a predetermined period.

After step ST1820, in step ST1821, the notification generating unit 271 generates notification information for the article for which the notification determining unit 270 has determined that the remaining period of the guarantee period of the article is shorter than the predetermined period.

After step ST1821, in step ST1822, the notification output unit 272 outputs the notification information.

Note that the processing from step ST1820 to step ST1822 is executed at predetermined timing by, for example, background processing.

After step ST1822 or step ST1815, the display generating unit 232 generates the first display information in step ST1830.

After step ST1830, in step ST1831, the display output unit 233 outputs the first display information.

Next, in step ST1840, the display request accepting unit 231 determines whether or not display request information corresponding to the second display information has been acquired.

If the display request accepting unit 231 determines in step ST1840 that the display request information corresponding to the second display information has been acquired, the contact desk acquiring unit 249 included in the information acquiring unit 240 acquires contact desk information in step ST1841.

After step ST1841, in step ST1842, the user's manual storage location acquiring unit 250 included in the information acquiring unit 240 acquires user's manual storage location information.

After step ST1842, in step ST1843, the display generating unit 232 generates the second display information.

After step ST1843, in step ST1844, the display output unit 233 outputs the second display information to the display control device 100*a*.

After step ST1844, in step ST1845, the display request accepting unit 231 determines whether or not display request information corresponding to the first display information has been acquired.

If it is determined in step ST1845 that the display request accepting unit 231 determined that the display request information corresponding to the first display information has not acquired, the server device 200*a* returns to the processing of step ST1845 and repeatedly executes the processing of step ST1845 until the display request accepting unit 231 determines that the display request information corresponding to the first display information has been acquired.

If it is determined in step ST1845 that the display request accepting unit 231 determined that the display request information corresponding to the first display information has acquired, the server device 200*a* returns to the processing of step ST1830 and executes the processing of and after step ST1830.

In step ST1840, if the display request accepting unit 231 determines that the display request information corresponding to the second display information has not been acquired, in step ST1850, the total amount acquiring unit 246 included in the information acquiring unit 240 determines whether or not the selected article information has been acquired.

If it is determined in step ST1850 that the total amount acquiring unit 246 included in the information acquiring unit 240 has acquired the selected article information, in step ST1851, the total amount acquiring unit 246 acquires the total amount information or the total amount information and the discount amount information.

After step ST1851, in step ST1852, the display generating unit 232 generates the first display information.

After step ST1852, in step ST1853, the display output unit 233 outputs the first display information.

After step ST1853, the server device 200*a* returns to the processing of step ST1840 and executes the processing of and after step ST1840.

If it is determined in step ST1850 that the total amount acquiring unit 246 included in the information acquiring unit 240 has not acquired the selected article information, in step ST1860, the request generating unit 235 determines whether or not the request notification information has been acquired.

In step ST1860, if the request generating unit 235 determines that the request notification information has not been acquired, the server device 200*a* returns to the processing of step ST1840 and executes the processing of and after step ST1840.

If the request generating unit 235 determines in step ST1860 that the request notification information has been acquired, the request generating unit 235 generates request information in step ST1861.

After step ST1861, in step ST1862, the request output unit 236 outputs request information.

After step ST1862, the server device 200*a* ends the processing of the flowchart, returns to the processing of step ST1801, and repeatedly executes the processing of the flowchart. After step ST1862, the server device 200*a* may return to the processing of step ST1810 and execute the processing of and after step ST1810.

The configuration of the main part of the display control device 100*a* according to the second embodiment will be described by referring to FIG. 19.

Figure 19:
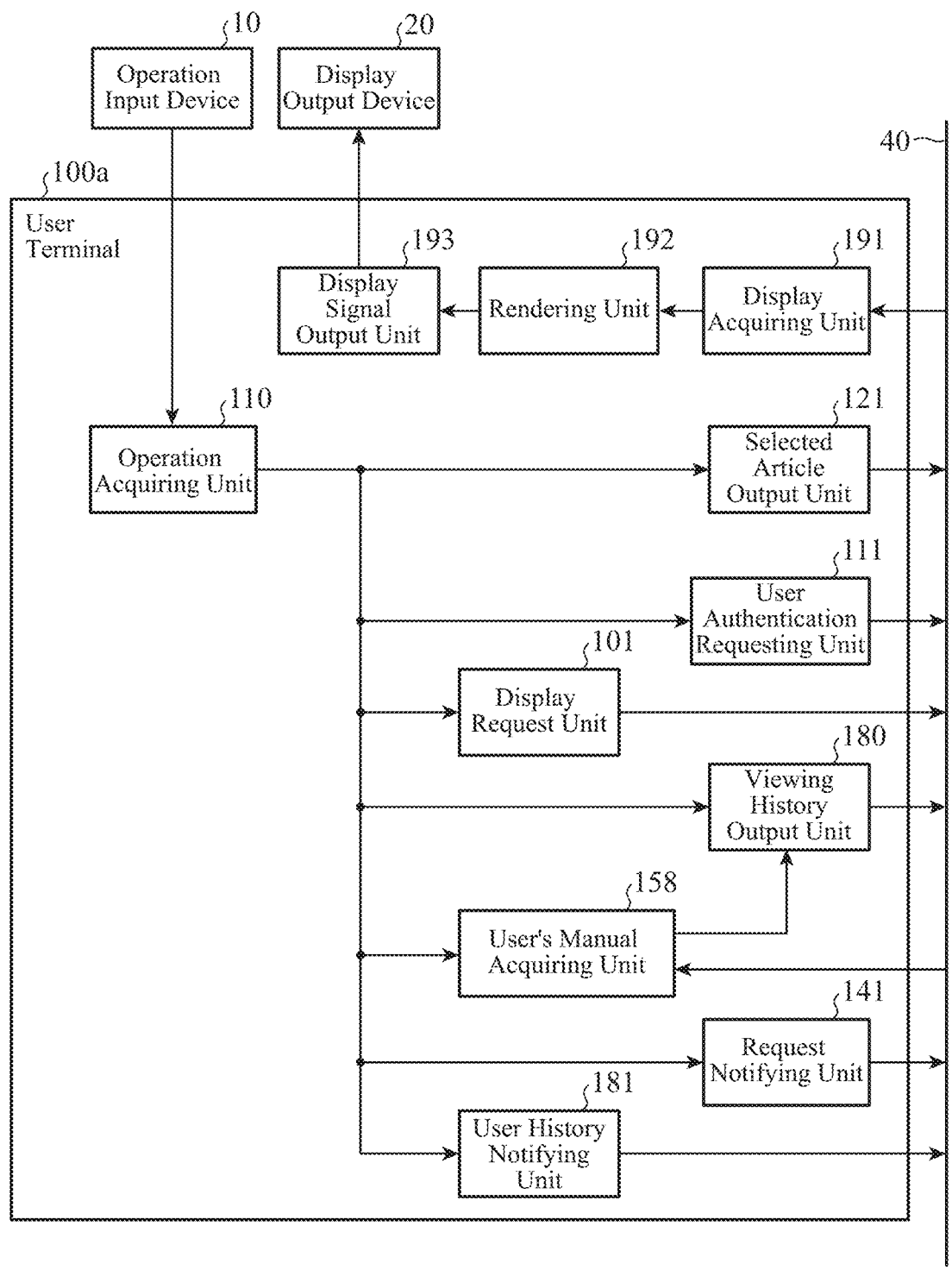
FIG. 19 is a block diagram illustrating an example of the configuration of the main part of a display control device according to the second embodiment.

FIG. 19 is a block diagram illustrating an example of the configuration of the main part of the display control device 100*a* according to the second embodiment.

The display control device 100*a* includes a display request unit 101, an operation acquiring unit 110, a user authentication requesting unit 111, a display acquiring unit 191, a rendering unit 192, a display signal output unit 193, a selected article output unit 121, and a request notifying unit 141.

In addition to the above configuration, the display control device 100*a* may further include a user's manual acquiring unit 158, a viewing history output unit 180, and a user history notifying unit 181.

As illustrated in FIG. 19, description will be given on the premise that the display control device 100*a* according to the second embodiment includes the display request unit 101, the operation acquiring unit 110, the user authentication requesting unit 111, the display acquiring unit 191, the rendering unit 192, the display signal output unit 193, the selected article output unit 121, the request notifying unit 141, the user's manual acquiring unit 158, the viewing history output unit 180, and the user history notifying unit 181.

Note that in FIG. 19 the same symbol is given to a block similar to that illustrated in FIG. 2, and description thereof is omitted. Specifically, since the operation acquiring unit 110, the user authentication requesting unit 111, the user's manual acquiring unit 158, the viewing history output unit 180, and the user history notifying unit 181 have been described in the first embodiment, description thereof will be omitted.

The display request unit 101 generates request display information and outputs the generated request display information to the server device 200*a* via the network 40. The request display information is, for example, information for requesting the server device 200*a* for display information such as user authentication display information, first display information, or second display information. Specifically, for example, the request display information is a URL corresponding to display information to be requested. The server device 200*a* acquires the request display information output by the display request unit 101, generates display information on the basis of the acquired request display information, and outputs the generated display information to the display control device 100*a* via the network 40.

For example, when the display control device 100*a* is activated, the display request unit 101 outputs the request display information corresponding to the user authentication display information. After acquiring the request display information corresponding to the user authentication display information, the server device 200*a* outputs the user authentication display information indicating the user authentication display image illustrated in FIG. 16 as an example.

The display acquiring unit 191 acquires display information output from the server device 200a.

The rendering unit 192 performs rendering processing on the display information acquired by the display acquiring unit 191 and generates a display image indicated by the display information.

The display signal output unit 193 generates a display signal indicating the display image generated on the basis of the display information by the rendering unit 192 and outputs the generated display signal to the display output device 20. The display signal output unit 193 outputs the display signal indicating the display image to the display output device 20, thereby causing the display output device 20 to display the display image.

In a case where the display image displayed on the display output device 20 is the user authentication display image, the user inputs the user information and the password information to the area for inputting the user information and the area for inputting the password information in the user authentication display image displayed on the display output device 20 by the user's operation. The user authentication requesting unit 111 transmits the user information and the password information input by the user to the server device 200a and requests the server device 200a to perform user authentication.

Hereinafter, description will be given on the premise that the user authentication requested by the user authentication requesting unit 111 to the server device 200a has been successful.

When the user authentication succeeds, the server device 200a generates the first display information indicating the first display image illustrated in FIG. 15 as an example on the basis of the user information of which user authentication has been successful and outputs the generated first display information to the display control device 100a via the network 40.

The display acquiring unit 191 acquires the first display information output from the server device 200a, the rendering unit 192 generates the first display image by performing rendering processing on the first display information, and the display signal output unit 193 generates a display signal indicating the first display image and outputs the generated display signal to the display output device 20, thereby causing the display output device 20 to display the first display image.

On the basis of the operation information acquired by the operation acquiring unit 110 among the plurality of article images included in the display image indicated by the display information generated by the display generating unit 232, the selected article output unit 121 outputs selected article information indicating a selected article corresponding to each of one or more selected article images, which are one or more article images selected by user's operation, to the server device 200a via the network 40.

After acquiring the selected article information, the server device 200a generates the first display information on the basis of the selected article information and outputs the generated first display information to the display control device 100a via the network 40.

The display acquiring unit 191 acquires the first display information output from the server device 200a, the rendering unit 192 generates the first display image by performing rendering processing on the first display information, and the display signal output unit 193 generates a display signal indicating the first display image and outputs the generated display signal to the display output device 20, thereby causing the display output device 20 to display the first display image.

The request notifying unit 141 generates request notification information for requesting the server device 200a to execute predetermined processing regarding one or more selected articles specified by the article specifying unit 234 on the basis of the operation information acquired by the operation acquiring unit 110 and outputs the generated request notification information to the server device 200a via the network 40.

After acquiring the request notification information, the server device 200a generates and outputs request information on the basis of the selected article information. After outputting the request information, the server device 200a further generates the first display information and outputs the generated first display information to the display control device 100a via the network 40. After outputting the request information, the server device 200a may generate display information indicating a display image indicating that the request content indicated by the request information has been processed.

In a case where the user selects a certain article image by a predetermined user's operation such as double click in an area corresponding to the article image in the first display image in a state where the display signal output unit 193 has output the display signal indicating the first display image to the display output device 20, the display request unit 101 generates request display information for requesting the server device 200a for the second display information and outputs the generated request display information to the server device 200a via the network 40.

After acquiring the request display information corresponding to the user authentication display information, the server device 200a generates the second display information indicating the second display image illustrated in FIG. 17 as an example and outputs the generated second display information to the display control device 100a via the network 40.

The display acquiring unit 191 acquires the second display information output from the server device 200a, the rendering unit 192 generates the second display image by performing rendering processing on the second display information, and the display signal output unit 193 generates a display signal indicating the second display image and outputs the generated display signal to the display output device 20, thereby causing the display output device 20 to display the second display image.

In a case where the notification output unit 272 notifies the notification information generated by the notification generating unit 271 to the display control device 100a by a push notification, for example, the display control device 100a may cause an image generating unit or the like (not illustrated in FIG. 19) to generate a notification image indicating the notification information notified by the notification output unit 272 by the push notification and cause the display signal output unit 193 to output a display signal indicating the generated notification image to the display output device 20, thereby causing the display output device 20 to display the notification image as a pop-up.

Furthermore, in a case where the notification output unit 272 notifies the display control device 100a of the notification information generated by the notification generating unit 271 by the push notification, for example, the display control device 100a may be basic software included in the display control device 100a, and the basic software, on which each unit included in the display control device 100a operates, may receive the notification information and notifies, by a push notification, the user that the remaining period of the guarantee period of the article indicated by the notification information has become shorter than a predetermined period.

Note that the functions of the display request unit 101, the operation acquiring unit 110, the user authentication requesting unit 111, the display acquiring unit 191, the rendering unit 192, the display signal output unit 193, the selected article output unit 121, the request notifying unit 141, the user's manual acquiring unit 158, the viewing history output unit 180, and the user history notifying unit 181 included in the display control device 100a may be implemented by the processor 701 and the memory 702 in the hardware configuration illustrated as an example in FIGS. 7A and 7B or may be implemented by the processing circuit 703.

The operation of the display control device 100a according to the second embodiment will be described by referring to FIGS. 20A, 20B, and 20C.

Figure 20A:
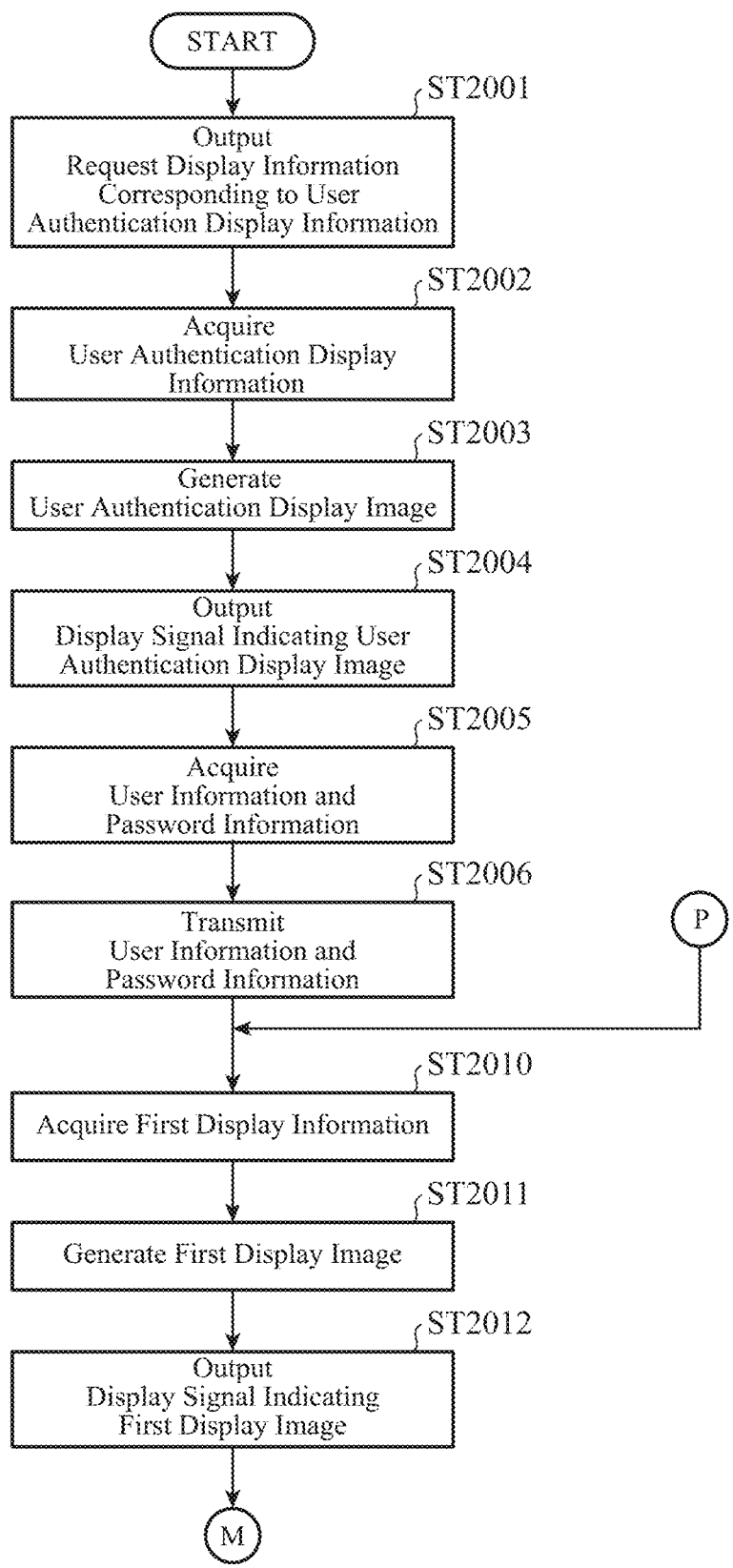
FIG. 20A is a part of a flowchart illustrating an example of processing of the display control device according to the second embodiment.
Figure 20B:
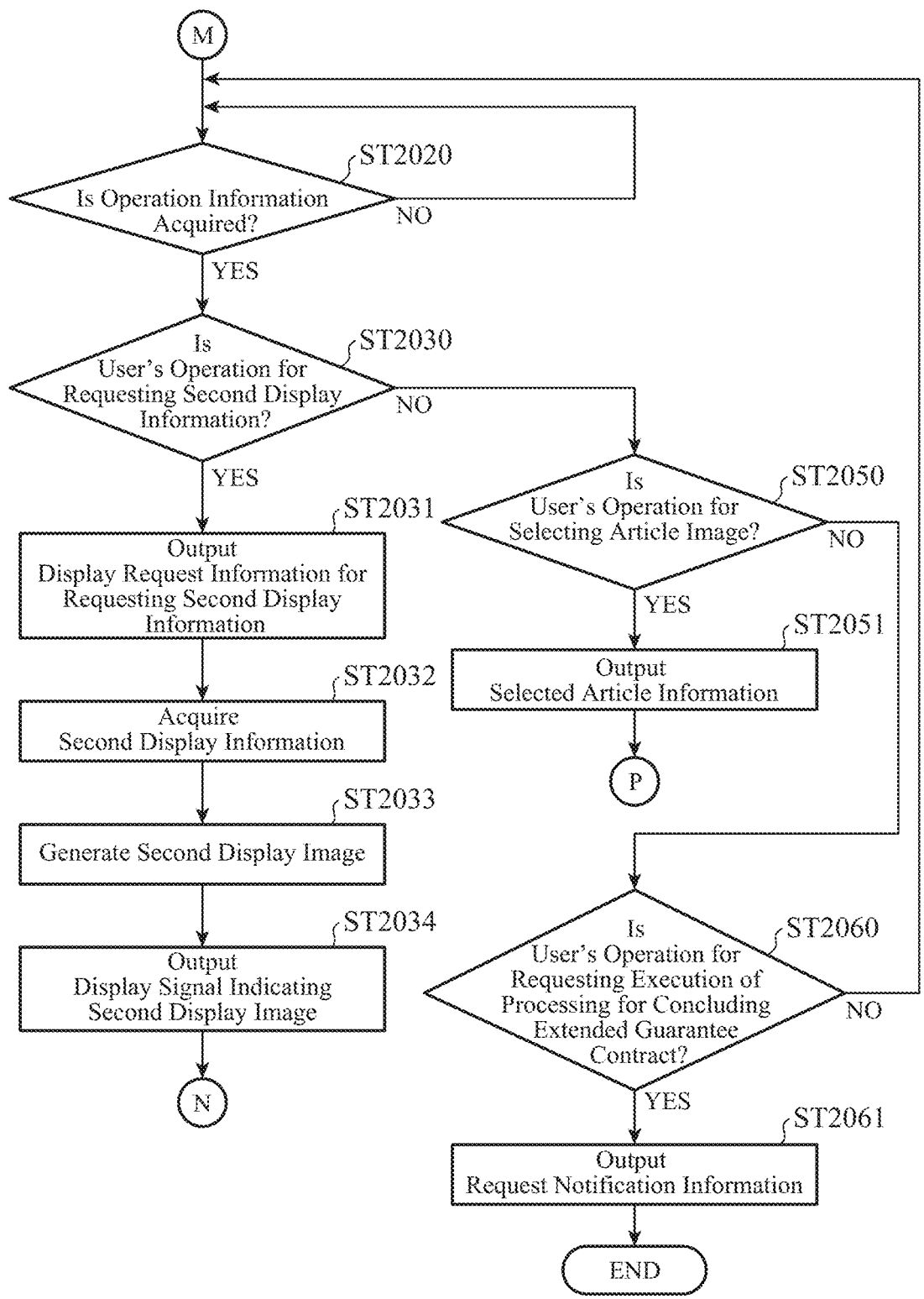
FIG. 20B is a part of a flowchart illustrating an example of processing of the display control device according to the second embodiment.
Figure 20C:
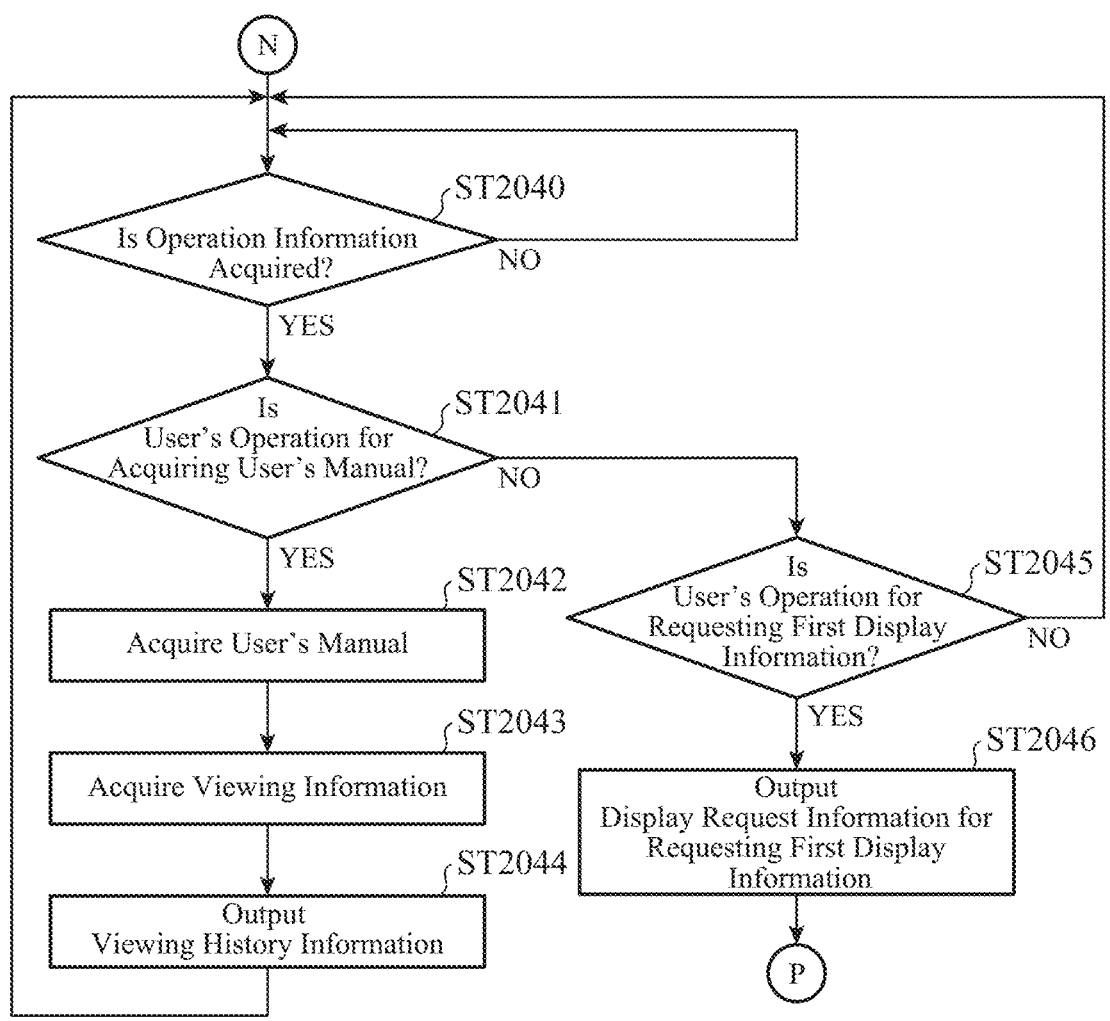
FIG. 20C is a part of the flowchart illustrating an example of processing of the display control device according to the second embodiment.

FIGS. 20A, 20B, and 20C are a part of a flowchart illustrating an example of the processing of the display control device 100a according to the second embodiment. A series of processing of the display control device 100a according to the second embodiment is illustrated by all the flowcharts illustrated in FIGS. 20A, 20B, and 20C. Hereinafter, FIGS. 20B and 20C will be collectively referred to as FIG. 20.

For example, the display control device 100a repeatedly executes the processing of the flowcharts illustrated in FIG. 20.

First, in step ST2001, the display request unit 101 outputs request display information corresponding to the user authentication display information to the server device 200a.

In step ST2001, the display request unit 101 outputs the request display information to the server device 200a, then the server device 200a performs processing from step ST1801 to step ST1803 illustrated in FIG. 18.

After step ST2001, in step ST2002, the display acquiring unit 191 acquires the user authentication display information.

After step ST2002, in step ST2003, the rendering unit 192 generates a user authentication display image.

After step ST2003, in step ST2004, the display signal output unit 193 outputs a display signal indicating the user authentication display image.

After step ST2004, in step ST2005, the operation acquiring unit 110 acquires user information and password information as operation information.

After step ST2005, in step ST2006, the user authentication requesting unit 111 transmits the user information and the password information to the server device 200a.

In step ST2006, the user authentication requesting unit 111 transmits the user information and the password information to the server device 200a, then the server device 200a performs the processing of step ST1804 illustrated in FIG. 18.

Hereinafter, description will be given on the premise that the user authentication has been successful in step ST1804 illustrated in FIG. 18.

If the user authentication is successful in step ST1804 illustrated in FIG. 18, the server device 200a performs processing from step ST1810 to step ST1815 illustrated in FIG. 18.

After the processing of step ST1815, the server device 200a may perform processing from step ST1820 to step ST1822 illustrated in FIG. 18.

After step ST1815 or step ST1822 illustrated in FIG. 18, the server device 200a performs the processing from step ST1830 to step ST1831 illustrated in FIG. 18.

After step ST2006, in step ST2010, the display acquiring unit 191 acquires the first display information.

After step ST2010, in step ST2011, the rendering unit 192 generates the first display image.

After step ST2011, in step ST2012, the display signal output unit 193 outputs a display signal indicating the first display image.

After step ST2012, in step ST2020, it is determined whether or not the operation acquiring unit 110 has acquired the operation information.

If it is determined in step ST2020 that the operation acquiring unit 110 has not acquired the operation information, the display control device 100a returns to the processing of step ST2020 and repeatedly executes the processing of step ST2020 until it is determined that the operation acquiring unit 110 has acquired the operation information.

In a case where it is determined in step ST2020 that the operation acquiring unit 110 has acquired the operation information, in step ST2030, the display request unit 101 determines whether or not the operation information indicates user's operation for requesting the second display information.

In step ST2030, if the display request unit 101 determines that the operation information indicates the user's operation for requesting the second display information, in step ST2031, the display request unit 101 outputs, to the server device 200a, display request information for requesting the second display information.

In step ST2030, the display request unit 101 outputs the request display information to the server device 200a, then the server device 200a performs the processing from step ST1840 to step ST1844 illustrated in FIG. 18.

After step ST2031, in step ST2032, the display acquiring unit 191 acquires the second display information.

After step ST2032, in step ST2033, the rendering unit 192 generates the second display image.

After step ST2033, in step ST2034, the display signal output unit 193 outputs a display signal indicating the second display image.

After step ST2034, in step ST2040, the operation acquiring unit 110 determines whether or not operation information has been acquired.

If it is determined in step ST2040 that the operation acquiring unit 110 has not acquired the operation information, the display control device 100a returns to the processing of step ST2040 and repeatedly executes the processing of step ST2040 until it is determined that the operation acquiring unit 110 has acquired the operation information.

If it is determined in step ST2040 that the operation acquiring unit 110 has acquired the operation information, in step ST2041, the user's manual acquiring unit 158 determines whether or not the operation information indicates user's operation for acquiring the user's manual.

If the user's manual acquiring unit 158 determines that the operation information indicates user's operation for acquiring the user's manual in step ST2041, the display request unit 101 acquires the user's manual in step ST2042.

After step ST2042, in step ST2043, the viewing acquiring unit 161 acquires the viewing information.

After step ST2043, in step ST2044, the viewing history output unit 180 outputs the viewing history information.

After step ST2044, the display control device 100a returns to the processing of step ST2040 and executes the processing of and after step ST2040.

In step ST2041, if the user's manual acquiring unit 158 determines that the operation information does not indicate user's operation for acquiring the user's manual, in step ST2045, the display request unit 101 determines whether or not the operation information indicates user's operation for requesting the first display information.

In step ST2045, if the display request unit 101 determines that the operation information indicates the user's operation for requesting the first display information, in step ST2046, the display request unit 101 outputs, to the server device 200a, display request information for requesting the first display information.

In step ST2046, the display request unit 101 outputs the request display information to the server device 200a, then the server device 200a performs the processing from step ST1830 to step ST1831 illustrated in FIG. 18.

After step ST2046, the display control device 100a returns to the processing of step ST2010 and executes the processing of and after step ST2010.

In step ST2045, if the display request unit 101 determines that the operation information does not indicate user's operation for requesting the first display information, the display control device 100a returns to the processing of step ST2040 and executes the processing of and after step ST2040.

In step ST2030, if the display request unit 101 determines that the operation information acquired by the operation acquiring unit 110 does not indicate user's operation for requesting the second display information, in step ST2050, the selected article output unit 121 determines whether or not the operation information indicates user's operation for selecting any one of a plurality of article images.

In step ST2050, if the selected article output unit 121 determines that the operation information indicates user's operation for selecting any one of the plurality of article images, the selected article output unit 121 outputs selected article information to the server device 200a in step ST2051.

After the selected article output unit 121 outputs the selected article information to the server device 200a, the server device 200a performs the processing from step ST1850 to step ST1853 illustrated in FIG. 18.

After step ST2051, the display control device 100a returns to the processing of step ST2010 and executes the processing of and after step ST2010.

In step ST2050, if the selected article output unit 121 determines that the operation information does not indicate user's operation for selecting any one of the plurality of article images, in step ST2060, the request notifying unit 141 determines whether or not the operation information indicates user's operation for requesting the server device 200a to execute the processing for concluding an extended guarantee contract.

In step ST2060, if the request notifying unit 141 determines that the operation information does not indicate user's operation for requesting the server device 200a to execute the processing of concluding an extended guarantee contract, the display control device 100a returns to the processing of step ST2020 and executes the processing of and after step ST2020.

In step ST2060, if the request notifying unit 141 determines that the operation information indicates user's operation for requesting the server device 200a to execute the processing of concluding an extended guarantee contract, in step ST2061, the request notifying unit 141 outputs request notification information to the server device 200a.

After the request notifying unit 141 outputs the request notification information to the server device 200a, the server device 200a performs the processing from step ST1860 to step ST1862 illustrated in FIG. 18.

After step ST2061, the display control device 100a ends the processing of the flowchart, returns to the processing of step ST2001, and repeatedly executes the processing of the flowchart. In a case where the server device 200a returns to the processing of step ST1810 and executes the processing of and after step ST1810 after the processing of step ST1862 illustrated in FIG. 18, the display control device 100a may return to the processing of step ST2010 and execute the processing of step ST2010 after step ST2061.

As described above, the information processing system 1a according to the second embodiment includes: the operation acquiring unit 110 to acquire operation information based on user's operation; the display generating unit 232 to generate display information indicating a display image in which article images corresponding to respective articles owned by the user are arranged; the display output unit 233 to output the display information generated by the display generating unit 232; the article specifying unit 234 to specify, on the basis of the operation information acquired by the operation acquiring unit 110 among the plurality of article images included in the display image indicated by the display information generated by the display generating unit 232, a selected article that is the article corresponding to each of one or more selected article images that are one or more of the article images selected by the user's operation; the request generating unit 235 to generate request information for requesting execution of predetermined processing regarding one or more of the selected articles specified by the article specifying unit 234 on the basis of the operation information acquired by the operation acquiring unit 110; and the request output unit 236 to output the request information generated by the request generating unit 235.

With this configuration, the information processing system 1a allows the user to select one or more articles and to collectively request to execute predetermined processing on the selected one or more articles.

Moreover, in the information processing system 1a according to the second embodiment, in particular, the request information generated by the request generating unit 235 is information for requesting extended guarantee contracts of one or more selected articles specified by the article specifying unit 234 among the plurality of articles owned by the user.

With such a configuration, the information processing system 1a allows the user to select one or more articles and to collectively perform the request processing of extended guarantee contracts for the selected one or more articles.

Furthermore, in addition to the above configuration, the information processing system 1a according to the second embodiment further includes the guarantee state acquiring unit 242 to acquires, for each of the plurality of articles owned by the user, guarantee state information indicating whether or not the article is in a guaranteed state, in which, in a case where guarantee state information corresponding to a certain article indicates that the article is in a guaranteed state on the basis of the guarantee state information acquired by the guarantee state acquiring unit 242, the display generating unit 232 generates the display information indicating the display image in which an under-guarantee image indicating that the article is in the guaranteed state is associated with an article image corresponding to the article.

With the above configuration, the information processing system 1a can allow the user to intuitively grasp which article is in a guaranteed state and which article is in a non-guaranteed state among the plurality of articles owned by the user while allowing the user to select one or more articles and to collectively perform the request processing of the extended guarantee contract for the selected one or more articles.

In addition, the information processing system 1a according to the second embodiment further includes, in addition to the above configuration, the guarantee period acquiring unit 243 that acquires the guarantee period information indicating the guarantee period of the article for each of the plurality of articles owned by the user, in which the display generating unit 232 generates the display information indicating the display image in which an under-guarantee image of a mode corresponding to the guarantee period of the article indicated by the guarantee period information is associated with an article image corresponding to the article on the basis of the guarantee period information acquired by the guarantee period acquiring unit 243.

With the above configuration, the information processing system 1a can allow the user to intuitively grasp which article is in a guaranteed state and which article is in a non-guaranteed state among the plurality of articles owned by the user while allowing the user to select one or more articles and to collectively perform the request processing of the extended guarantee contract for the selected one or more articles.

The information processing system 1a according to the second embodiment further includes, in addition to the above configuration, the guarantee period acquiring unit 243 that acquires the guarantee period information indicating the guarantee period of the article for each of the plurality of articles owned by the user, in which the display generating unit 232 generates the display information indicating the display image in which the guarantee period image indicating at least the end of the guarantee period indicated by the guarantee period information corresponding to the article is associated with an article image corresponding to the article on the basis of the guarantee period information acquired by the guarantee period acquiring unit 243.

With this configuration, the information processing system 1a can allow the user to grasp the end of the guarantee period for an article that is in a guaranteed state while allowing the user to select one or more articles and to collectively perform the request processing of the extended guarantee contract for the selected one or more articles.

Moreover, the information processing system 1a according to the second embodiment further includes, in addition to the above configuration, the guarantee period acquiring unit 243 that acquires the guarantee period information indicating the guarantee period of the article for each of the plurality of articles owned by the user, the notification generating unit 271 that generates notification information indicating that the remaining period of the guarantee period of the article has become shorter than the predetermined period when the remaining period of the guarantee period indicated by the guarantee period information corresponding to a certain article has become shorter than the predetermined period on the basis of the guarantee period information acquired by the guarantee period acquiring unit 243, and the notification output unit 272 that outputs the notification information generated by the notification generating unit 271.

With this configuration, the information processing system 1a can notify the user that the end of the guarantee period of the article is approaching when the remaining period of the guarantee period of the article has become shorter than the predetermined period while allowing the user to select one or more articles and to collectively perform the request processing of the extended guarantee contract for the selected one or more articles. As a result, the information processing system 1a can prevent the user from forgetting to conclude an extended guarantee contract for an article for which the end of a guarantee period thereof is approaching. Furthermore, as a result, the information processing system 1a can prevent the user from forgetting to confirm the presence or absence of an article for which the end of a guarantee period thereof is approaching or can prevent the user from forgetting to request repair or the like of a defective part within the guarantee period.

In addition to the above configuration, the information processing system 1a according to the second embodiment further includes the guarantee availability acquiring unit 244 that acquires the guarantee availability information indicating whether or not an extended guarantee contract is available for each of the plurality of articles owned by the user, in which the notification generating unit 271 generates the notification information including the information indicating that the extended guarantee contract is available for the article in addition to the information indicating that the remaining period of the guarantee period of the article has become shorter than the predetermined period in a case where the guarantee availability information indicates that an extended guarantee contract is available on the basis of the guarantee availability information acquired by the guarantee availability acquiring unit 244.

With this configuration, the information processing system 1a can notify the user that the end of the guarantee period of the article for which an extended guarantee contract is available is approaching when the remaining period of the guarantee period of the article has become shorter than the predetermined period while allowing the user to select one or more articles and to collectively perform the request processing of the extended guarantee contract for the selected one or more articles. As a result, the information processing system 1a can prevent the user from forgetting to conclude an extended guarantee contract for an article for which the end of a guarantee period thereof is approaching.

In addition, with the above configuration, the information processing system 1a can suppress an application for an extended guarantee contract to a guarantee company for an article for which the extended guarantee contract is not available, and thus both the business efficiency of the guarantee company and the customer satisfaction can be improved.

In addition to the above configuration, the information processing system 1a according to the second embodiment includes the guarantee availability acquiring unit 244 that acquires the guarantee availability information indicating whether or not an extended guarantee contract is available for each of the plurality of articles owned by the user, in which the display generating unit 232 generates the display information indicating the display image in which the guarantee availability image indicating that the extended guarantee contract is available is associated with an article image corresponding to a certain article in a case where the guarantee availability information corresponding to the article indicates that the extended guarantee contract is available on the basis of the guarantee availability information acquired by the guarantee availability acquiring unit 244.

With this configuration, the information processing system 1a can allow the user to grasp an article for which an extended guarantee contract is available among the plurality of articles owned by the user while allowing the user to select one or more articles and to collectively perform the request processing of extended guarantee contracts for the selected one or more articles. As a result, the information processing system 1a can allow the user to easily select an article image corresponding to an article for which the extended guarantee contract can be concluded by user's operation.

In addition to the above configuration, the information processing system 1a according to the second embodiment further includes the guarantee availability acquiring unit 244 that acquires the guarantee availability information indicating whether or not an extended guarantee contract is available for each of the plurality of articles owned by the user, in which the display generating unit 232 generates the display information indicating the display image indicating that an article image indicating a certain article cannot be selected by user's operation in a case where the guarantee availability information corresponding to the article indicates that no extended guarantee contract is available on the basis of the guarantee availability information acquired by the guarantee availability acquiring unit 244.

With this configuration, the information processing system 1a can prevent the user from erroneously selecting, by user's operation, an article image corresponding to the article for which no extended guarantee contract is available among the plurality of articles owned by the user and outputting request information for requesting an extended guarantee contract of the article while allowing the user to select one or more articles and to collectively perform the request processing of extended guarantee contracts for the selected one or more articles.

In addition to the above configuration, the information processing system 1a according to the second embodiment further includes the guarantee availability acquiring unit 244 that acquires the guarantee availability information indicating whether or not an extended guarantee contract is available for each of the plurality of articles owned by the user, in which the operation acquiring unit 110 does not acquire operation information indicating user's operation for selecting an article image indicating a certain article in a case where the guarantee availability information corresponding to the article indicates that no extended guarantee contract is available on the basis of the guarantee availability information acquired by the guarantee availability acquiring unit 244.

With this configuration, the information processing system 1a can prevent the user from erroneously selecting, by user's operation, an article image corresponding to the article for which no extended guarantee contract is available among the plurality of articles owned by the user and outputting request information for requesting an extended guarantee contract of the article while allowing the user to select one or more articles and to collectively perform the request processing of extended guarantee contracts for the selected one or more articles.

In addition to the above configuration, the information processing system 1a according to the second embodiment further includes the guarantee availability acquiring unit 244 that acquires the guarantee availability information indicating whether or not an extended guarantee contract is available for each of the plurality of articles owned by the user and the guarantee contract fee acquiring unit 245 that acquires guarantee contract fee information indicating the guarantee contract fee which is the amount of money required for an extended guarantee contract of a certain article in a case where guarantee availability information corresponding to the article indicates that the extended guarantee contract is available on the basis of the guarantee availability information acquired by the guarantee availability acquiring unit 244, in which the display generating unit 232 generates the display information indicating the display image in which the guarantee contract fee image indicating the guarantee contract fee indicated by the guarantee contract fee information is associated with an article image indicating the article corresponding to the guarantee contract fee information on the basis of the guarantee contract fee information acquired by the guarantee contract fee acquiring unit 245.

With this configuration, the information processing system 1a can allow the user to grasp an article for which an extended guarantee contract is available among the plurality of articles owned by the user and to grasp the amount of money required for the extended guarantee contract of the article while allowing the user to select one or more articles and to collectively perform the request processing of extended guarantee contracts for the selected one or more articles.

In addition to the above configuration, the information processing system 1a according to the second embodiment further includes the total amount acquiring unit 246 that acquires the total amount information indicating the total amount of the guarantee contract fees of the respective one or more selected articles specified by the article specifying unit 234, in which the display generating unit 232 generates the display information indicating the display image in which the total amount image indicating the total amount indicated by the total amount information acquired by the total amount acquiring unit 246 is included in the display image indicated by the display information.

With this configuration, the information processing system 1a can present, to the user, the total amount required when the user concludes an extended guarantee contract for all the articles for which the user desires an extended guarantee contracts while allowing the user to select one or more articles and to collectively perform the request processing of extended guarantee contracts for the selected one or more articles.

Furthermore, in addition to the above configuration, in the information processing system 1a according to the second embodiment, in addition to acquiring the total amount information, the total amount acquiring unit 246 acquires, for all of two or more selected articles among the plurality of selected articles specified by the article specifying unit 234, the discount amount information indicating the discount amount at the time of concluding a blanket extended guarantee contract or the total amount after the discount at the time of concluding the blanket extended guarantee contract in a case where the amount of money required for the extended guarantee contract is discounted by concluding the blanket extended guarantee contract, in which the display generating unit 232 generates the display information indicating the display image in which, in addition to the total amount image, a discount amount image, which indicates the discount amount at the time of concluding the blanket extended guarantee contract or the amount of money after the discount at the time of concluding the blanket extended guarantee contract indicated by the discount amount information acquired by the total amount acquiring unit 246, is associated with the total amount image.

With this configuration, the information processing system 1a can present, to the user, the amount of money to be discounted or the total amount after the discount when the user concludes an extended guarantee contract for all the articles for which the user desires an extended guarantee contract in addition to the total amount required when the user concludes an extended guarantee contract for all the articles for which the user desires an extended guarantee contract while allowing the user to select one or more articles and to collectively perform the request processing of the extended guarantee contracts for the selected one or more articles.

In addition to the above configuration, the information processing system 1a according to the second embodiment further includes the blanket contract discount availability acquiring unit 247 that acquires blanket contract discount availability information indicating whether or not an amount of money required for an extended guarantee contract is discounted by concluding a blanket extended guarantee contract for all of two or more selected articles among the plurality of selected articles specified by the article specifying unit 234 in a case where the article specifying unit 234 specifies a plurality of selected articles, in which the display generating unit 232 generates the display information indicating the display image in which a blanket-discounted item image indicating an article, for which the amount of money required for an extended guarantee contract is discounted by concluding a blanket extended guarantee contract is associated with an article image indicating the article corresponding to the blanket contract discount availability information on the basis of the blanket contract discount availability information acquired by the blanket contract discount availability acquiring unit 247.

With this configuration, the information processing system 1a allows the user to grasp an article, for which the amount of money required for an extended guarantee contract is discounted by concluding a blanket extended guarantee contract, while allowing the user to grasp an article for which an extended guarantee contract is available among the plurality of articles owned by the user.

Furthermore, in the information processing system 1a according to the second embodiment, in the above configuration, the display generating unit 232 generates the second display information indicating the second display image indicating detailed information regarding an article corresponding to one article image selected by user's operation on the basis of the operation information acquired by the operation acquiring unit 110 in addition to the first display information indicating the first display image in which article images corresponding to the plurality of articles owned by the user are arranged, the display output unit 233 outputs the second display information instead of the first display information when the display generating unit 232 generates the second display information, and the second display image indicated by the second display information generated by the display generating unit 232 includes an image corresponding to at least one of guarantee state information indicating whether or not the article corresponding to the second display image is in a guaranteed state, guarantee period information indicating the guarantee period of the article, guarantee availability information indicating whether or not an extended guarantee contract is available for the article, guarantee contract fee information indicating an amount of money required for the extended guarantee contract, and blanket contract discount availability information indicating whether or not the amount of money required for the extended guarantee contract is discounted by concluding the extended guarantee contract by combining the article and another article different from the article.

With the above configuration, the information processing system 1a can present, to the user, detailed information of an article corresponding to an article image selected by the user among the plurality of article images arranged in the first display image. As a result, the information processing system 1a allows the user to view detailed information of the article corresponding to the article image selected by the user, thereby allowing the user to easily determine whether or not the user concludes the extended guarantee contract.

Moreover, in the above configuration, the information processing system 1a according to the second embodiment is configured so that the second display image indicated by the second display information generated by the display generating unit 232 includes the contact desk image corresponding to the contact desk information indicating the contact desk for the article corresponding to the second display image in addition to an image corresponding to the guarantee state information, the guarantee period information, the guarantee availability information, the guarantee contract fee information, or the blanket contract discount availability information.

With the above configuration, the information processing system 1a allows the user to easily contact a contact desk indicated by the contact desk information when the user consults about a failure or the like of an article while presenting, to the user, the detailed information of the article corresponding to the article image selected by the user from among the plurality of article images arranged in the first display image.

In addition, in the above configuration, the information processing system 1a according to the second embodiment is configured so that the second display image indicated by the second display information generated by the display generating unit 232 includes the user's manual storage location image corresponding to the user's manual storage location information for acquiring the user's manual of the article corresponding to the second display image in addition to an image corresponding to the guarantee state information, the guarantee period information, the guarantee availability information, the guarantee contract fee information, or the blanket contract discount availability information.

With the above configuration, the information processing system 1a allows the user to easily contact a contact desk indicated by the contact desk information when the user consults about a failure or the like of an article while presenting, to the user, the detailed information of the article corresponding to the article image selected by the user from among the plurality of article images arranged in the first display image.

With the above configuration, the information processing system 1a allows the user to easily view the user's manual when the user refers to the user's manual of the article to check how to use and the like while presenting, to the user, the detailed information of the article corresponding to the article image selected by the user among the plurality of article images arranged in the first display image.

Furthermore, in addition to the above configuration, the information processing system 1a according to the second embodiment further includes: the viewing history output unit 180 that outputs the viewing history information, which indicates the viewing history of the user of viewing the related information regarding each of the plurality of articles owned by the user, in association with the user information indicating the user and the article information indicating the article; and the user history notifying unit 181 that notifies a contact desk of the user information indicating the user when the user makes an inquiry to the contact desk about a certain article among the plurality of articles owned by the user.

With this configuration, when a person in charge at the contact desk responds to an inquiry about an article from the user, the information processing system 1a allows the person in charge to refer to the viewing history information output by the viewing history output unit 180, that is, the viewing history information of the user corresponding to the article inquired by the user to the contact desk on the basis of the user information notified by the user history notifying unit 181 and the viewing history information output by the viewing history output unit 180.

Since the information processing system 1a provides a person in charge at the contact desk with the viewing history information indicating the viewing history of the user of viewing the related information of the article, the person in charge at the contact desk can respond to the inquiry about the article from the user while referring to the viewing history indicated by the viewing history information when the person in charge responds to the inquiry about the article from the user. In this manner, a person in charge at the contact desk responds to an inquiry about an article from the user while referring to the viewing history information, whereby the person in charge can accurately and promptly respond to the inquiry. As a result, a person in charge can respond to the inquiry from the user without irritating the user who has already viewed the related information regarding the article such as the user's manual of the article, and the customer satisfaction can be improved.

Note that the present disclosure may include a flexible combination of the embodiments, a modification of any component of the embodiments, or an omission of any component in the embodiments within the scope of the present invention.

INDUSTRIAL APPLICABILITY

An information processing system of the present disclosure is applicable to a system that requests execution of predetermined processing for an article selected by a user, the system including a server device and a display control device.

REFERENCE SIGNS LIST 1, 1a: information processing system, 10: operation input device, 20: display output device, 30: storage device, 40: network, 100, 100a: display control device, 101: display request unit, 110: operation acquiring unit, 111: user authentication requesting unit, 120: article specifying unit, 121: selected article output unit, 130: request generating unit, 140: request output unit, 141: request notifying unit, 150: information acquiring unit, 151: article acquiring unit, 152: guarantee state acquiring unit, 153: guarantee period acquiring unit, 154: guarantee availability acquiring unit, 155: guarantee contract fee acquiring unit, 156: total amount acquiring unit, 157: blanket contract discount availability acquiring unit, 158: user's manual acquiring unit, 159: contact desk acquiring unit, 160: user's manual storage location acquiring unit, 161: viewing acquiring unit, 170: notification generating unit, 171: notification output unit, 180: viewing history output unit, 181: user history notifying unit, 190: display generating unit, 191: display acquiring unit, 192: rendering unit, 193: display signal output unit, 199: display output unit, 200, 200a: server device, 201: user authentication unit, 202: request accepting unit, 203: request processing unit, 204: article searching unit, 205: guarantee state searching unit, 206: guarantee period searching unit, 207: guarantee availability searching unit, 208: guarantee contract fee searching unit, 209: total amount calculating unit, 210: blanket contract discount availability searching unit, 211: contact desk searching unit, 212: user's manual storage location searching unit, 231: display request accepting unit, 232: display generating unit, 233: display output unit, 234: article specifying unit, 235: request generating unit, 236: request output unit, 240: information acquiring unit, 241: article acquiring unit, 242: guarantee state acquiring unit, 243: guarantee period acquiring unit, 244: guarantee availability acquiring unit, 245: guarantee contract fee acquiring unit, 246: total amount acquiring unit, 247: blanket contract discount availability acquiring unit, 249: contact desk acquiring unit, 250: user's manual storage location acquiring unit, 270: notification determining unit, 271: notification generating unit, 272: notification output unit, 701, 1001: processor, 702, 1002: memory, 703, 1003: processing circuit

The invention claimed is:

1. An information processing system comprising:
processing circuitry configured as an operation acquirer to acquire operation information based on user's operation;
the processing circuitry further configured as a display generator to generate display information indicating a display image in which a plurality of article images each corresponding to a respective article owned by a user are arranged;
the processing circuitry further configured as a display outputter to output the display information generated by the display generator;
the operation acquirer further configured to acquire operation information regarding a plurality of selected article images selected by the user's operation, the selected article images being more than one of the plurality of article images that are selected by the user's operation from among the plurality of article images included in the display image indicated by the display generator;
the processing circuitry further configured as an article specifier to specify, based on the operation information acquired by the operation acquirer, a plurality of selected articles each corresponding to one of the plurality of selected article images;
the processing circuitry further configured as a request generator to generate request information for requesting execution of predetermined processing regarding the plurality of the selected articles specified by the article specifier on a basis of the operation information acquired by the operation acquirer; and
the processing circuitry further configured as a request outputter to output the request information for requesting execution of the predetermined processing regarding the plurality of selected articles generated by the request generator,
wherein the request information generated by the request generator is information for requesting an extended guarantee contract of the plurality of the selected articles specified by the article specifier from among the plurality of articles owned by the user,
the processing circuitry is further configured as a guarantee period acquirer to acquire, for each of the plurality of articles owned by the user, guarantee period information indicating a guarantee period of the article,
the processing circuitry is further configured as a notification generator to generate notification information indicating that a remaining period of the guarantee period of one of the articles has become shorter than a predetermined period when the remaining period of the guarantee period indicated by the guarantee period information corresponding to the article has become shorter than the predetermined period on a basis of the guarantee period information acquired by the guarantee period acquirer, and the processing circuitry is further configured as a notification outputter to output the notification information generated by the notification generator.

2. The information processing system according to claim 1, wherein:

the processing circuitry is further configured as a guarantee state acquirer to acquire, for each of the plurality of articles owned by the user, guarantee state information indicating whether or not the article is in a guaranteed state, wherein, in a case where the guarantee state information corresponding to one of the articles indicates that the article is in a guaranteed state on a basis of the guarantee state information acquired by the guarantee state acquirer, the display generator generates the display information indicating the display image in which an under-guarantee image, indicating that the article is in the guaranteed state, is associated with the article image corresponding to the article.

3. The information processing system according to claim 2, wherein:

the processing circuitry is further configured as a guarantee period acquirer to acquire, for each of the plurality of articles owned by the user, guarantee period information indicating a guarantee period of the article, wherein the display generator generates the display information indicating the display image in which the under-guarantee image of a mode corresponding to the guarantee period of the article indicated by the guarantee period information is associated with the article image corresponding to the article on a basis of the guarantee period information acquired by the guarantee period acquirer.

4. The information processing system according to claim 1, wherein:

the processing circuitry is further configured as a guarantee period acquirer to acquire, for each of the plurality of articles owned by the user, guarantee period information indicating a guarantee period of the article, wherein the display generator generates the display information indicating the display image in which a guarantee period image indicating at least an end of the guarantee period indicated by the guarantee period information corresponding to the article is associated with the article image corresponding to the article on a basis of the guarantee period information acquired by the guarantee period acquirer.

5. The information processing system according to claim 1, wherein:

the processing circuitry is further configured as a guarantee availability acquirer to acquire, for each of the plurality of articles owned by the user, guarantee availability information indicating whether or not the extended guarantee contract is available, wherein the notification generator generates the notification information including information indicating that the extended guarantee contract is available for the article in addition to the information indicating that the remaining period of the guarantee period of the article has become shorter than the predetermined period in a case where the guarantee availability information indicates that the extended guarantee contract is available on a basis of the guarantee availability information acquired by the guarantee availability acquirer.

6. The information processing system according to claim 1, wherein:

the processing circuitry is further configured as a guarantee availability acquirer to acquire, for each of the plurality of articles owned by the user, guarantee availability information indicating whether or not the extended guarantee contract is available, wherein the display generator generates the display information indicating the display image in which a guarantee availability image indicating that the extended guarantee contract is available is associated with the article image corresponding to one of the articles in a case where the guarantee availability information corresponding to the article indicates that the extended guarantee contract is available on a basis of the guarantee availability information acquired by the guarantee availability acquirer.

7. The information processing system according to claim 1, wherein:

the processing circuitry is further configured as a guarantee availability acquirer to acquire, for each of the plurality of articles owned by the user, guarantee availability information indicating whether or not the extended guarantee contract is available, wherein the display generator generates the display information indicating the display image which indicates that the article image indicating one of the articles cannot be selected by the user's operation in a case where the guarantee availability information corresponding to the article indicates that the extended guarantee contract is not available on a basis of the guarantee availability information acquired by the guarantee availability acquirer.

8. The information processing system according to claim 1, wherein:

the processing circuitry is further configured as a guarantee availability acquirer to acquire, for each of the plurality of articles owned by the user, guarantee availability information indicating whether or not the extended guarantee contract is available, wherein the operation acquirer does not acquire the operation information indicating the user's operation for selecting the article image indicating one of the articles in a case where the guarantee availability information corresponding to the article indicates that the extended guarantee contract is not available on a basis of the guarantee availability information acquired by the guarantee availability acquirer.

9. The information processing system according to claim 1, wherein:

the processing circuitry is further configured as a guarantee availability acquirer to acquire, for each of the plurality of articles owned by the user, guarantee availability information indicating whether or not the extended guarantee contract is available; and the processing circuitry is further configured as a guarantee contract fee acquirer to acquire guarantee contract fee information indicating a guarantee contract fee which is an amount of money required for the extended guarantee contract of one of the articles in a case where the guarantee availability information corresponding to the article indicates that the extended guarantee contract is available on a basis of the guarantee availability information acquired by the guarantee availability acquirer, wherein the display generator generates the display information indicating the display image in which a guarantee contract fee image indicating the guarantee contract fee indicated by the guarantee contract fee information is associated with the article image indicating the article corresponding to the guarantee contract fee information on a basis of the guarantee contract fee information acquired by the guarantee contract fee acquirer.

10. The information processing system according to claim 1, wherein:

the processing circuitry is further configured as a total amount acquirer to acquire total amount information indicating a total amount of respective guarantee contract fees of the plurality of selected articles specified by the article specifier, wherein the display generator generates the display information indicating the display image in which a total amount image indicating the total amount indicated by the total amount information acquired by the total amount acquirer is included in the display image indicated by the display information.

11. The information processing system according to claim 10, wherein the total amount acquirer acquires, in addition to acquiring the total amount information, for all of two or more selected articles among a plurality of the selected articles specified by the article specifier, discount amount information indicating a discount amount at a time of concluding the extended guarantee contracts that are bracketed or the total amount after a discount at the time of concluding the extended guarantee contracts that are bracketed in a case where an amount of money required for the extended guarantee contracts is discounted by concluding the extended guarantee contracts that are bracketed, wherein the display generator generates the display information indicating the display image in which, in addition to the total amount image, a discount amount image, which indicates the discount amount at the time of concluding the extended guarantee contracts that are bracketed or the total amount after a discount at the time of concluding the extended guarantee contracts that are bracketed indicated by the discount amount information acquired by the total amount acquirer, is associated with the total amount image.

12. The information processing system according to claim 1, wherein:

the processing circuitry is further configured as a blanket contract discount availability acquirer to acquire blanket contract discount availability information indicating whether or not an amount of money required for the extended guarantee contracts is discounted by concluding the extended guarantee contracts that are bracketed for all of two or more selected articles among a plurality of the selected articles specified by the article specifier in a case where the article specifier specifies the plurality of the selected articles, wherein the display generator generates the display information indicating the display image in which a blanket-discounted item image indicating that the article is the article, for which the amount of money required for the extended guarantee contracts is discounted by concluding the extended guarantee contracts that are bracketed is associated with the article image indicating the article corresponding to the blanket contract discount availability information on a basis of the blanket contract discount availability information acquired by the blanket contract discount availability acquirer.

13. The information processing system according to claim 1, wherein the display generator generates second display information indicating a second display image indicating detailed information regarding the article corresponding to one of the article images selected by the user's operation on a basis of the operation information acquired by the operation acquirer in addition to first display information indicating the first display image in which the article images corresponding to the respective articles owned by the user are arranged, the display outputter outputs the second display information instead of the first display information when the display generator generates the second display information, and the second display image indicated by the second display information generated by the display generator includes an image corresponding to at least one of guarantee state information indicating whether or not the article corresponding to the second display image is in a guaranteed state, guarantee period information indicating the guarantee period of the article, guarantee availability information indicating whether or not an extended guarantee contract is available for the article, guarantee contract fee information indicating an amount of money required for the extended guarantee contract, and blanket contract discount availability information indicating whether or not the amount of money required for the extended guarantee contract is discounted by concluding the extended guarantee contract by combining the article and another article different from the article.

14. The information processing system according to claim 13, wherein the second display image indicated by the second display information generated by the display generator includes a contact desk image corresponding to contact desk information indicating a contact desk for the article corresponding to the second display image in addition to an image corresponding to the guarantee state information, the guarantee period information, the guarantee availability information, the guarantee contract fee information, or the blanket contract discount availability information.

15. The information processing system according to claim 13, wherein the second display image indicated by the second display information generated by the display generator includes a user's manual storage location image corresponding to user's manual storage location information for acquiring the user's manual of the article corresponding to the second display image in addition to an image corresponding to the guarantee state information, the guarantee period information, the guarantee availability information, the guarantee contract fee information, or the blanket contract discount availability information.

16. The information processing system according to claim 1, wherein:

the processing circuitry is further configured as a viewing history outputter to output viewing history information indicating a viewing history of the user of viewing related information regarding each of the plurality of articles owned by the user in association with the user information indicating the user and article information indicating the article; and the processing circuitry is further configured as a user history notifier to notify a contact desk of the user information indicating the user when the user makes an inquiry about one of the plurality of articles owned by the user to the contact desk, wherein, when the contact desk responds to the inquiry about the article from the user, the viewing history information of the user corresponding to the article inquired of by the user to the contact desk is displayed, the viewing history information output by the viewing history outputter on a basis of the user information notified by the user history notifier and the viewing history information output by the viewing history outputter.

17. An information processing method, comprising:

acquiring operation information based on user's operation;

generating display information indicating a display image in which a plurality of article images each corresponding to a respective article owned by a user are arranged;

outputting the display information generated;

acquiring operation information regarding a plurality of selected article images selected by the user's operation, the selected article images being more than one of the plurality of article images that are selected by the user's operation from among the plurality of article images included in the display image;

specifying, based on the operation information, a plurality of selected articles each corresponding to one of the plurality of selected article images;

generating request information for requesting execution of predetermined processing regarding a plurality of the selected articles specified on a basis of the operation information acquired;

outputting the request information generated for requesting execution of the predetermined processing regarding the plurality of selected articles, wherein the request information is information for requesting an extended guarantee contract of the plurality of the selected articles specified by the article specifier from among the plurality of articles owned by the user, and the method further comprising acquiring, for each of the plurality of articles owned by the user, guarantee period information indicating a guarantee period of the article;

generating notification information indicating that a remaining period of the guarantee period of one of the articles has become shorter than a predetermined period when the remaining period of the guarantee period indicated by the guarantee period information corresponding to the article has become shorter than the predetermined period on a basis of the guarantee period information; and outputting the notification information.

18. A non-transitory tangible computer storage medium storing an information processing program for causing a computer:

to acquire operation information based on user's operation;

to generate display information indicating a display image in which a plurality of article images each corresponding to a respective article owned by a user are arranged;

to output the display information generated;

to acquire operation information regarding a plurality of selected article images selected by the user's operation, the selected article images being more than one of the plurality of article images that are selected by the user's operation from among the plurality of article images included in the display image;

to specify, based on the operation information, a plurality of selected articles each corresponding to one of the plurality of selected article images;

to generate request information for requesting execution of predetermined processing regarding a plurality of the selected articles specified on a basis of the operation information acquired; and to output the request information generated for requesting execution of the predetermined processing regarding the plurality of selected articles, wherein the request information is information for requesting an extended guarantee contract of the plurality of the selected articles specified by the article specifier from among the plurality of articles owned by the user, and the computer is further caused to acquire, for each of the plurality of articles owned by the user, guarantee period information indicating a guarantee period of the article;

to generate notification information indicating that a remaining period of the guarantee period of one of the articles has become shorter than a predetermined period when the remaining period of the guarantee period indicated by the guarantee period information corresponding to the article has become shorter than the predetermined period on a basis of the guarantee period information; and to output the notification information.

* * * * *